United States Patent
Okui et al.

(10) Patent No.: US 12,503,560 B2
(45) Date of Patent: Dec. 23, 2025

(54) METHOD FOR PRODUCING FLUOROPOLYMER POWDER

(71) Applicant: DAIKIN INDUSTRIES, LTD., Osaka (JP)

(72) Inventors: Chiaki Okui, Osaka (JP); Hirotoshi Yoshida, Osaka (JP); Hiroyuki Sato, Osaka (JP); Kenji Ichikawa, Osaka (JP); Taketo Kato, Osaka (JP); Taku Yamanaka, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 958 days.

(21) Appl. No.: 17/602,448

(22) PCT Filed: Apr. 16, 2020

(86) PCT No.: PCT/JP2020/016766
§ 371 (c)(1),
(2) Date: May 26, 2022

(87) PCT Pub. No.: WO2020/213691
PCT Pub. Date: Oct. 22, 2020

(65) Prior Publication Data
US 2022/0315713 A1 Oct. 6, 2022

(30) Foreign Application Priority Data

Apr. 16, 2019 (JP) ................. 2019-077976

(51) Int. Cl.
C08J 3/12 (2006.01)
C08F 2/10 (2006.01)
C08F 14/26 (2006.01)

(52) U.S. Cl.
CPC .......... C08J 3/12 (2013.01); C08F 2/10 (2013.01); C08F 14/26 (2013.01); C08J 2427/18 (2013.01)

(58) Field of Classification Search
CPC .................. C08F 14/26; C08J 3/12
See application file for complete search history.

(56) References Cited

U.S. PATENT DOCUMENTS

| | | | |
|---|---|---|---|
| 5,118,788 A | 6/1992 | Hosokawa et al. | |
| 7,671,112 B2 * | 3/2010 | Hintzer | C08L 27/12 524/544 |
| 9,255,164 B2 * | 2/2016 | Brothers | C08F 14/18 |
| 2008/0207859 A1 | 8/2008 | Matsuoka et al. | |
| 2011/0082272 A1 | 4/2011 | Takagi et al. | |
| 2012/0116015 A1 | 5/2012 | Brothers et al. | |
| 2015/0141581 A1 | 5/2015 | Brothers et al. | |
| 2020/0255551 A1 | 8/2020 | Taira et al. | |
| 2021/0108008 A1 | 4/2021 | Kato et al. | |

FOREIGN PATENT DOCUMENTS

| | | |
|---|---|---|
| CN | 102066307 A | 5/2011 |
| EP | 2 298 726 A1 | 3/2011 |
| EP | 3 750 924 A1 | 12/2020 |
| JP | 4-20534 A | 1/1992 |
| JP | 2009-235070 A | 10/2009 |
| JP | 2011-252054 A | 12/2011 |
| JP | 2015-516029 A | 6/2015 |
| WO | 2007/049517 A1 | 5/2007 |
| WO | 2009/014136 A1 | 1/2009 |
| WO | 2009/053350 A1 | 4/2009 |
| WO | 2018/181904 A1 | 10/2018 |
| WO | 2019/031617 A1 | 2/2019 |

OTHER PUBLICATIONS

Extended European Search Report dated Nov. 30, 2022 in Application No. 20791021.7.
International Preliminary Report on Patentability (with translation of the Written Opinion) dated Sep. 28, 2021, issued by the International Bureau in application No. PCT/JP2020/016766.
"Versatic 10", Synonimes: Neodecanoic acid, CAS: 26896-20-8, KAT-CHEM LTD, Jun. 2, 2022, <http://www.katchem.hu/en/prodbulletins/versatic-10> (1 page total).
International Search Report for PCT/JP2020/016766 dated Jul. 7, 2020 (PCT/ISA/210).

* cited by examiner

*Primary Examiner* — Vickey Nerangis
(74) *Attorney, Agent, or Firm* — Sughrue Mion, PLLC

(57) ABSTRACT

A method for producing a fluoropolymer powder including (A1) adding, to a fluoropolymer aqueous dispersion obtained by polymerization using a carboxylic acid type hydrocarbon surfactant, and an acid to adjust a pH to 4.0 or less and cause coagulation to thereby obtain a wet fluoropolymer powder containing a fluorine-containing compound represented by the following general formula (1A), and (B1) heat-treating the wet fluoropolymer powder at a temperature higher than 150° C. and lower than 240° C.: General Formula (1A): H—$(CF_2)_m$—COOH wherein m is 3 to 19.

9 Claims, No Drawings

METHOD FOR PRODUCING FLUOROPOLYMER POWDER

CROSS REFERENCE TO RELATED APPLICATIONS

This application is a National Stage of International Application No. PCT/JP2020/016766 filed Apr. 16, 2020, claiming priority based on Japanese Patent Application No. 2019-077976 filed Apr. 16, 2019.

TECHNICAL FIELD

The present disclosure relates to a method for producing a fluoropolymer powder.

BACKGROUND ART

Fluorine-containing anionic surfactants have been used in production of fluoropolymers by emulsion polymerization. Recently, it has been proposed to use hydrocarbon surfactants instead of the fluorine-containing anionic surfactant, and various studies have been conducted.

Patent Document 1 discloses a method for producing a modified polytetrafluoroethylene powder including a step of removing or reducing a compound represented by the following general formula (1) or (2) from a polytetrafluoroethylene powder obtained by using a hydrocarbon surfactant:

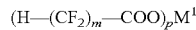  General Formula (1):

wherein m is 3 to 19, $M^1$ is H, a metal atom, $NR^5_4$, where $R^5$ may be the same or different, H or an organic group having 1 to 10 carbon atoms, imidazolium optionally having a substituent, pyridinium optionally having a substituent, or phosphonium optionally having a substituent; and p is 1 or 2, and

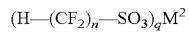  General Formula (2):

wherein n is 4 to 20; $M^2$ is H, a metal atom, $NR^5_4$, where $R^5$ may be the same or different, H or an organic group having 1 to 10 carbon atoms, imidazolium optionally having a substituent, pyridinium optionally having a substituent, or phosphonium optionally having a substituent; and q is 1 or 2.

Patent Document 2 discloses a method for reducing thermally induced discoloration of fluoropolymer resin, the fluoropolymer resin produced by polymerizing fluoromonomer in an aqueous dispersion medium to form aqueous fluoropolymer dispersion and isolating the fluoropolymer from the aqueous medium by separating fluoropolymer resin in wet form from the aqueous medium and drying to produce fluoropolymer resin in dry form, the method comprising: exposing the fluoropolymer resin in wet or dry form to oxidizing agent.

RELATED ART

Patent Documents

Patent Document 1: International Publication No. WO2019/031617
Patent Document 2: National Publication of International Patent Application No. 2015-516029

SUMMARY OF THE INVENTION

Problem to be Solved by the Invention

The present disclosure provides a method for producing a fluoropolymer powder having a reduced content of a specific fluorine-containing compound by a simple method.

Means for Solving the Problem

The present disclosure provides a method for producing a fluoropolymer powder including (A1) adding, to a fluoropolymer aqueous dispersion obtained by polymerization using a carboxylic acid type hydrocarbon surfactant, an acid to adjust a pH to 4.0 or less and cause coagulation to thereby obtain a wet fluoropolymer powder containing a fluorine-containing compound represented by the following general formula (1A), and (B1) heat-treating the wet fluoropolymer powder at a temperature higher than 150° C. and lower than 240° C. (hereinafter, also referred to as "first production method of the present disclosure"):

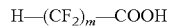  General Formula (1A):

wherein m is 3 to 19.

The wet fluoropolymer powder preferably contains two or more fluorine-containing compounds represented by the general formula (1A).

Further, it is preferable that the wet fluoropolymer powder is substantially free from a salt of a fluorine-containing compound represented by the general formula (1A).

The fluoropolymer is preferably a polytetrafluoroethylene.

The present disclosure also provides a method for producing a fluoropolymer powder including (A2) adding, to a fluoropolymer aqueous dispersion obtained by polymerization using an aliphatic carboxylic acid type hydrocarbon surfactant, an acid to adjust a pH to 4.0 or less and cause coagulation to thereby obtain a wet fluoropolymer powder containing a fluorine-containing compound represented by the following general formula (1A); and (B2) heat-treating the wet fluoropolymer powder at a temperature higher than 100° C.
(hereinafter, also referred to as "second production method of the present disclosure"):

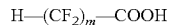  General Formula (1A):

wherein m is 3 to 19.

The temperature of the heat treatment is preferably higher than 150° C. and lower than 240° C.

The wet fluoropolymer powder preferably contains two or more fluorine-containing compounds represented by the general formula (1A).

It is preferable that the wet fluoropolymer powder is substantially free from a salt of a fluorine-containing compound represented by the general formula (1A).

The fluoropolymer is preferably a polytetrafluoroethylene.

Hereinafter, when simply referred to as the "production method of the present disclosure", it refers to the concept including both the first production method and the second production method of the present disclosure.

Effects of Invention

The production method of the present disclosure can produce a fluoropolymer powder having a reduced content of a specific fluorine-containing compound by a simple method.

DESCRIPTION OF EMBODIMENTS

Before the present disclosure is specifically described, several terms used herein are defined or described.

The term "organic group" as used herein, unless otherwise specified, means a group containing one or more carbon atoms or a group obtainable by removing one hydrogen atom from an organic compound.

Examples of the "organic group" include:
- an alkyl group optionally having one or more substituents,
- an alkenyl group optionally having one or more substituents,
- an alkynyl group optionally having one or more substituents,
- a cycloalkyl group optionally having one or more substituents,
- a cycloalkenyl group optionally having one or more substituents,
- a cycloalkazienyl group optionally having one or more substituents,
- an aryl group optionally having one or more substituents,
- an aralkyl group optionally having one or more substituents,
- a non-aromatic heterocyclic group optionally having one or more substituents,
- a heteroaryl group optionally having one or more substituents,
- a cyano group,
- a formyl group,
- RaO—,
- RaCO—,
- RaSO$_2$—,
- RaCOO—,
- RaNRaCO—,
- RaCONRa-,
- RaOCO—, and
- RaOSO$_2$—, wherein each $R^a$ is independently
- an alkyl group optionally having one or more substituents,
- an alkenyl group optionally having one or more substituents,
- an alkynyl group optionally having one or more substituents,
- a cycloalkyl group optionally having one or more substituents,
- a cycloalkenyl group optionally having one or more substituents,
- a cycloalkazienyl group optionally having one or more substituents,
- an aryl group optionally having one or more substituents,
- an aralkyl group optionally having one or more substituents,
- a non-aromatic heterocyclic group optionally having one or more substituents, or
- a heteroaryl group optionally having one or more substituents.

The organic group is preferably an alkyl group optionally having one or more substituents.

As used herein, the term "substituent" means a group capable of replacing another atom or group unless otherwise specified. Examples of the "substituent" include an aliphatic group, an aromatic group, a heterocyclic group, an acyl group, an acyloxy group, an acylamino group, an aliphatic oxy group, an aromatic oxy group, a heterocyclic oxy group, an aliphatic oxycarbonyl group, an aromatic oxycarbonyl group, a heterocyclic oxycarbonyl group, a carbamoyl group, an aliphatic sulfonyl group, an aromatic sulfonyl group, a heterocyclic sulfonyl group, an aliphatic sulfonyloxy group, an aromatic sulfonyloxy group, a heterocyclic sulfonyloxy group, a sulfamoyl group, an aliphatic sulfonamide group, an aromatic sulfonamide group, a heterocyclic sulfonamide group, an amino group, an aliphatic amino group, an aromatic amino group, a heterocyclic amino group, an aliphatic oxycarbonylamino group, an aromatic oxycarbonylamino group, a heterocyclic oxycarbonylamino group, an aliphatic sulfinyl group, an aromatic sulfinyl group, an aliphatic thio group, an aromatic thio group, a hydroxy group, a cyano group, a sulfo group, a carboxy group, an aliphatic oxyamino group, an aromatic oxyamino group, a carbamoylamino group, a sulfamoylamino group, a halogen atom, a sulfamoylcarbamoyl group, a carbamoyl sulfamoyl group, a dialiphatic oxyphosphinyl group, or a diaromatic oxyphosphinyl group.

The aliphatic group may be saturated or unsaturated, and may have a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aliphatic group include alkyl groups having 1 to 8, preferably 1 to 4 carbon atoms in total, such as a methyl group, an ethyl group, a vinyl group, a cyclohexyl group, and a carbamoylmethyl group.

The aromatic group may have, for example, a nitro group, a halogen atom, an aliphatic oxy group, a carbamoyl group, an aliphatic oxycarbonyl group, an aliphatic thio group, an amino group, an aliphatic amino group, an acylamino group, a carbamoylamino group, or the like. Examples of the aromatic group include aryl groups having 6 to 12 carbon atoms, preferably 6 to 10 carbon atoms in total, such as a phenyl group, a 4-nitrophenyl group, a 4-acetylaminophenyl group, and a 4-methanesulfonylphenyl group.

The heterocyclic group may have a halogen atom, a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the heterocyclic group include 5- or 6-membered heterocyclic groups having 2 to 12, preferably 2 to 10 carbon atoms in total, such as a 2-tetrahydrofuryl group and a 2-pyrimidyl group.

The acyl group may have an aliphatic carbonyl group, an arylcarbonyl group, a heterocyclic carbonyl group, a hydroxy group, a halogen atom, an aromatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the acyl group include acyl groups having 2 to 8, preferably 2 to 4 carbon atoms in total, such as an acetyl group, a propanoyl group, a benzoyl group, and a 3-pyridinecarbonyl group.

The acylamino group may have an aliphatic group, an aromatic group, a heterocyclic group, or the like, and may have, for example, an acetylamino group, a benzoylamino group, a 2-pyridinecarbonylamino group, a propanoylamino group, or the like. Examples of the acylamino group include acylamino groups having 2 to 12, preferably 2 to 8 carbon atoms in total, and alkylcarbonylamino groups having 2 to 8 carbon atoms in total, such as an acetylamino group, a benzoylamino group, a 2-pyridinecarbonylamino group, and a propanoylamino group.

The aliphatic oxycarbonyl group may be saturated or unsaturated, and may have a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aliphatic oxycarbonyl group include alkoxycarbonyl groups having 2 to 8, preferably 2 to 4 carbon atoms in total, such as a methoxycarbonyl group, an ethoxycarbonyl group, and a (t)-butoxycarbonyl group.

The carbamoyl group may have an aliphatic group, an aromatic group, a heterocyclic group, or the like. Examples of the carbamoyl group include an unsubstituted carbamoyl group and alkylcarbamoyl groups having 2 to 9 carbon atoms in total, preferably an unsubstituted carbamoyl group and alkylcarbamoyl groups having 2 to 5 carbon atoms in total, such as a N-methylcarbamoyl group, a N,N-dimethylcarbamoyl group, and a N-phenylcarbamoyl group.

The aliphatic sulfonyl group may be saturated or unsaturated, and may have a hydroxy group, an aromatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aliphatic sulfonyl group include alkylsulfonyl groups having 1 to 6 carbon atoms in total, preferably 1 to 4 carbon atoms in total, such as methanesulfonyl group.

The aromatic sulfonyl group may have a hydroxy group, an aliphatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aromatic sulfonyl group include arylsulfonyl groups having 6 to 10 carbon atoms in total, such as a benzenesulfonyl group.

The amino group may have an aliphatic group, an aromatic group, a heterocyclic group, or the like.

The acylamino group may have, for example, an acetylamino group, a benzoylamino group, a 2-pyridinecarbonylamino group, a propanoylamino group, or the like. Examples of the acylamino group include acylamino groups having 2 to 12 carbon atoms in total, preferably 2 to 8 carbon atoms in total, and more preferably alkylcarbonylamino groups having 2 to 8 carbon atoms in total, such as an acetylamino group, a benzoylamino group, a 2-pyridinecarbonylamino group, and a propanoylamino group.

The aliphatic sulfonamide group, aromatic sulfonamide group, and heterocyclic sulfonamide group may be, for example, a methanesulfonamide group, a benzenesulfonamide group, a 2-pyridinesulfonamide group, respectively.

The sulfamoyl group may have an aliphatic group, an aromatic group, a heterocyclic group, or the like. Examples of the sulfamoyl group include a sulfamoyl group, alkylsulfamoyl groups having 1 to 9 carbon atoms in total, dialkylsulfamoyl groups having 2 to 10 carbon atoms in total, arylsulfamoyl groups having 7 to 13 carbon atoms in total, and heterocyclic sulfamoyl groups having 2 to 12 carbon atoms in total, more preferably a sulfamoyl group, alkylsulfamoyl groups having 1 to 7 carbon atoms in total, dialkylsulfamoyl groups having 3 to 6 carbon atoms in total, arylsulfamoyl groups having 6 to 11 carbon atoms in total, and heterocyclic sulfamoyl groups having 2 to 10 carbon atoms in total, such as a sulfamoyl group, a methylsulfamoyl group, a N,N-dimethylsulfamoyl group, a phenylsulfamoyl group, and a 4-pyridinesulfamoyl group.

The aliphatic oxy group may be saturated or unsaturated, and may have a methoxy group, an ethoxy group, an i-propyloxy group, a cyclohexyloxy group, a methoxyethoxy group, or the like. Examples of the aliphatic oxy group include alkoxy groups having 1 to 8, preferably 1 to 6 carbon atoms in total, such as a methoxy group, an ethoxy group, an i-propyloxy group, a cyclohexyloxy group, and a methoxyethoxy group.

The aromatic amino group and the heterocyclic amino group each may have an aliphatic group, an aliphatic oxy group, a halogen atom, a carbamoyl group, a heterocyclic group ring-fused with the aryl group, and an aliphatic oxycarbonyl group, preferably an aliphatic group having 1 to 4 carbon atoms in total, an aliphatic oxy group having 1 to 4 carbon atoms in total, a halogen atom, a carbamoyl group having 1 to 4 carbon atoms in total, a nitro group, or an aliphatic oxycarbonyl group having 2 to 4 carbon atoms in total.

The aliphatic thio group may be saturated or unsaturated, and examples thereof include alkylthio groups having 1 to 8 carbon atoms in total, more preferably 1 to 6 carbon atoms in total, such as a methylthio group, an ethylthio group, a carbamoylmethylthio group, and a t-butylthio group.

The carbamoylamino group may have an aliphatic group, an aryl group, a heterocyclic group or the like. Examples of the carbamoylamino group include a carbamoylamino group, alkylcarbamoylamino groups having 2 to 9 carbon atoms in total, dialkylcarbamoylamino groups having 3 to 10 carbon atoms in total, arylcarbamoylamino groups having 7 to 13 carbon atoms in total, and heterocyclic carbamoylamino groups having 3 to 12 carbon atoms in total, preferably a carbamoylamino group, alkylcarbamoylamino groups having 2 to 7 carbon atoms in total, dialkylcarbamoylamino groups having 3 to 6 carbon atoms in total, arylcarbamoylamino groups having 7 to 11 carbon atoms in total, and heterocyclic carbamoylamino group having 3 to 10 carbon atoms in total, such as a carbamoylamino group, a methylcarbamoylamino group, a N,N-dimethylcarbamoylamino group, a phenylcarbamoylamino group, and a 4-pyridinecarbamoylamino group.

Hereinafter, the production method of the present disclosure will be described in detail.

When a fluoropolymer powder is obtained by polymerization using a hydrocarbon surfactant, the fluoropolymer powder may contain a specific fluorine-containing compound represented by the following general formulas (1) and (2):

$$(H-(CF_2)_m-COO)_p M_1 \qquad \text{General Formula (1):}$$

wherein m is 3 to 19, $M^1$ is H, a metal atom, $NR^5_4$, where $R^5$ may be the same or different, H or an organic group having 1 to 10 carbon atoms, imidazolium optionally having a substituent, pyridinium optionally having a substituent, or phosphonium optionally having a substituent; and p is 1 or 2, and

$$(H-(CF_2)_n-SO_3)_q M^2 \qquad \text{General Formula (2):}$$

wherein n is 4 to 20; $M^2$ is H, a metal atom, $NR^5_4$, imidazolium optionally having a substituent, pyridinium optionally having a substituent, or phosphonium optionally having a substituent; and q is 1 or 2.

The specific fluorine-containing compound represented by general formulas (1) and (2) is preferably removed from the fluoropolymer powder, and additional steps such as fluorination treatment have been required to remove the specific fluorine-containing compound.

The production method of the present disclosure has been completed by finding that fluoropolymer powder with a reduced amount of a fluorine-containing compound represented by the general formula (1) can be obtained without a complicated process by subjecting a wet fluoropolymer powder obtained from a fluoropolymer aqueous dispersion obtained by polymerization using a carboxylic acid type hydrocarbon surfactant to a specific heat treatment in a state where —COOM$^1$ of a fluorine-containing compound represented by the general formula (1) contained in the wet fluoropolymer powder is —COOH.

The first production method of the present disclosure incudes (A1) adding, to a fluoropolymer aqueous dispersion obtained by polymerization using a carboxylic acid type hydrocarbon surfactant, an acid to adjust a pH to 4.0 or less and cause coagulation to thereby obtain a wet fluoropolymer powder containing a fluorine-containing compound represented by the following general formula (1A), and (B1) heat-treating the wet fluoropolymer powder at a temperature higher than 150° C. and lower than 240° C.

According to the first production method of the present disclosure having the above configuration, a fluoropolymer powder with a reduced amount of the specific fluorine-containing compound represented by the general formulas (1) and (2) can be obtained although the method is simple. Further, since the specific fluorine-containing compound represented by general formulas (1) and (2) can be reduced at a relatively low temperature, the fluorine-containing compound represented by the general formulas (1) and (2) can be reduced, and the fusion of the obtained fluoropolymer powder can be suppressed.

The step (A1) is a step of adding, to a fluoropolymer aqueous dispersion obtained by polymerization using a carboxylic acid type hydrocarbon surfactant, an acid to adjust a pH to 4.0 or less and cause coagulation to thereby obtain a wet fluoropolymer powder containing a fluorine-containing compound represented by the following general formula (1A).

A wet fluoropolymer powder containing a fluorine-containing compound represented by the general formula (1A) can be obtained by adding an acid to fluoropolymer aqueous dispersion to adjust a pH to 4.0 or less and cause coagulation.

By adjusting the pH of the aqueous dispersion to 4.0 or lower, more preferably 3.5 or lower, still more preferably 3.0 or lower, still further preferably 2.5 or lower, and particularly preferably 2.0 or lower, the fluorine-containing compound represented by the general formula (1) contained in the fluoropolymer aqueous dispersion can be converted into the fluorine-containing compound represented by the general formula (1A). As a result, a wet fluoropolymer powder containing the fluorine-containing compound represented by the general formula (1A) is obtained, and the content of the fluorine-containing compound represented by the general formulas (1) and (2) can be reduced by the heat treatment performed in the step (B1).

The acid may be an organic acid or an inorganic acid, and is preferably an inorganic acid, particularly preferably at least one selected from the group consisting of nitric acid, sulfuric acid, fuming sulfuric acid, perchloric acid, and hydrochloric acid, and more preferably at least one selected from the group consisting of nitric acid, sulfuric acid, and hydrochloric acid, from the viewpoint of being less likely to remain during heat treatment. The organic acid may be succinic acid, oxalic acid, citric acid, trifluoroacetic acid or the like. The amount of the acid added is not limited, and may be appropriately set depending on the pH of the fluoropolymer aqueous dispersion.

Examples of the method of adding the acid to cause coagulation include a method of stirring the aqueous dispersion while adding the acid. More specifically, the fluoropolymer can be coagulated by stirring in a container equipped with a stirrer to obtain a wet fluoropolymer powder containing a fluorine-containing compound represented by the general formula (1A). The coagulation may also be continuously performed using an inline mixer or the like.

In the step (A1), the temperature of the coagulation is not limited, and can be performed at, for example, 3 to 80° C. From the viewpoint of dispersion stability, the temperature is preferably 5° C. or higher, and more preferably 10° C. or higher. Further, from the viewpoint of suppressing the granulation of secondary particles, the temperature is preferably 60° C. or lower.

The step (B1) is a step of heat-treating a wet fluoropolymer powder containing a fluorine-containing compound represented by the general formula (1A) at a temperature higher than 150° C. and lower than 240° C. By converting the fluorine-containing compound represented by the general formula (1) into the fluorine-containing compound represented by the general formula (1A) and then performing the heat treatment, it is possible to efficiently reduce the amount of the fluorine-containing compound represented by the general formula (1) contained in the fluoropolymer powder while suppressing fusion of the obtained fluoropolymer powder.

In the step (B1), the heat treatment temperature is higher than 150° C. and lower than 240° C. The temperature of the heat treatment is preferably 155° C. or higher, more preferably 160° C. or higher, still more preferably 165° C. or higher, further preferably 170° C. or higher, still further preferably 175° C. or higher, and particularly preferably 180° C. or higher in view of more efficiently reducing the specific fluorine-containing compound.

From the viewpoint of suppressing the fusion of the fluoropolymer powder, the temperature is more preferably 235° C. or lower, still more preferably 230° C. or lower, further preferably 225° C. or lower, still further preferably 220° C. or lower, particularly preferably 215° C. or lower, and most preferably 210° C. or lower.

The heat treatment preferably dries the wet fluoropolymer powder. The "dry" refers to a heat treatment for reducing the moisture content of the wet fluoropolymer powder to 0.01% by mass or less.

The drying temperature is higher than 150° C. and lower than 240° C. The drying temperature is preferably 155° C. or higher, more preferably 160° C. or higher, still more preferably 165° C. or higher, further preferably 170° C. or higher, still further preferably 175° C. or higher, and particularly preferably 180° C. or higher in view of more efficiently reducing the specific fluorine-containing compound.

From the viewpoint of suppressing the fusion of the fluoropolymer powder, the temperature is more preferably 235° C. or lower, still more preferably 230° C. or lower, further preferably 225° C. or lower, still further preferably 220° C. or lower, particularly preferably 215° C. or lower, and most preferably 210° C. or lower.

In the first production method of the present disclosure, the specific fluorine-containing compound can be efficiently reduced even when the heat treatment or drying temperature is relatively low, and thus fusion can be suppressed.

In the present specification, fusion means that the average particle size changes significantly before and after drying, and in particular that the average particle size after drying becomes large. The degree of fusion can be evaluated, for example, by the up-rate when sieving with 10 mesh.

Up-rate=(amount remaining on 10 mesh (g))/(total amount of sieved fluoropolymer (g))×100

According to the first production method of the present disclosure, fusion can be suppressed, and the up-rate is preferably 5% or less, preferably 3% or less, so that the productivity can be improved.

The method for measuring the average particle size may be appropriately selected depending on the type of fluoropolymer. The average particle size for low-molecular-weight PTFE is determined as follows. That is, the particle size distribution is measured using a laser diffraction particle size distribution measurement apparatus (manufactured by Japan Laser Corporation) at a pressure of 0.1 MPa and a measurement time of 3 seconds without cascade impaction. The value corresponding to 50% of the cumulative volume in the resulting particle size distribution is taken as the average particle size.

For high-molecular-weight PTFE, the average particle size is a value measured in conformity with JIS K 6891.

From the viewpoint of efficiently removing or reducing the fluorine-containing compound represented by the general formula (1A), the heat treatment or drying time is preferably 120 minutes or more, more preferably 180 minutes or more, still more preferably 240 minutes or more, and further preferably 300 minutes or more.

The upper limit of the heat treatment or drying time is not limited, and may be, for example, 1500 minutes or less, or 1200 minutes or less.

In the heat treatment or drying, it is preferable to control the temperature to lower than 240° C. or that the temperature does not exceed 240° C., and the temperature may be 240° C. or higher or may exceed 240° C. as long as the effects of the present disclosure are not impaired. In the heat treatment or drying, the time for the temperature to reach 240° C. or higher or the time for exceeding 240° C. is preferably 120 minutes or less from the viewpoint of suppressing the fusion of powder. The temperature is more preferably 90 minutes or less, still more preferably 60 minutes or less, and further preferably 30 minutes or less. Further, in the heat treatment or drying, as long as the effects of the present disclosure are not impaired, the time for the temperature to reach 240° C. or higher or the time for exceeding 240° C. is preferably 40% or less of the total drying time from the viewpoint of suppressing the fusion of powder. The time is more preferably 30% or less thereof, still more preferably 20% or less thereof, further preferably 10% or less thereof, still further preferably 5% or less thereof, and particularly preferably 3% or less thereof.

The second production method of the present disclosure incudes (A2) adding, to a fluoropolymer aqueous dispersion obtained by polymerization using an aliphatic carboxylic acid type hydrocarbon surfactant, an acid to adjust a pH to 4.0 or less and cause coagulation to thereby obtain a wet fluoropolymer powder containing a fluorine-containing compound represented by the following general formula (1A), and (B2) heat-treating the wet fluoropolymer powder at a temperature higher than 100° C.

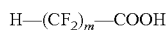
H—(CF$_2$)$_m$—COOH          General Formula (1A):

wherein m is 3 to 19.

According to the second production method of the present disclosure having the above configuration, a fluoropolymer powder with a reduced amount of the specific fluorine-containing compound represented by the general formulas (1) and (2) can be obtained although the method is simple.

The step (A2) is a step of adding, to a fluoropolymer aqueous dispersion obtained by polymerization using an aliphatic carboxylic acid type hydrocarbon surfactant, an acid to adjust a pH to 4.0 or less and cause coagulation to thereby obtain a wet fluoropolymer powder containing a fluorine-containing compound represented by the following general formula (1A).

By adjusting the pH of the aqueous dispersion to 4.0 or lower, more preferably 3.5 or lower, still more preferably 3.0 or lower, still further preferably 2.5 or lower, and particularly preferably 2.0 or lower, the fluorine-containing compound represented by the general formula (1) contained in the fluoropolymer aqueous dispersion can be converted into the fluorine-containing compound represented by the general formula (1A). As a result, a wet fluoropolymer powder containing the fluorine-containing compound represented by the general formula (1A) is obtained, and the content of the fluorine-containing compound represented by the general formulas (1) and (2) can be reduced by the heat treatment performed in the step (B2).

The acid may be an organic acid or an inorganic acid, and is preferably an inorganic acid, particularly preferably at least one selected from the group consisting of nitric acid, sulfuric acid, fuming sulfuric acid, perchloric acid, and hydrochloric acid, and more preferably at least one selected from the group consisting of nitric acid, sulfuric acid, and hydrochloric acid, from the viewpoint of being less likely to remain during heat treatment. The organic acid may be succinic acid, oxalic acid, citric acid, trifluoroacetic acid or the like. The amount of the acid added is not limited, and may be appropriately set depending on the pH of the fluoropolymer aqueous dispersion.

Examples of the method of adding the acid to cause coagulation include a method of stirring the aqueous dispersion while adding the acid. The fluoropolymer can be coagulated by stirring in a container equipped with a stirrer to obtain a wet fluoropolymer powder containing a fluorine-containing compound represented by the general formula (1A). The coagulation may also be continuously performed using an inline mixer or the like.

In the step (A2), the temperature of the coagulation is not limited, and can be performed at, for example, 3 to 80° C. From the viewpoint of dispersion stability, the temperature is preferably 5° C. or higher, and more preferably 10° C. or higher. Further, from the viewpoint of suppressing the granulation of secondary particles, the temperature is preferably 60° C. or lower.

In the step (B2), the heat treatment temperature is higher than 100° C. The temperature of the heat treatment is preferably 110° C. or higher, more preferably 120° C. or higher, still more preferably 130° C. or higher, and particularly preferably 140° C. or higher in view of more efficiently reducing the specific fluorine-containing compound.

Further, the temperature is preferably 150° C. or higher, more preferably 155° C. or higher, still more preferably 160° C. or higher, further preferably 165° C. or higher, still further preferably 170° C. or higher, particularly preferably 175° C. or higher, and most preferably 180° C. or higher in view of further efficiently reducing the specific fluorine-containing compound.

From the viewpoint of suppressing the fusion of the fluoropolymer powder, the temperature is preferably 240° C. or lower, more preferably lower than 240° C., more preferably 235° C. or lower, still more preferably 230° C. or lower, further preferably 225° C. or lower, still further preferably 220° C. or lower, particularly preferably 215° C. or lower, and most preferably 210° C. or lower.

In the step (B2), the heat treatment preferably dries the wet fluoropolymer powder.

The "dry" refers to a heat treatment for reducing the moisture content of the wet fluoropolymer powder to 0.010% by mass or less.

The drying temperature is higher than 100° C. The drying temperature is preferably 110° C. or higher, more preferably 120° C. or higher, still more preferably 130° C. or higher, and particularly preferably 140° C. or higher in view of more efficiently reducing the specific fluorine-containing compound.

Further, the drying temperature is preferably 150° C. or higher, more preferably 155° C. or higher, still more preferably 160° C. or higher, further preferably 165° C. or higher, still further preferably 170° C. or higher, particularly preferably 175° C. or higher, and most preferably 180° C. or higher in view of further efficiently reducing the specific fluorine-containing compound.

From the viewpoint of suppressing the fusion of the fluoropolymer powder, the temperature is preferably 240° C. or lower, more preferably lower than 240° C., more preferably 235° C. or lower, still more preferably 230° C. or lower, further preferably 225° C. or lower, still further preferably 220° C. or lower, particularly preferably 215° C. or lower, and most preferably 210° C. or lower.

In the second production method of the present disclosure, the specific fluorine-containing compound can be efficiently reduced even when the heat treatment or drying temperature is relatively low, and thus fusion can be suppressed.

In the present specification, fusion means that the average particle size changes significantly before and after drying, and in particular, that the average particle size after drying becomes large. The degree of fusion can be evaluated, for example, by the up-rate when sieving with 10 mesh.

Up-rate=(amount remaining on 10 mesh (g))/(total amount of sieved fluoropolymer (g))×100

According to the production method of the present disclosure, fusion can be suppressed, and the up-rate is preferably 5% or less, preferably 3% or less, so that the productivity can be improved.

The method for measuring the average particle size may be appropriately selected depending on the type of fluoropolymer. The average particle size for low-molecular-weight PTFE is determined as follows. That is, the particle size distribution is measured using a laser diffraction particle size distribution measurement apparatus (manufactured by Japan Laser Corporation) at a pressure of 0.1 MPa and a measurement time of 3 seconds without cascade impaction. The value corresponding to 50% of the cumulative volume in the resulting particle size distribution is taken as the average particle size.

For high-molecular-weight PTFE, the average particle size is a value measured in conformity with JIS K 6891.

From the viewpoint of efficiently removing or reducing the fluorine-containing compound represented by the general formula (1A), the heat treatment or drying time is preferably 120 minutes or more, more preferably 180 minutes or more, still more preferably 240 minutes or more, and further preferably 300 minutes or more.

The upper limit of the heat treatment or drying time is not limited, and may be, for example, 1500 minutes or less, or 1200 minutes or less.

In the heat treatment or drying, it is preferable to control the temperature to lower than 240° C. or that the temperature is not higher than 240° C., and the temperature may be 240° C. or higher or may be higher than 240° C. as long as the effects of the present disclosure are not impaired. In the heat treatment or drying, the time for the temperature to reach 240° C. or higher or the time for exceeding 240° C. is preferably 120 minutes or less from the viewpoint of suppressing the fusion of powder. The temperature is more preferably 90 minutes or less, still more preferably 60 minutes or less, and further preferably 30 minutes or less. Further, in the heat treatment or drying, as long as the effects of the present disclosure are not impaired, the time for the temperature to reach 240° C. or higher or the time for exceeding 240° C. is preferably 40% or less of the total drying time from the viewpoint of suppressing the fusion of powder. The time is more preferably 30% or less thereof, still more preferably 20% or less thereof, further preferably 10% or less thereof, still further preferably 5% or less thereof, and particularly preferably 3% or less thereof.

In the production method of the present disclosure, drying of the wet powder obtained by coagulation of the fluoropolymer is usually performed by means of vacuum, high-frequency waves, hot air, or the like while keeping the wet powder in a state in which the wet powder is less fluidized, preferably in a stationary state.

For example, when the fluoropolymer is PTFE, friction between the powder particles especially at high temperature usually has unfavorable effects on the PTFE in the form of fine powder. This is because the particles made of such PTFE are easily formed into fibrils even with a small shearing force and lose its original, stable particulate structure.

In the present specification, the presence or absence of fibrillation can be determined by "paste extrusion" which is a representative method for molding "high-molecular-weight PTFE powder" which is powder (fine powder) prepared from an emulsion polymer of TFE. Usually, paste extrusion is possible because the high-molecular-weight PTFE powder is fibrillatable. When the non-sintered molded product obtained by paste extrusion does not have substantial strength or elongation, for example, when the elongation is 0% and the molded product breaks when pulled, it can be considered that it is not fibrillatable.

In the production method of the present disclosure, the solid concentration of the fluoropolymer aqueous dispersion is not limited, and may be, for example, 1.0 to 70.0% by mass. The solid concentration is preferably 8.0% by mass or more, more preferably 10.0% by mass or more, and preferably 60.0% by mass or less, more preferably 50.0% by mass or less. From the viewpoint of reducing the uncoagulated content, the solid concentration is preferably 10.0 to 25.0% by mass, preferably 10.0 to 22.0% by mass, and more preferably 10.0 to 20.0% by mass.

The production method of the present disclosure may include a step of diluting the fluoropolymer aqueous dispersion by adding water. For example, by the dilution, the solid concentration can be diluted to 10.0 to 25.0% by mass.

In the fluoropolymer aqueous dispersion, the content of the fluorine-containing compound represented by the general formula (1) is not limited. For example, it is preferable that the content of the fluorine-containing compound represented by the general formula (1) contained in the wet fluoropolymer powder obtained after coagulation is in the range described later.

In order to increase the bulk density of the fluoropolymer powder, it is preferable that the fluoropolymer solid concentration in the fluoropolymer aqueous dispersion is high. When the concentration of the fluoropolymer solid concentration in the fluoropolymer aqueous dispersion for coagulation is high, the degree of association of the primary particles of the fluoropolymer is increased, and the primary particles of the fluoropolymer are closely associated and agglomerated to granulate. When the fluoropolymer solid concentration of the fluoropolymer aqueous dispersion is less than 8% by mass, the agglomeration density of the primary particles of the fluoropolymer tends to be sparse, and it is difficult to obtain a fluoropolymer powder having a high bulk density. On the other hand, when the fluoropolymer solid concentration in the fluoropolymer aqueous dispersion is too high, the unagglomerated fluoropolymer increases, and the unagglomerated fluoropolymer solid concentration in the aggregated discharge water increases. When the unagglomerated fluoropolymer solid concentration in the coagulated discharge water is high, the piping clogging and discharge water treatment are costly and time-consuming. Further, the yield of the fluoropolymer powder decreases. The unagglomerated fluoropolymer solid concentration in the coagulated discharge water is preferably low from the viewpoint of productivity of the fluoropolymer powder, more preferably less than 0.4% by mass, still more preferably less than 0.3% by mass, and particularly preferably less than 0.2% by mass. When the fluoropolymer solid concentration of the fluoropolymer aqueous dispersion exceeds 25% by mass, it is difficult to reduce the unagglomerated fluoropolymer solid concentration of the coagulated discharge water to less than 0.4% by mass.

Since the fluoropolymer solid concentration in the fluoropolymer aqueous dispersion obtained in the polymerization step to be described later is about 8 to 45% by mass, when the fluoropolymer solid concentration is high, it may be adjusted to 8 to 25% by mass by adding a diluent such as water. Further, when the fluoropolymer solid concentration in the fluoropolymer aqueous dispersion after emulsion polymerization is 8 to 25% by mass, the fluoropolymer aqueous dispersion can be used as it is as the fluoropolymer aqueous dispersion.

In the production method of the present disclosure, the content of the fluorine-containing compound represented by the general formula (1) contained in the fluoropolymer aqueous dispersion is not limited, and is, for example, about 1 ppb to 10,000 ppm, preferably 100 ppb or more, more preferably 1 ppm or more, still more preferably 10 ppm or more, and particularly preferably 100 ppm or more, based on the fluoropolymer.

The aqueous dispersion to be subjected to the heat treatment may contain one fluorine-containing compound represented by the general formula (1) or may contain two or more fluorine-containing compounds, and the production method of the present disclosure is particularly effective when the aqueous dispersion contains two or more fluorine-containing compounds.

Examples thereof include an embodiment containing a fluorine-containing compound of the general formula (1) wherein m is 7 and a fluorine-containing compound of the general formula (1) wherein m is 13. Further, the aqueous dispersion may contain three or more, four or more, or all fluorine-containing compounds encompassed in the general formula (1), as long as the aqueous dispersion contains two or more of them. The aqueous dispersion to be subjected to the heat treatment may be an aqueous dispersion containing, as the fluorine-containing compound, a fluorine-containing compound of the general formula (1A) wherein m is 7 or less and a fluorine-containing compound of the general formula (1A) wherein m is 8 or more, or may be an aqueous dispersion containing a fluorine-containing compound of the general formula (1A) wherein m is 8 or less and a fluorine-containing compound of the general formula (1A) wherein m is 9 or more.

The fluoropolymer aqueous dispersion may be an embodiment containing fluorine-containing compounds wherein m is 3, 5, 7, 9, 11, 13, 15, 17, and 19 and not containing fluorine-containing compounds wherein m is 4, 6, 8, 10, 12, 14, 16, and 18, or may be an embodiment containing fluorine-containing compounds wherein m is 4, 6, 8, 10, 12, 14, 16, 18, and 20 and not containing fluorine-containing compounds wherein m is 3, 5, 7, 9, 11, 13, 15, 17, and 19, or may be an embodiment containing all fluorine-containing compounds wherein m is 3 to 19, among the fluorine-containing compounds encompassed in the general formula (1).

In the production method of the present disclosure, the concentration of the fluorine-containing compound represented by the general formula (1) in the fluoropolymer aqueous dispersion is not limited, and the aqueous dispersion of fluoropolymer can be coagulated at any concentration. In the fluoropolymer aqueous dispersion to be subjected to coagulation, the total amount of the fluorine-containing compound represented by the general formula (1) may be 0.01 ppm or more, 0.1 ppm or more, 0.5 ppm or more, 1 ppm or more, 5 ppm or more, 10 ppm or more, or 100 ppm or more based on the fluoropolymer. The total amount may also be 0.01 ppm or more, 0.1 ppm or more, 0.5 ppm or more, 1 ppm or more, 5 ppm or more, or 10 ppm or more based on the total amount of water. When the concentration of the fluorine-containing compound represented by the general formula (1) in the fluoropolymer aqueous dispersion is a certain level or more as described above, the production method of the present disclosure exhibits higher removal efficiency.

Further, in the fluoropolymer aqueous dispersion to be subjected to the treatment, the fluorine-containing compound represented by the general formula (1) may be 10,000 ppm or less, 5,000 ppm or less, and 2,000 ppm or less, 1,000 ppm or less, 500 ppm or less, and 200 ppm or less based on the fluoropolymer. When the total amount of the fluorine-containing compounds in the water is within the above range, the removal efficiency can be further improved. As used herein, ppm and ppb mean values obtained in terms of mass unless otherwise specified.

The amount of at least one of the fluorine-containing compounds represented by the general formula (1) wherein m is 3, 4, 5, 6, 7, 8, 9, 10, 11, 12, 13, 14, 15, 16, 17, 18 or 19 may be 0.01 ppm or more, 0.1 ppm or more, 0.5 ppm or more, 1 ppm or more, 5 ppm or more, 10 ppm or more, or 100 ppm or more based on the total amount of water.

When the concentration of the fluorine-containing compound represented by the general formula (1) in the fluoropolymer aqueous dispersion is a certain level or more as described above, the production method of the present disclosure exhibits higher removal efficiency.

Further, the amount of at least one of the fluorine-containing compounds represented by the general formula (1) wherein m is 3, 4, 5, 6, 7, 8, 9, 10, 11, 12, 13, 14, 15, 16, 17, 18 or 19 may be 10,000 ppm or less, 5,000 ppm or less, 2,000 ppm or less, 1,000 ppm or less, 500 ppm or less, or 200 ppm or less based on the total amount of water. When the amount of the fluorine-containing compounds in the fluoropolymer aqueous dispersion is within the above range, the removal efficiency can be further improved.

The amount of the fluorine-containing compound of the general formula (1) wherein m is 3 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1) in the fluoropolymer aqueous dispersion is a certain level or more as described above, the production method of the present disclosure exhibits higher removal efficiency.

Further, the amount of the fluorine-containing compound of the general formula (1) wherein m is 3 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the fluoropolymer aqueous dispersion is within the above range, the removal efficiency can be further improved.

The amount of the fluorine-containing compound of the general formula (1) wherein m is 4 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1) in the fluoropolymer aqueous dispersion is a certain level or more as described above, the production method of the present disclosure exhibits higher removal efficiency.

Further, the amount of the fluorine-containing compound of the general formula (1) wherein m is 4 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the fluoropolymer aqueous dispersion is within the above range, the removal efficiency can be further improved.

The amount of the fluorine-containing compound of the general formula (1) wherein m is 5 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1) in the fluoropolymer aqueous dispersion is a certain level or more as described above, the production method of the present disclosure exhibits higher removal efficiency.

Further, the amount of the fluorine-containing compound of the general formula (1) wherein m is 5 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the fluoropolymer aqueous dispersion is within the above range, the removal efficiency can be further improved.

The amount of the fluorine-containing compound of the general formula (1) wherein m is 6 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1) in the fluoropolymer aqueous dispersion is a certain level or more as described above, the production method of the present disclosure exhibits higher removal efficiency.

Further, the amount of the fluorine-containing compound of the general formula (1) wherein m is 6 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the fluoropolymer aqueous dispersion is within the above range, the removal efficiency can be further improved.

The amount of the fluorine-containing compound of the general formula (1) wherein m is 7 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1) in the fluoropolymer aqueous dispersion is a certain level or more as described above, the production method of the present disclosure exhibits higher removal efficiency.

Further, the amount of the fluorine-containing compound of the general formula (1) wherein m is 7 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the fluoropolymer aqueous dispersion is within the above range, the removal efficiency can be further improved.

The amount of the fluorine-containing compound of the general formula (1) wherein m is 8 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1) in the fluoropolymer aqueous dispersion is a certain level or more as described above, the production method of the present disclosure exhibits higher removal efficiency.

Further, the amount of the fluorine-containing compound of the general formula (1) wherein m is 8 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the fluoropolymer aqueous dispersion is within the above range, the removal efficiency can be further improved.

The amount of the fluorine-containing compound of the general formula (1) wherein m is 9 may also be 0.01 ppm or more, 0.1 ppm or more, 0.5 ppm or more, 1 ppm or more, 5 ppm or more, or 10 ppm or more based on the When the concentration of the fluorine-containing compound represented by the general formula (1) in the fluoropolymer aqueous dispersion is a certain level or more as described above, the production method of the present disclosure exhibits higher removal efficiency.

Further, the amount of the fluorine-containing compound of the general formula (1) wherein m is 9 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the fluoropolymer aqueous dispersion is within the above range, the removal efficiency can be further improved.

The amount of the fluorine-containing compound of the general formula (1) wherein m is 10 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1) in the fluoropolymer aqueous dispersion is a certain level or more as described above, the production method of the present disclosure exhibits higher removal efficiency.

Further, the amount of the fluorine-containing compound of the general formula (1) wherein m is 10 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the fluoropolymer aqueous dispersion is within the above range, the removal efficiency can be further improved.

The amount of the fluorine-containing compound of the general formula (1) wherein m is 11 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1) in the fluoropolymer aqueous dispersion is a certain level or more as described above, the production method of the present disclosure exhibits higher removal efficiency.

Further, the amount of the fluorine-containing compound of the general formula (1) wherein m is 11 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the fluoropolymer aqueous dispersion is within the above range, the removal efficiency can be further improved.

The amount of the fluorine-containing compound of the general formula (1) wherein m is 12 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1) in the fluoropolymer aqueous dispersion is a certain level or more as described above, the production method of the present disclosure exhibits higher removal efficiency.

Further, the amount of the fluorine-containing compound of the general formula (1) wherein m is 12 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the fluoropolymer aqueous dispersion is within the above range, the removal efficiency can be further improved.

The amount of the fluorine-containing compound of the general formula (1) wherein m is 13 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1) in the fluoropolymer aqueous dispersion is a certain level or more as described above, the production method of the present disclosure exhibits higher removal efficiency.

Further, the amount of the fluorine-containing compound of the general formula (1) wherein m is 13 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the fluoropolymer aqueous dispersion is within the above range, the removal efficiency can be further improved.

The amount of the fluorine-containing compound of the general formula (1) wherein m is 14 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1) in the fluoropolymer aqueous dispersion is a certain level or more as described above, the production method of the present disclosure exhibits higher removal efficiency.

Further, the amount of the fluorine-containing compound of the general formula (1) wherein m is 14 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the fluoropolymer aqueous dispersion is within the above range, the removal efficiency can be further improved.

The amount of the fluorine-containing compound of the general formula (1) wherein m is 15 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1) in the fluoropolymer aqueous dispersion is a certain level or more as described above, the production method of the present disclosure exhibits higher removal efficiency.

Further, the amount of the fluorine-containing compound of the general formula (1) wherein m is 15 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the fluoropolymer aqueous dispersion is within the above range, the removal efficiency can be further improved.

The amount of the fluorine-containing compound of the general formula (1) wherein m is 16 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1) in the fluoropolymer aqueous dispersion is a certain level or more as described above, the production method of the present disclosure exhibits higher removal efficiency.

Further, the amount of the fluorine-containing compound of the general formula (1) wherein m is 16 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the fluoropolymer aqueous dispersion is within the above range, the removal efficiency can be further improved.

The amount of the fluorine-containing compound of the general formula (1) wherein m is 17 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1) in the fluoropolymer aqueous dispersion is a certain level or more as described above, the production method of the present disclosure exhibits higher removal efficiency.

Further, the amount of the fluorine-containing compound of the general formula (1) wherein m is 17 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the fluoropolymer aqueous dispersion is within the above range, the removal efficiency can be further improved.

The amount of the fluorine-containing compound of the general formula (1) wherein m is 18 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1) in the fluoropolymer aqueous dispersion is a certain level or more as described above, the production method of the present disclosure exhibits higher removal efficiency.

Further, the amount of the fluorine-containing compound of the general formula (1) wherein m is 18 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the fluoropolymer aqueous dispersion is within the above range, the removal efficiency can be further improved.

The amount of the fluorine-containing compound of the general formula (1) wherein m is 19 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1) in the fluoropolymer aqueous dispersion is a certain level or more as described above, the production method of the present disclosure exhibits higher removal efficiency.

Further, the amount of the fluorine-containing compound of the general formula (1) wherein m is 19 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the fluoropolymer aqueous dispersion is within the above range, the removal efficiency can be further improved.

The fluorine-containing compound represented by general formula (1) contained in the fluoropolymer aqueous dispersion is preferably a fluorine-containing compound represented by general formula (1), wherein $M^1$ is a metal atom, $NR^5_4$ ($R^5$ may be the same or different and may be H or an organic group having 1 to 10 carbon atoms), imidazolium optionally having a substituent, pyridinium optionally having a substituent, or phosphonium optionally having a substituent.

By adding an acid to the fluoropolymer aqueous dispersion to adjust the pH to 4.0 or less, such a fluorine-containing compound can be converted into the fluorine-containing compound represented by the general formula (1A).

Therefore, according to the production method of the present disclosure, it is possible to obtain a fluoropolymer powder containing no or almost no fluorine-containing compound represented by general formula (1), wherein $M^1$ is a metal atom, $NR^5_4$ ($R^5$ may be the same or different and may be H or an organic group having 1 to 10 carbon atoms), imidazolium optionally having a substituent, pyridinium optionally having a substituent, or phosphonium optionally having a substituent.

It is preferable that the fluoropolymer aqueous dispersion after the addition of acid is substantially free from a salt of a fluorine-containing compound represented by general formula (1A) (preferably a fluorine-containing compound represented by the general formula (1), wherein $M^1$ is a metal atom, $NR^5_4$ ($R^5$ may be the same or different and may be H or an organic group having 1 to 10 carbon atoms), imidazolium optionally having a substituent, pyridinium optionally having a substituent, or phosphonium optionally having a substituent. In the aqueous dispersion, the expression "substantially free from a salt of a fluorine-containing compound represented by the general formula (1A)" means that the content of the salt of the fluorine-containing compound represented by the general formula (1A) is 500 ppb or less for all m. For example, the salt of the fluorine-containing compound of the general formula (1A) wherein m is 3 may be 400 ppb and the salt of the fluorine-containing compound wherein m is 9 may be less than 400 ppb, or the total amount of salts of fluorine-containing compounds wherein m is 3 to 19 may be 500 ppb or less.

The salt content of the fluorine-containing compound represented by the general formula (1A) may be 400 ppb or less, 300 ppb or less, 200 ppb or less, 100 ppb or less, 50 ppb or less, or 10 ppb or less for all m.

By adding an acid to adjust the pH to 4.0 or less, it is possible to obtain a fluoropolymer aqueous dispersion substantially free from the salt of the fluorine-containing compound represented by the general formula (1A) as described above.

The content of the salt of the fluorine-containing compound represented by the general formula (1A) in the fluoropolymer aqueous dispersion can be measured by, for example, an ion chromatography method (ion chromatography).

The wet fluoropolymer powder in the steps (A1) and (A2) may be obtained by coagulating a fluoropolymer aqueous dispersion obtained by polymerization, and contains, for example, water, a fluoropolymer powder and the fluorine-containing compound represented by the general formula (1A).

The water content in the wet fluoropolymer powder is not limited, and is, for example, about 0.01 to 1000% by mass based on the wet fluoropolymer powder.

The water content in the wet fluoropolymer powder is a value calculated by the following formula.

(Water content in wet fluoropolymer powder)=((mass of wet fluoropolymer powder)−(mass of fluoropolymer powder obtained by freeze-drying))/(mass of wet fluoropolymer powder)×100

The wet fluoropolymer powder in the steps (A1) and (A2) contains the fluorine-containing compound represented by the general formula (1A). The content of the fluorine-containing compound represented by the general formula (1A) is not limited. The content thereof may also be 1 ppb or more, 10 ppb or more, 100 ppb or more, 1 ppm or more, 10 ppm or more, or 100 ppm or more based on the fluoropolymer. Further, the content thereof may be 10,000 ppm or less or 1,000 ppm or less based on the fluoropolymer.

A wet fluoropolymer powder containing a fluorine-containing compound represented by the general formula (1A) can be obtained by adding an acid to adjust a pH to 4.0 or less and cause coagulation in the steps (A1) and (A2).

The wet fluoropolymer powder in the steps (B1) and (B2) may contain one fluorine-containing compound represented by the general formula (1A) or may contain two or more fluorine-containing compounds, and the production method of the present disclosure is particularly effective when the aqueous dispersion contains two or more fluorine-containing compounds.

Examples thereof include an embodiment containing a fluorine-containing compound of the general formula (1A) wherein m is 7 and a fluorine-containing compound of the general formula (1A) wherein m is 13. Further, the aqueous dispersion may contain three or more, four or more, or all fluorine-containing compounds encompassed in the general formula (1A), as long as the aqueous dispersion contains two or more of them.

The wet fluoropolymer powder in the steps (B1) and (B2) may be an aqueous dispersion containing, as the fluorine-containing compound, a fluorine-containing compound of the general formula (1A) wherein m is 7 or less and a fluorine-containing compound of the general formula (1A) wherein m is 8 or more, or may be an aqueous dispersion containing a fluorine-containing compound of the general formula (1A) wherein m is 8 or less and a fluorine-containing compound of the general formula (1A) wherein m is 9 or more.

The wet fluoropolymer powder in the steps (B1) and (B2) may be an embodiment containing fluorine-containing compounds wherein m is 3, 5, 7, 9, 11, 13, 15, 17, and 19 and not containing fluorine-containing compounds wherein m is 4, 6, 8, 10, 12, 14, 16, and 18, or may be an embodiment containing fluorine-containing compounds wherein m is 4, 6, 8, 10, 12, 14, 16, 18, and 20 and not containing fluorine-containing compounds wherein m is 3, 5, 7, 9, 11, 13, 15, 17, and 19, or may be an embodiment containing all fluorine-containing compounds wherein m is 3 to 19, among the fluorine-containing compounds encompassed in the general formula (1A).

In the production method of the present disclosure, the concentration of the fluorine-containing compound represented by the general formula (1A) in the wet fluoropolymer powder subjected to the heat treatment is not limited, and the wet fluoropolymer powder having any concentration can be treated. In the wet fluoropolymer powder, the total amount of the compounds represented by the general formula (1A) may be 0.01 ppm or more, 0.1 ppm or more, or 0.5 ppm or more based on the fluoropolymer. The total amount may also be 1 ppm or more, 5 ppm or more, 10 ppm or more, or 100 ppm or more based on the fluoropolymer. When the concentration of the fluorine-containing compound represented by the general formula (1A) in the wet fluoropolymer powder is a certain level or more as described above, the production method of the present disclosure exhibits higher removal efficiency.

Further, in the wet fluoropolymer powder, the fluorine-containing compound represented by the general formula (1A) may be 10,000 ppm or less, 5,000 ppm or less, and 2,000 ppm or less, 1,000 ppm or less, 500 ppm or less, and 200 ppm or less based on the fluoropolymer. When the total amount of the fluorine-containing compounds in the wet fluoropolymer powder is within the above range, the removal efficiency can be further improved.

As used herein, ppm and ppb mean values obtained in terms of mass unless otherwise specified.

The amount of at least one of the fluorine-containing compounds represented by the general formula (1A) wherein m is 3, 4, 5, 6, 7, 8, 9, 10, 11, 12, 13, 14, 15, 16, 17, 18 or 19 may be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1A) in the wet fluoropolymer powder is a certain level or more as disclosure exhibits higher removal efficiency.

Further, the amount of at least one of the fluorine-containing compounds represented by the general formula (1A) wherein m is 3, 4, 5, 6, 7, 8, 9, 10, 11, 12, 13, 14, 15, 16, 17, 18 or 19 may be 10,000 ppm or less, 5,000 ppm or less, 2,000 ppm or less, 1,000 ppm or less, 500 ppm or less, or 200 ppm or less based on the fluoropolymer. When the amount of the fluorine-containing compounds in the wet fluoropolymer powder is within the above range, the removal efficiency can be further improved.

The amount of the fluorine-containing compound of the general formula (1A) wherein m is 3 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1A) in the wet fluoropolymer powder is a certain level or more as described above, the removal method of the present disclosure exhibits higher removal efficiency.

Further, the amount of the fluorine-containing compound of the general formula (1A) wherein m is 3 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the wet fluoropolymer powder is within the above range, the removal efficiency can be further improved.

The amount of the fluorine-containing compound of the general formula (1A) wherein m is 4 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1A) in the wet fluoropolymer powder is a certain level or more as described above, the production method of the present disclosure exhibits higher removal efficiency.

Further, the amount of the fluorine-containing compound of the general formula (1A) wherein m is 4 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the wet fluoropolymer powder is within the above range, the removal efficiency can be further improved.

The amount of the fluorine-containing compound of the general formula (1A) wherein m is 5 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1A) in the wet fluoropolymer powder is a certain level or more as described above, the removal method of the present disclosure exhibits higher removal efficiency.

Further, the amount of the fluorine-containing compound of the general formula (1A) wherein m is 5 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the wet fluoropolymer powder is within the above range, the removal efficiency can be further improved.

The amount of the fluorine-containing compound of the general formula (1A) wherein m is 6 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1A) in the wet fluoropolymer powder is a certain level or more as described above, the removal method of the present disclosure exhibits higher removal efficiency.

Further, the amount of the fluorine-containing compound of the general formula (1A) wherein m is 6 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the wet fluoropolymer powder is within the above range, the removal efficiency can be further improved.

The amount of the fluorine-containing compound of the general formula (1A) wherein m is 7 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1A) in the wet fluoropolymer powder is a certain level or more as described above, the removal method of the present disclosure exhibits higher removal efficiency.

Further, the amount of the fluorine-containing compound of the general formula (1A) wherein m is 7 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the wet fluoropolymer powder is within the above range, the removal efficiency can be further improved.

The amount of the fluorine-containing compound of the general formula (1A) wherein m is 8 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1A) in the wet fluoropolymer powder is a certain level or more as described above, the removal method of the present disclosure exhibits higher removal efficiency.

Further, the amount of the fluorine-containing compound of the general formula (1A) wherein m is 8 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the wet fluoropolymer powder is within the above range, the removal efficiency can be further improved.

The amount of the fluorine-containing compound of the general formula (1A) wherein m is 9 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1A) in the wet fluoropolymer powder is a certain level or more as disclosure exhibits higher removal efficiency.

Further, the amount of the fluorine-containing compound of the general formula (1A) wherein m is 9 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the wet fluoropolymer powder is within the above range, the removal efficiency can be further improved.

The amount of the fluorine-containing compound of the general formula (1A) wherein m is 10 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1A) in the wet fluoropolymer powder is a certain level or more as described above, the removal method of the present disclosure exhibits higher removal efficiency.

Further, the amount of the fluorine-containing compound of the general formula (1A) wherein m is 10 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the wet fluoropolymer powder is within the above range, the removal efficiency can be further improved.

The amount of the fluorine-containing compound of the general formula (1A) wherein m is 11 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1A) in the wet fluoropolymer powder is a certain level or more as described above, the removal method of the present disclosure exhibits higher removal efficiency.

Further, the amount of the fluorine-containing compound of the general formula (1A) wherein m is 11 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the wet fluoropolymer powder is within the above range, the removal efficiency can be further improved.

The amount of the fluorine-containing compound of the general formula (1A) wherein m is 12 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1A) in the wet fluoropolymer powder is a certain level or more as described above, the removal method of the present disclosure exhibits higher removal efficiency.

Further, the amount of the fluorine-containing compound of the general formula (1A) wherein m is 12 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the wet fluoropolymer powder is within the above range, the removal efficiency can be further improved.

The amount of the fluorine-containing compound of the general formula (1A) wherein m is 13 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1A) in the wet fluoropolymer powder is a certain level or more as described above, the removal method of the present disclosure exhibits higher removal efficiency.

Further, the amount of the fluorine-containing compound of the general formula (1A) wherein m is 13 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the wet fluoropolymer powder is within the above range, the removal efficiency can be further improved.

The amount of the fluorine-containing compound of the general formula (1A) wherein m is 14 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1A) in the wet fluoropolymer powder is a certain level or more as described above, the removal method of the present disclosure exhibits higher removal efficiency.

Further, the amount of the fluorine-containing compound of the general formula (1A) wherein m is 14 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the wet fluoropolymer powder is within the above range, the removal efficiency can be further improved.

The amount of the fluorine-containing compound of the general formula (1A) wherein m is 15 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1A) in the wet fluoropolymer powder is a certain level or more as described above, the removal method of the present disclosure exhibits higher removal efficiency.

Further, the amount of the fluorine-containing compound of the general formula (1A) wherein m is 15 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the wet fluoropolymer powder is within the above range, the removal efficiency can be further improved.

The amount of the fluorine-containing compound of the general formula (1A) wherein m is 16 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1A) in the wet fluoropolymer powder is a certain level or more as described above, the removal method of the present disclosure exhibits higher removal efficiency.

Further, the amount of the fluorine-containing compound of the general formula (1A) wherein m is 16 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the wet fluoropolymer powder is within the above range, the removal efficiency can be further improved.

The amount of the fluorine-containing compound of the general formula (1A) wherein m is 17 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1A) in the wet fluoropolymer powder is a certain level or more as described above, the removal method of the present disclosure exhibits higher removal efficiency.

Further, the amount of the fluorine-containing compound of the general formula (1A) wherein m is 17 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the wet fluoropolymer powder is within the above range, the removal efficiency can be further improved.

The amount of the fluorine-containing compound of the general formula (1A) wherein m is 18 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1A) in the wet fluoropolymer powder is a certain level or more as described above, the removal method of the present disclosure exhibits higher removal efficiency.

Further, the amount of the fluorine-containing compound of the general formula (1A) wherein m is 18 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the wet fluoropolymer powder is within the above range, the removal efficiency can be further improved.

The amount of the fluorine-containing compound of the general formula (1A) wherein m is 19 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1A) in the wet fluoropolymer powder is a certain level or more as disclosure exhibits higher removal efficiency.

Further, the amount of the fluorine-containing compound of the general formula (1A) wherein m is 19 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the wet fluoropolymer powder is within the above range, the removal efficiency can be further improved.

It is preferable that the wet fluoropolymer powder is substantially free from a salt of a fluorine-containing compound represented by general formula (1A) (preferably a fluorine-containing compound represented by the general formula (1), wherein $M^1$ is a metal atom, $NR^5_4$ ($R^5$ may be the same or different and may be H or an organic group having 1 to 10 carbon atoms), imidazolium optionally having a substituent, pyridinium optionally having a substituent, or phosphonium optionally having a substituent. In the wet fluoropolymer powder, the expression "substantially free from a salt of a fluorine-containing compound represented by the general formula (1A)" means that the content of the salt of the fluorine-containing compound represented by the general formula (1A) is 500 ppb or less for all m. For example, the salt of the fluorine-containing compound of the general formula (1A) wherein m is 3 may be 400 ppb and the salt of the fluorine-containing compound wherein m is 9 may be less than 400 ppb, or the total amount of salts of fluorine-containing compounds wherein m is 3 to 19 may be 500 ppb or less.

The salt content of the fluorine-containing compound represented by the general formula (1A) may be 500 ppb or less, 400 ppb or less, 300 ppb or less, 200 ppb or less, 100 ppb or less, 50 ppb or less, 10 ppb or less, or less than 10 ppb for all m.

The content of the salt of the fluorine-containing compound represented by the general formula (1A) in the wet fluoropolymer powder can be measured by, for example, an ion chromatography method (ion chromatography).

Pigment-containing or filler-containing fluoropolymer powder in which pigments and fillers are uniformly mixed can also be obtained by adding pigments for coloring and various fillers for improving mechanical properties before or during the coagulation.

The first production method of the present disclosure may also include a step of recovering the coagulated wet fluoropolymer powder after the step (A1) and before the step (B1).

The second production method of the present disclosure may also include a step of recovering the coagulated wet fluoropolymer powder after the step (A2) and before the step (B2).

The fluoropolymer aqueous dispersion in the step (A1) is obtained by polymerizing a fluoromonomer using a carboxylic acid type hydrocarbon surfactant. The first production method of the present disclosure preferably includes a polymerization step of polymerizing a fluoromonomer in an aqueous medium in the presence of a carboxylic acid type hydrocarbon surfactant to obtain a fluoropolymer aqueous dispersion.

The fluoropolymer aqueous dispersion in the step (A2) is obtained by polymerizing a fluoromonomer using an aliphatic carboxylic acid type hydrocarbon surfactant. The second production method of the present disclosure preferably includes a polymerization step of polymerizing a fluoromonomer in an aqueous medium in the presence of an aliphatic carboxylic acid type hydrocarbon surfactant to obtain a fluoropolymer aqueous dispersion.

In the production method of the present disclosure, a fluoropolymer aqueous dispersion containing a fluorine-containing compound represented by general formula (1) and substantially free from a compound represented by general formula (2) can be obtained by a polymerization step described below using a carboxylic acid type hydrocarbon surfactant or an aliphatic carboxylic acid type hydrocarbon surfactant.

In the following description, where the term "carboxylic acid type hydrocarbon surfactant" is used simply, "aliphatic carboxylic acid type hydrocarbon surfactant" shall be applied in the second production method of the present disclosure.

The fluoromonomer preferably has at least one double bond.

The fluoromonomer is preferably at least one selected from the group consisting of tetrafluoroethylene [TFE], hexafluoropropylene [HFP], chlorotrifluoroethylene [CTFE], vinyl fluoride, vinylidene fluoride [VDF], trifluoroethylene, fluoroalkylvinyl ether, fluoroalkylethylene, fluoroalkylallyl ether, trifluoropropylene, pentafluoropropylene, trifluorobutene, tetrafluoroisobutene, hexafluoroisobutene, fluoromonomers represented by the general formula (100): $CHX^{101}=CX^{102}Rf^{101}$ (wherein one of $X^{101}$ and $X^{102}$ is H and the other is F, and $Rf^{101}$ is a linear or branched fluoroalkyl group having 1 to 12 carbon atoms), fluorinated vinyl heterocyclic compounds, and monomers providing a crosslinking site.

The fluoroalkylvinyl ether is preferably at least one selected from the group consisting of a fluoromonomer represented by the general formula (110): $CF_2=CF-ORf^{111}$ wherein $Rf^{111}$ represents a perfluoroorganic group; a fluoromonomer represented by the general formula (120): $CF_2=CF-OCH_2-Rf^{121}$
wherein $Rf^{121}$ is a perfluoroalkyl group having 1 to 5 carbon atoms;
a fluoromonomer represented by the general formula (130): $CF_2=CFOCF_2ORf^{131}$ wherein $Rf^{131}$ is a linear or branched perfluoroalkyl group having 1 to 6 carbon atoms, a cyclic perfluoroalkyl group having 5 to 6 carbon atoms, and a linear or branched perfluorooxyalkyl group having 5 to 6 carbon atoms and 1 to 3 oxygen atoms;
a fluoromonomer represented by the general formula (140): $CF_2=CFO(CF_2CF(Y^{141})O)_m(CF_2)_nF$
wherein $Y^{141}$ represents a fluorine atom or a trifluoromethyl group; m is an integer of 1 to 4; and n is an integer of 1 to 4; and
a fluoromonomer represented by the general formula (150): $CF_2=CF-O-(CF_2CFY^{151}-O)_n-(CFY^{152})_m-A^{151}$ wherein $Y^{151}$ represents a fluorine atom, a chlorine atom, $-SO_2F$ group, or a perfluoroalkyl group; the perfluoroalkyl group may contain an etheric oxygen and $-SO_2F$ group; n represents an integer of 0 to 3; $nY^{151}$ may be the same or different; $Y^{152}$ represents a fluorine atom, a chlorine atom, or a $-SO_2F$ group; m represents an integer of 1 to 5; $mY^{152}$ may be the same or different; $A^{151}$ represents $-SO_2X^{151}$, $-COZ^{151}$ or $-POZ^{152}Z^{153}$; $X^{151}$ represents F, Cl, Br, I, $-OR^{151}$ or $-NR^{152}R^{153}$; $Z^{151}$, $Z^{152}$, and $Z^{153}$ are the same or different and represent $-NR^{154}R^{155}$ or $-OR^{156}$; and $R^{151}$, $R^{152}$, $R^{153}$, $R^{154}$, $R^{155}$, and $R^{156}$ are the same or different and represent H, ammonium, an alkali metal, an alkyl group optionally containing a fluorine atom, an aryl group, or a sulfonyl-containing group.

The "perfluoroorganic group" as used herein means an organic group in which all hydrogen atoms bonded to the carbon atoms are replaced by fluorine atoms. The perfluoroorganic group optionally has ether oxygen.

Examples of the fluoromonomer represented by the general formula (110) include a fluoromonomer in which $Rf^{111}$ is a perfluoroalkyl group having 1 to 10 carbon atoms. The perfluoroalkyl group preferably has 1 to 5 carbon atoms.

Examples of the perfluoroorganic group in the general formula (110) include a perfluoromethyl group, a perfluoroethyl group, a perfluoropropyl group, a perfluorobutyl group, a perfluoropentyl group, and a perfluorohexyl group.

Examples of the fluoromonomer represented by the general formula (110) further include those represented by the general formula (110) in which $Rf^{111}$ is a perfluoro(alkoxyalkyl) group having 4 to 9 carbon atoms; those in which $Rf^{111}$ is a group represented by the following formula:

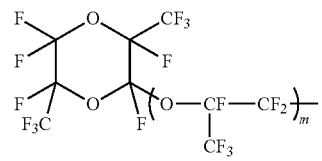

wherein m represents 0 or an integer of 1 to 4; and those in which $Rf^{111}$ is a group represented by the following formula:

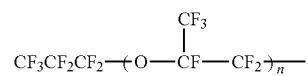

wherein n is an integer of 1 to 4.

Among the fluoromonomers represented by the general formula (110), preferred is a fluoromonomer represented by the general formula (160): $CF_2=CF-ORf^{161}$ wherein $Rf^{161}$ represents a perfluoroalkyl group having 1 to 10 carbon atoms. $Rf^{161}$ is preferably a perfluoroalkyl group having 1 to 5 carbon atoms.

The fluoroalkyl vinyl ether is preferably at least one selected from the group consisting of fluoromonomers represented by the general formulas (160), (130), and (140).

The fluoromonomer represented by the general formula (160) is preferably at least one selected from the group consisting of perfluoro(methyl vinyl ether), perfluoro(ethyl vinyl ether), and perfluoro(propyl vinyl ether), and more preferably at least one selected from the group consisting of perfluoro(methyl vinyl ether) and perfluoro(propyl vinyl ether).

The fluoromonomer represented by the general formula (130) is preferably at least one selected from the group consisting of $CF_2=CFOCF_2OCF_3$, $CF_2=CFOCF_2OCF_2CF_3$, and $CF_2=CFOCF_2OCF_2CF_2OCF_3$.

The fluoromonomer represented by the general formula (140) is preferably at least one selected from the group consisting of $CF_2=CFOCF_2CF(CF_3)O(CF_2)_3F$, $CF_2=CFO(CF_2CF(CF_3)O)_2(CF_2)_3F$, and $CF_2=CFO(CF_2CF(CF_3)O)_2(CF_2)_2F$.

The fluoromonomer represented by the general formula (150) is preferably at least one selected from the group consisting of $CF_2=CFOCF_2CF_2SO_2F$, $CF_2=CFOCF_2CF(CF_3)OCF_2CF_2SO_2F$, $CF_2=CFOCF_2CF(CF_2CF_2SO_2F)OCF_2CF_2SO_2F$, and $CF_2=CFOCF_2CF(SO_2F)$ 2.

The fluoromonomer represented by the general formula (100) is preferably a fluoromonomer in which $Rf^{101}$ is a linear fluoroalkyl group, and more preferably a fluoromonomer in which $Rf^{101}$ is a linear perfluoroalkyl group. $Rf^{101}$ preferably has 1 to 6 carbon atoms. Examples of the fluoromonomer represented by the general formula (100) include $CH_2=CFCF_3$, $CH_2=CFCF_2CF_3$, $CH_2=CFCF_2CF_2CF_3$, $CH_2=CFCF_2CF_2CF_2H$, $CH_2=CFCF_2CF_2CF_2CF_3$, $CHF=CHCF_3$ (E-form), and $CHF=CHCF_3$ (Z-form), among which preferred is 2,3,3,3-tetrafluoropropylene represented by $CH_2=CFCF_3$.

The fluoroalkylethylene is preferably
a fluoroalkylethylene represented by the general formula (170): $CH_2=CH-(CF_2)_n-X^{171}$
(wherein $X^{171}$ is H or F and n is an integer of 3 to 10), more preferably at least one selected from the group consisting of $CH_2=CH-C_4F_9$ and $CH_2=CH-C_6F_{13}$.

An example of the fluoroalkylallyl ether is
a fluoromonomer represented by the general formula (240): $CF_2=CF-CF_2-ORf^{111}$
wherein $Rf^{111}$ represents a perfluoroorganic group.

$Rf^{111}$ of the general formula (240) is the same as $Rf^{111}$ of the general formula (110). $Rf^{111}$ is preferably a perfluoroalkyl group having 1 to 10 carbon atoms or a perfluoroalkoxyalkyl group having 1 to 10 carbon atoms. The fluoroalkylallyl ether represented by the general formula (240) is preferably at least one selected from the group consisting of $CF_2=CF-CF_2-O-CF_3$, $CF_2=CF-CF_2-O-C_2F_5$, $CF_2=CF-CF_2-O-C_3F_7$, and $CF_2=CF-CF_2-O-C_4F_9$, more preferably at least one selected from the group consisting of $CF_2=CF-CF_2-O-C_2F_5$, $CF_2=CF-CF_2-O-C_3F_7$, and $CF_2=CF-CF_2-O-C_4F_9$, and still more preferably $CF_2=CF-CF_2-O-CF_2CF_2CF_3$.

An example of the fluorinated vinyl heterocyclic compound is a fluorinated vinyl heterocyclic compound represented by the general formula (230):

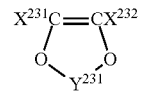

wherein $X^{231}$ and $X^{232}$ are each independently F, Cl, a methoxy group, or a fluorinated methoxy group; and $Y^{231}$ is represented by the formula $Y^{232}$ or $Y^{233}$:

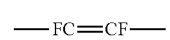 (Y²³²)

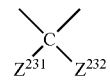 (Y²³³)

wherein $Z^{231}$ and $Z^{232}$ are each independently F or a fluorinated alkyl group having 1 to 3 carbon atoms.

The monomer providing a crosslinking site is preferably at least one selected from the group consisting of:

a fluoromonomer represented by the general formula (180): $CX^{181}_2=CX^{182}-R_f^{181}CHR^{181}X^{183}$
wherein $X^{181}$ and $X^{182}$ are each independently a hydrogen atom, a fluorine atom, or $CH_3$, and $Rf^{181}$ is a fluoroalkylene group, a perfluoroalkylene group, a fluoro(poly)oxyalkylene group or a perfluoro(poly)oxyalkylene group, $R^{181}$ is a hydrogen atom or $CH_3$, and $X^{183}$ is an iodine atom or a bromine atom;

a fluoromonomer represented by the general formula (190): $CX^{191}_2=CX^{192}-Rf^{191}X^{193}$
wherein $X^{191}$ and $X^{192}$ are each independently a hydrogen atom, a fluorine atom, or $CH_3$, and $Rf^{191}$ is a fluoroalkylene group, a perfluoroalkylene group, a fluoropolyoxyalkylene group or a perfluoropolyoxyalkylene group, and $X^{193}$ is an iodine atom or a bromine atom;

a fluoromonomer represented by the general formula (200): $CF_2=CFO(CF_2CF(CF_3)O)_m(CF_2)_n-X^{201}$
wherein m is an integer of 0 to 5, n is an integer of 1 to 3, and $X^{201}$ is a cyano group, a carboxyl group, an alkoxycarbonyl group, an iodine atom, a bromine atom, or $-CH_2I$;

a fluoromonomer represented by the general formula (210): $CH_2=CFCF_2O(CF(CF_3)CF_2O)_m(CF(CF_3))_n-X^{211}$
wherein m is an integer of 0 to 5, n is an integer of 1 to 3, and $X^{211}$ is a cyano group, a carboxyl group, an alkoxycarbonyl group, an iodine atom, a bromine atom, or $-CH_2OH$; and a monomer represented by the general formula (220): $CR^{221}R^{222}=CR^{223}-Z^{221}-CR^{224}=CR^{225}R^{226}$
wherein $R^{221}$, $R^{222}$, $R^{223}$, $R^{224}$, $R^{225}$, and $R^{226}$ are the same or different and a hydrogen atom or an alkyl group having 1 to 5 carbon atoms; $Z^{221}$ is a linear or branched alkylene group having 1 to 18 carbon atoms and optionally having an oxygen atom, a cycloalkylene group having 3 to 18 carbon atoms, an at least partially fluorinated alkylene or oxyalkylene group having 1 to 10 carbon atoms, or a (per) fluoropolyoxyalkylene group which is represented by:

(wherein Q is an alkylene group or an oxyalkylene group; p is 0 or 1; and m/n is 0.2 to 5) and has a molecular weight of 500 to 10,000.

$X^{183}$ and $X^{193}$ are preferably an iodine atom. $Rf^{181}$ and $Rf^{191}$ are preferably a perfluoroalkylene group having 1 to 5 carbon atoms. $R^{181}$ is preferably a hydrogen atom. $X^{201}$ is preferably a cyano group, an alkoxycarbonyl group, an iodine atom, a bromine atom, or —$CH_2I$. $X^{211}$ is preferably a cyano group, an alkoxycarbonyl group, an iodine atom, a bromine atom, or —$CH_2OH$.

The monomer providing a crosslinking site is preferably at least one selected from the group consisting of $CF_2$=$CFOCF_2CF(CF_3)OCF_2CF_2CN$, $CF_2$=$CFOCF_2CF(CF_3)OCF_2CF_2COOH$, $CF_2$=$CFOCF_2CF(CF_3)OCF_2CF_2CH_2I$, $CF_2$=$CFOCF_2CF_2CH_2I$, $CH_2$=$CFCF_2OCF(CF_3)CF_2OCF(CF_3)$ CN, $CH_2$=$CFCF_2OCF(CF_3)CF_2OCF(CF_3)$ COOH, $CH_2$=$CFCF_2OCF(CF_3)CF_2OCF(CF_3)CH_2OH$, $CH_2$=$CHCF_2CF_2I$, $CH_2$=$CH(CF_2)_2CH$=$CH_2$, $CH_2$=$CH(CF_2)_6CH$=$CH_2$, and $CF_2$=$CFO(CF_2)_5CN$, and more preferably at least one selected from the group consisting of $CF_2$=$CFOCF_2CF(CF_3)OCF_2CF_2CN$ and $CF_2$=$CFOCF_2CF_2CH_2I$.

In the steps, the fluoromonomer and the fluorine-free monomer may be polymerized. Examples of the fluorine-free monomer include hydrocarbon monomers having reactivity with the fluoromonomer. Examples of the hydrocarbon monomer include alkenes such as ethylene, propylene, butylene and isobutylene; alkyl vinyl ethers such as ethyl vinyl ether, propyl vinyl ether, butyl vinyl ether, isobutyl vinyl ether and cyclohexyl vinyl ether; vinyl esters such as vinyl acetate, vinyl propionate, vinyl n-butyrate, vinyl isobutyrate, vinyl valerate, vinyl pivalate, vinyl caproate, vinyl caprylate, vinyl caprate, vinyl versatate, vinyl laurate, vinyl myristate, vinyl palmitate, vinyl stearate, vinyl benzoate, vinyl para-tert-butylbenzoate, vinyl cyclohexanecarboxylate, vinyl monochloroacetate, vinyl adipate, vinyl acrylate, vinyl methacrylate, vinyl crotonate, vinyl sorbate, vinyl cinnamate, vinyl undecylenate, vinyl hydroxyacetate, vinyl hydroxypropioate, vinyl hydroxybutyrate, vinyl hydroxyvalerate, hydroxyisobutyrate, and vinyl hydroxycyclohexanecarboxylate; alkyl allyl ethers such as ethyl allyl ether, propyl allyl ether, butyl allyl ether, isobutyl allyl ether, and cyclohexyl allyl ether; and alkyl allyl esters such as ethyl allyl ester, propyl allyl ester, butyl allyl ester, isobutyl allyl ester, and cyclohexyl allyl ester.

The fluorine-free monomer may also be a functional group-containing hydrocarbon monomer (excluding the monomer providing a crosslinking site). Examples of the functional group-containing hydrocarbon monomer include hydroxyalkyl vinyl ethers such as hydroxyethyl vinyl ether, hydroxypropyl vinyl ether, hydroxybutyl vinyl ether, hydroxyisobutyl vinyl ether, and hydroxycyclohexyl vinyl ether; fluorine-free monomers having a carboxyl group such as itaconic acid, succinic acid, succinic anhydride, fumaric acid, fumaric anhydride, crotonic acid, maleic acid, maleic anhydride, and perfluorobutenoic acid; fluorine-free monomers having a glycidyl group such as glycidyl vinyl ether and glycidyl allyl ether; fluorine-free monomers having an amino group such as aminoalkyl vinyl ether and aminoalkyl allyl ether; and fluorine-free monomers having an amide group such as (meth)acrylamide and methylol acrylamide.

In the polymerization step, particles of a desired fluoropolymer can be obtained by polymerizing one or two or more of the fluoromonomers.

The polymerization temperature and the polymerization pressure in the polymerization step are determined as appropriate in accordance with the types of the monomers used, the molecular weight of the target fluoropolymer, and the reaction rate.

For example, the polymerization temperature is preferably 10 to 150° C. The polymerization temperature is more preferably 30° C. or higher, and still more preferably 50° C. or higher. Further, the polymerization temperature is more preferably 120° C. or lower, and still more preferably 100° C. or lower.

The polymerization pressure is preferably 0.05 to 10 MPaG. The polymerization pressure is more preferably 0.3 MPaG or more, and still more preferably 0.5 MPaG or more. The polymerization pressure is more preferably 5.0 MPaG or less, and still more preferably 3.0 MPaG or less. In particular, from the viewpoint of improving the yield of the fluoropolymer, the polymerization pressure is preferably 1.0 MPaG or more, more preferably 1.2 MPaG or more, further preferably 1.5 MPaG or more, still further preferably 1.8 MPaG or more, and particularly preferably 2.0 MPaG or more.

In the polymerization step, the amount of the carboxylic acid type hydrocarbon surfactant at the initiation of the polymerization is preferably more than 50 ppm based on the aqueous medium. The amount of the hydrocarbon surfactant at the initiation of polymerization is preferably 60 ppm or more, more preferably 70 ppm or more, still more preferably 80 ppm or more, further preferably 100 ppm or more, and still further preferably 150 ppm or more, particularly preferably 200 ppm or more, and most preferably 300 ppm or more. The upper limit thereof is preferably, but not limited to, 10,000 ppm, and more preferably 5,000 ppm, for example. When the amount of the carboxylic acid type hydrocarbon surfactant at the initiation of polymerization is in the above range, it is possible to obtain an aqueous dispersion having a smaller average primary particle size and superior stability.

It can be said that the polymerization is initiated when the gas fluoromonomer in the reactor became fluoropolymer and the pressure drop in the reactor occurred. U.S. Pat. No. 3,391,099 (Punderson) discloses a dispersion polymerization of tetrafluoroethylene in an aqueous medium comprising two separate steps of a polymerization process comprising: first the formation of a polymer nucleus as a nucleation site, and then the growth step comprising polymerization of the established particles. The polymerization is usually initiated when both the monomer to be polymerized and the polymerization initiator are charged in the reactor. Further, in the present disclosure, an additive related to the formation of a nucleation site is referred to as a nucleating agent.

The polymerization step is a step of polymerizing a fluoromonomer such as tetrafluoroethylene in an aqueous medium in the presence of a carboxylic acid type hydrocarbon surfactant, and the step also preferably includes a step of continuously adding the carboxylic acid type hydrocarbon surfactant.

Adding the carboxylic acid type hydrocarbon surfactant continuously means, for example, adding the carboxylic acid type hydrocarbon surfactant not all at once, but adding over time and without interruption or adding in portions.

In the polymerization step, the step of continuously adding the carboxylic acid type hydrocarbon surfactant is preferably a step of starting to add the carboxylic acid type hydrocarbon surfactant to the aqueous medium when the concentration of the fluoropolymer formed in the aqueous medium is less than 0.60% by mass. Further, the carboxylic acid type hydrocarbon surfactant is more preferably started to be added when the concentration is 0.50% by mass or less, still more preferably started to be added when the concentration is 0.36% by mass or less, further preferably started to be added when the concentration is 0.30% by mass or less, still further preferably started to be added when the concentration is 0.20% by mass or less, particularly preferably started to be added when the concentration is 0.10% by mass or less, and most preferably started to be added when the polymerization is initiated. The concentration is based on the total amount of the aqueous medium and the fluoropolymer.

By including the above steps, it is possible to obtain an aqueous dispersion having a smaller average primary particle size and superior stability.

In the step of continuously adding the carboxylic acid type hydrocarbon surfactant, the amount of the carboxylic acid type hydrocarbon surfactant added is preferably 0.01 to 10% by mass based on 100% by mass of the aqueous medium. The lower limit thereof is more preferably 0.05% by mass, still more preferably 0.1% by mass while the upper limit thereof is more preferably 5% by mass, still more preferably 1% by mass.

In the step of performing emulsion polymerization of a fluoromonomer in an aqueous medium in the presence of the carboxylic acid type hydrocarbon surfactant, the amount of the carboxylic acid type hydrocarbon surfactant is preferably large, and preferably 0.01 to 10% by mass of the aqueous medium based on 100% by mass of the aqueous medium. The lower limit thereof is more preferably 0.1% by mass, while the upper limit thereof is more preferably 1% by mass.

The carboxylic acid type hydrocarbon surfactant is usually an anion surfactant having a hydrophilic moiety formed of carboxylate and a hydrophobic moiety which is a long chain hydrocarbon moiety such as alkyl.

The carboxylic acid type hydrocarbon surfactant may be an aliphatic-type carboxylic acid type hydrocarbon surfactant or a carboxylic acid type hydrocarbon surfactant other than the aliphatic-type.

As used herein, the term "aliphatic-type carboxylic acid type hydrocarbon surfactant" means a carboxylic acid type hydrocarbon surfactant free from a carbonyl group which is not in a carboxyl group or an ester group. Further, the ester group means a group represented by —COO— or —OCO—.

Examples of the carboxylic acid type hydrocarbon surfactant include a compound (α) represented by the following formula (α):

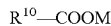

wherein $R^{10}$ is a monovalent organic group containing 1 or more carbon atoms; and M is H, a metal atom, $NR^{11}_4$, imidazolium optionally having a substituent, pyridinium optionally having a substituent, or phosphonium optionally having a substituent, wherein $R^{11}$ is H or an organic group and may be the same or different. $R^{11}$ is preferably H or a $C_{1-10}$ organic group, and more preferably H or a $C_{1-4}$ organic group.

From the viewpoint of surfactant function, the number of carbon atoms in $R^{10}$ is preferably 2 or more, and more preferably 3 or more. From the viewpoint of water-solubility, the number of carbon atoms in $R^{10}$ is preferably 29 or less, and more preferably 23 or less.

Examples of the metal atom as M include alkali metals (Group 1) and alkaline earth metals (Group 2), and preferred is Na, K, or Li. M is preferably H, a metal atom, or $NR^{11}_4$, more preferably H, an alkali metal (Group 1), an alkaline earth metal (Group 2), or $NR^{11}_4$, still more preferably H, Na, K, Li, or $NH_4$, further preferably Na, K, or $NH_4$, particularly preferably Na or $NH_4$, and most preferably $NH_4$.

Examples of the carboxylic acid type hydrocarbon surfactant include anionic surfactants represented by $R^{12}$—COOM, wherein $R^{12}$ is a linear or branched, alkyl group, alkenyl group, alkylene group, or alkenylene group having 1 or more carbon atoms and optionally having a substituent, or a cyclic alkyl group, alkenyl group, alkylene group, or alkenylene group having 3 or more carbon atoms and optionally having a substituent, each of which optionally contains an ether bond; when having 3 or more carbon atoms, $R^{12}$ optionally contains a monovalent or divalent heterocycle, or optionally forms a ring; and M is as described above.

Specific examples thereof include a compound represented by $CH_3$—$(CH_2)_n$—COOM, wherein n is an integer of 2 to 28, and M is as described above.

From the viewpoint of emulsion stability, the carboxylic acid type hydrocarbon surfactant is preferably free from a carbonyl group which is not in a carboxyl group.

Further, the surfactant used in the polymerization preferably contains only a carboxylic acid type hydrocarbon surfactant free from a carbonyl group.

Preferred examples of the carboxylic acid type hydrocarbon surfactant free from a carbonyl group include a compound represented by the following formula (α):

wherein R is an alkyl group, an alkenyl group, an alkylene group, or an alkenylene group, each of which optionally contains an ether bond; M is H, a metal atom, $NR^{11}_4$, imidazolium optionally having a substituent, pyridinium optionally having a substituent, or phosphonium optionally having a substituent; and $R^{11}$ is the same or different and is H or an organic group having 1 to 10 carbon atoms.

In the formula (α), R is preferably an alkyl group or an alkenyl group, each of which optionally contains an ether group. The alkyl group or alkenyl group for R may be linear or branched. The number of carbon atoms in R may be, but is not limited to, 2 to 29. The alkyl group or alkenyl group in R is preferably free from a carbonyl group which is not in an ester group.

When the alkyl group is linear, the number of carbon atoms in R is preferably 3 to 29, and more preferably 5 to 23. When the alkyl group is branched, the number of carbon atoms in R is preferably 5 to 35, and more preferably 11 to 23.

When the alkenyl group is linear, the number of carbon atoms in R is preferably 2 to 29, and more preferably 9 to 23. When the alkenyl group is branched, the number of carbon atoms in R is preferably 2 to 29, more preferably 3 to 29, and still more preferably 9 to 23.

Examples of the alkyl group and alkenyl group include a methyl group, an ethyl group, an isobutyl group, a t-butyl group, and a vinyl group.

Examples of the carboxylic acid type hydrocarbon surfactant include butylic acid, valeric acid, caproic acid, enanthic acid, caprylic acid, pelargonic acid, capric acid, lauric acid, myristic acid, pentadecylic acid, palmitic acid, palmitoleic acid, margaric acid, stearic acid, oleic acid, vaccenic acid, linoleic acid, (9,12,15)-linolenic acid, (6,9,12)linolenic acid, eleostearic acid, arachidic acid, 8,11-eicosadienoic acid, mead acid, arachidonic acid, behenic acid, lignoceric acid, nervonic acid, cerotic acid, montanic acid, melissic acid, crotonic acid, myristoleic acid, palmitoleic acid, sapienoic acid, oleic acid, elaidic acid, vaccenic acid, gadoleic acid, eicosenoic acid, erucic acid, nervonic acid, linoleic acid, eicosadienoic acid, docosadienoic acid, linolenic acid, pinolenic acid, α-eleostearic acid, β-eleostearic acid, mead acid, dihomo-γ-linolenic acid, eicosatrienoic acid, stearidonic acid, arachidonic acid, eicosatetraenoic acid, adrenic acid, boseopentaenoic acid, eicosapentaenoic acid, osbond acid, sardine acid, tetracosapentaenoic acid, docosahexaenoic acid, nisinic acid, and salts thereof.

In particular, at least one selected from the group consisting of lauric acid, capric acid, myristic acid, pentadecylic acid, palmitic acid, and salts thereof is preferred, lauric acid and a salt thereof are more preferred, a salt of lauric acid is particularly preferred, and sodium laurate or ammonium laurate is most preferred.

Examples of the salts include, but are not limited to, those in which hydrogen of the carboxyl group is a metal atom, $NR^{11}_4$, imidazolium optionally having a substituent, pyridinium optionally having a substituent, or phosphonium optionally having a substituent as M in the formula described above.

Examples of the carboxylic acid type hydrocarbon surfactant include a surfactant (a) represented by the following formula (a):

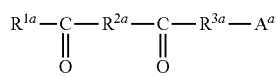

wherein $R^{1a}$ is a linear or branched alkyl group having 1 or more carbon atoms or a cyclic alkyl group having 3 or more carbon atoms, with a hydrogen atom bonded to a carbon atom therein being optionally replaced by a hydroxy group or a monovalent organic group containing an ester bond, optionally contains a carbonyl group when having 2 or more carbon atoms, and optionally contains a monovalent or divalent heterocycle or optionally forms a ring when having 3 or more carbon atoms; $R^{2a}$ and $R^{3a}$ are each independently a single bond or a divalent linking group; the total number of carbon atoms of $R^{1a}$, $R^{2a}$, and $R^{3a}$ is 5 or more; $A^a$ is $—COOX^a$, wherein $X^a$ is H, a metal atom, $NR^{4a}_4$, imidazolium optionally having a substituent, pyridinium optionally having a substituent, or phosphonium optionally having a substituent, wherein $R^{4a}$ is H or an organic group and may be the same or different; and any two of $R^{1a}$, $R^{2a}$, and $R^{3a}$ optionally bind to each other to form a ring; and a surfactant (b) represented by the following formula (b):

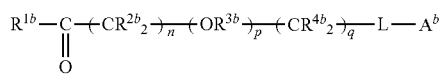

wherein $R^{1b}$ is a linear or branched alkyl group having 1 or more carbon atoms and optionally having a substituent or a cyclic alkyl group having 3 or more carbon atoms and optionally having a substituent, and optionally contains a monovalent or divalent heterocycle or optionally forms a ring when having 3 or more carbon atoms; $R^{2b}$ and $R^{4b}$ are each independently H or a substituent; $R^{3b}$ is an alkylene group having 1 to 10 carbon atoms and optionally having a substituent; n is an integer of 1 or more; p and q are each independently an integer of 0 or more; $A^b$ is $—COOX^b$, wherein $X^b$ is H, a metal atom, $NR^{5b}_4$, imidazolium optionally having a substituent, pyridinium optionally having a substituent, or phosphonium optionally having a substituent, wherein $R^{5b}$ is H or an organic group and may be the same or different; any two of $R^{1b}$, $R^{2b}$, $R^{3b}$, and $R^{4b}$ optionally bind to each other to form a ring; L is a single bond, $—CO_2—B—*$, $—OCO—B—*$, $—CONR^{6b}—B—*$, $—NR^{6b}CO—B—*$, or $—CO—$ other than the carbonyl groups in $—CO_2—B—$, $—OCO—B—$, $—CONR^{6b}—B—$, and $—NR^{6b}CO—B—$, wherein B is a single bond or an alkylene group having 1 to 10 carbon atoms and optionally having a substituent, $R^{6b}$ is H or an alkyl group having 1 to 4 carbon atoms and optionally having a substituent; and * indicates the side bonded to $A^b$ in the formula.

The surfactant (a) will be described below.

In the formula (α), $R^{1a}$ is a linear or branched alkyl group having 1 or more carbon atoms or a cyclic alkyl group having 3 or more carbon atoms.

When having 3 or more carbon atoms, the alkyl group optionally contains a carbonyl group ($—C(=O)—$) between two carbon atoms. When having 2 or more carbon atoms, the alkyl group optionally contains the carbonyl group at an end of the alkyl group. In other words, acyl groups such as an acetyl group represented by $CH_3—C(=O)—$ are also included in the alkyl group.

When having 3 or more carbon atoms, the alkyl group optionally contains a monovalent or divalent heterocycle, or optionally forms a ring. The heterocycle is preferably an unsaturated heterocycle, more preferably an oxygen-containing unsaturated heterocycle, and examples thereof include a furan ring. In $R^{1a}$, a divalent heterocycle may be present between two carbon atoms, or a divalent heterocycle may be present at an end and bind to $—C(=O)—$, or a monovalent heterocycle may be present at an end of the alkyl group.

The "number of carbon atoms" in the alkyl group as used herein includes the number of carbon atoms constituting the carbonyl groups and the number of carbon atoms constituting the heterocycles. For example, the number of carbon atoms in the group represented by $CH_3—C(=O)—CH_2—$ is 3, the number of carbon atoms in the group represented by $CH_3—C(=O)—C_2H_4—C(=O)—C_2H_4—$ is 7, and the number of carbon atoms in the group represented by $CH_3—C(=O)—$ is 2.

In the alkyl group, a hydrogen atom bonded to a carbon atom may be replaced by a functional group such as a hydroxy group ($—OH$) or a monovalent organic group containing an ester bond. Still, it is preferably not replaced by any functional group.

An example of the monovalent organic group containing an ester bond is a group represented by the formula: $—O—C(=O)—R^{101a}$, wherein $R^{101a}$ is an alkyl group. In the alkyl group, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

In the formula (α), $R^{2a}$ and $R^{3a}$ are each independently a single bond or a divalent linking group.

Preferably, $R^{2a}$ and $R^{3a}$ are each independently a single bond, or a linear or branched alkylene group having 1 or more carbon atoms, or a cyclic alkylene group having 3 or more carbon atoms.

The alkylene group constituting $R^{2a}$ and $R^{3a}$ is preferably free from a carbonyl group.

In the alkylene group, a hydrogen atom bonded to a carbon atom may be replaced by a functional group such as a hydroxy group ($—OH$) or a monovalent organic group containing an ester bond. Still, it is preferably not replaced by any functional group.

An example of the monovalent organic group containing an ester bond is a group represented by the formula: —O—C(=O)—R$^{102a}$, wherein R$^{102a}$ is an alkyl group.

In the alkylene group, 75% or less of the hydrogen atoms bonded to the carbon atoms may be replaced by halogen atoms, 50% or less thereof may be replaced by halogen atoms, or 25% or less thereof may be replaced by halogen atoms. The alkylene group is preferably a non-halogenated alkylene group free from halogen atoms such as fluorine atoms and chlorine atoms.

The total number of carbon atoms of R$^{1a}$, R$^{2a}$, and R$^{3a}$ is 5 or more. The total number of carbon atoms is preferably 7 or more, more preferably 9 or more, and preferably 20 or less, more preferably 18 or less, still more preferably 15 or less.

Any two of R$^{1a}$, R$^{2a}$, and R$^{3a}$ optionally bind to each other to form a ring.

In the formula (α), A$^a$ is —COOX$^a$, wherein X$^a$ is H, a metal atom, NR$^{4a}_4$, imidazolium optionally having a substituent, pyridinium optionally having a substituent, or phosphonium optionally having a substituent, wherein R$^{4a}$ is H or an organic group and may be the same or different; and R$^{4a}$ is preferably H or an organic group having 1 to 10 carbon atoms, and more preferably H or an organic group having 1 to 4 carbon atoms. Examples of the metal atom include alkali metals (Group 1) and alkaline earth metals (Group 2), and preferred is Na, K, or Li.

X$^a$ is preferably H, an alkali metal (Group 1), an alkaline earth metal (Group 2), or NR$^{4a}_4$, more preferably H, Na, K, Li, or NH$_4$ because they are easily dissolved in water, still more preferably Na, K, or NH$_4$ because they are more easily dissolved in water, particularly preferably Na or NH$_4$, and most preferably NH$_4$ because it can be easily removed. When X$^a$ is NH$_4$, the solubility of the surfactant in an aqueous medium is excellent, and the metal component is unlikely to remain in the fluoropolymer or the final product.

R$^{1a}$ is preferably a linear or branched alkyl group having 1 to 8 carbon atoms and free from a carbonyl group, a cyclic alkyl group having 3 to 8 carbon atoms and free from a carbonyl group, a linear or branched alkyl group having 2 to 45 carbon atoms and containing 1 to 10 carbonyl groups, a cyclic alkyl group having 3 to 45 carbon atoms and containing a carbonyl group, or an alkyl group having 3 to 45 carbon atoms and containing a monovalent or divalent heterocycle.

R$^{1a}$ is more preferably a group represented by the following formula:

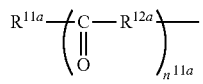

wherein n$^{11a}$ is an integer of 0 to 10; R$^{11a}$ is a linear or branched alkyl group having 1 to 5 carbon atoms or a cyclic alkyl group having 3 to 5 carbon atoms; R$^{12a}$ is an alkylene group having 0 to 3 carbon atoms; and when n$^{11a}$ is an integer of 2 to 10, each R$^{12a}$ may be the same or different.

n$^{11a}$ is preferably an integer of 0 to 5, more preferably an integer of 0 to 3, and still more preferably an integer of 1 to 3.

The alkyl group for R$^{11a}$ is preferably free from a carbonyl group.

In the alkyl group for R$^{11a}$, a hydrogen atom bonded to a carbon atom may be replaced by a functional group such as a hydroxy group (—OH) or a monovalent organic group containing an ester bond. Still, it is preferably not replaced by any functional group.

An example of the monovalent organic group containing an ester bond is a group represented by the formula: —O—C(=O)—R$^{103a}$, wherein R$^{103a}$ is an alkyl group.

In the alkyl group for R$^{11a}$, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

R$^{12a}$ is an alkylene group having 0 to 3 carbon atoms. The alkylene group preferably has 1 to 3 carbon atoms.

The alkylene group for R$^{12a}$ may be either linear or branched.

The alkylene group for R$^{12a}$ is preferably free from a carbonyl group. R$^{12a}$ is more preferably an ethylene group (—C$_2$H$_4$—) or a propylene group (—C$_3$H$_6$—).

In the alkylene group for R$^{12a}$, a hydrogen atom bonded to a carbon atom may be replaced by a functional group such as a hydroxy group (—OH) or a monovalent organic group containing an ester bond. Still, it is preferably not replaced by any functional group.

An example of the monovalent organic group containing an ester bond is a group represented by the formula: —O—C(=O)—R$^{104a}$, wherein R$^{104a}$ is an alkyl group.

In the alkylene group for R$^{12a}$, 75% or less of the hydrogen atoms bonded to the carbon atoms may be replaced by halogen atoms, 50% or less thereof may be replaced by halogen atoms, or 25% or less thereof may be replaced by halogen atoms. The alkylene group is preferably a non-halogenated alkylene group free from halogen atoms such as fluorine atoms and chlorine atoms.

R$^{2a}$ and R$^{3a}$ are preferably each independently an alkylene group having 1 or more carbon atoms and free from a carbonyl group, more preferably an alkylene group having 1 to 3 carbon atoms and free from a carbonyl group, and still more preferably an ethylene group (—C$_2$H$_4$—) or a propylene group (—C$_3$H$_6$—).

Next, the surfactant (b) will be described below.

In the formula (b), R$^{1b}$ is a linear or branched alkyl group having 1 or more carbon atoms and optionally having a substituent or a cyclic alkyl group having 3 or more carbon atoms and optionally having a substituent.

When having 3 or more carbon atoms, the alkyl group optionally contains a monovalent or divalent heterocycle, or optionally forms a ring. The heterocycle is preferably an unsaturated heterocycle, more preferably an oxygen-containing unsaturated heterocycle, and examples thereof include a furan ring. In R$^{1b}$, a divalent heterocycle may be present between two carbon atoms, or a divalent heterocycle may be present at an end and bind to —C(=O)—, or a monovalent heterocycle may be present at an end of the alkyl group.

The "number of carbon atoms" in the alkyl group as used herein includes the number of carbon atoms constituting the heterocycles.

The substituent which may be contained in the alkyl group for R$^{1b}$ is preferably a halogen atom, a linear or branched alkyl group having 1 to 10 carbon atoms, or a cyclic alkyl group having 3 to 10 carbon atoms, or a hydroxy group, and particularly preferably a methyl group or an ethyl group.

The alkyl group for R$^{1b}$ is preferably free from a carbonyl group.

In the alkyl group, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

The alkyl group preferably does not have any substituent.

$R^{1b}$ is preferably a linear or branched alkyl group having 1 to 10 carbon atoms and optionally having a substituent or a cyclic alkyl group having 3 to 10 carbon atoms and optionally having a substituent, more preferably a linear or branched alkyl group having 1 to 10 carbon atoms and free from a carbonyl group or a cyclic alkyl group having 3 to 10 carbon atoms and free from a carbonyl group, still more preferably a linear or branched alkyl group having 1 to 10 carbon atoms and not having a substituent, further preferably a linear or branched alkyl group having 1 to 3 carbon atoms and not having a substituent, particularly preferably a methyl group (—$CH_3$) or an ethyl group (—$C_2H_5$), and most preferably a methyl group (—$CH_3$).

In the formula (b), $R^{2b}$ and $R^{4b}$ are each independently H or a substituent. A plurality of $R^{2b}$ and $R^{4b}$ may be the same or different.

The substituent for each of $R^{2b}$ and $R^{4b}$ is preferably a halogen atom, a linear or branched alkyl group having 1 to 10 carbon atoms, a cyclic alkyl group having 3 to 10 carbon atoms, or a hydroxy group, and particularly preferably a methyl group or an ethyl group.

The alkyl group for each of $R^{2b}$ and $R^{4b}$ is preferably free from a carbonyl group. In the alkyl group, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

The alkyl group preferably does not have any substituent.

The alkyl group for each of $R^{2b}$ and $R^{4b}$ is preferably a linear or branched alkyl group having 1 to 10 carbon atoms and free from a carbonyl group or a cyclic alkyl group having 3 to 10 carbon atoms and free from a carbonyl group, more preferably a linear or branched alkyl group having 1 to 10 carbon atoms and free from a carbonyl group, still more preferably a linear or branched alkyl group having 1 to 3 carbon atoms and not having a substituent, and particularly preferably a methyl group (—$CH_3$) or an ethyl group (—$C_2H_5$).

$R^{2b}$ and $R^{4b}$ are preferably each independently H or a linear or branched alkyl group having 1 to 10 carbon atoms and free from a carbonyl group, more preferably H or a linear or branched alkyl group having 1 to 3 carbon atoms and not having a substituent, further preferably H, a methyl group (—$CH_3$), or an ethyl group (—$C_2H_5$), and particularly preferably H.

In the formula (b), $R^{3b}$ is an alkylene group having 1 to 10 carbon atoms and optionally having a substituent. When a plurality of $R^{3b}$ are present, they may be the same or different.

The alkylene group is preferably free from a carbonyl group.

In the alkylene group, 75% or less of the hydrogen atoms bonded to the carbon atoms may be replaced by halogen atoms, 50% or less thereof may be replaced by halogen atoms, or 25% or less thereof may be replaced by halogen atoms. The alkylene group is preferably a non-halogenated alkyl group free from halogen atoms such as fluorine atoms and chlorine atoms.

The alkylene group preferably does not have any substituent.

The alkylene group is preferably a linear or branched alkylene group having 1 to 10 carbon atoms and optionally having a substituent or a cyclic alkylene group having 3 to 10 carbon atoms and optionally having a substituent, preferably a linear or branched alkylene group having 1 to 10 carbon atoms and free from a carbonyl group or a cyclic alkylene group having 3 to 10 carbon atoms and free from a carbonyl group, more preferably a linear or branched alkylene group having 1 to 10 carbon atoms and not having a substituent, and still more preferably a methylene group (—$CH_2$—), an ethylene group (—$C_2H_4$—), an isopropylene group (—$CH(CH_3)CH_2$—), or a propylene group (—$C_3H_6$—).

Any two of $R^{1b}$, $R^{2b}$, $R^{3b}$, and $R^{4b}$ optionally bind to each other to form a ring.

In the formula (b), n is an integer of 1 or more. In the formula, n is preferably an integer of 1 to 40, more preferably an integer of 1 to 30, and still more preferably an integer of 5 to 25.

In the formula (b), p and q are each independently an integer of 0 or more. p is preferably an integer of 0 to 10, more preferably 0 or 1. q is preferably an integer of 0 to 10, more preferably an integer of 0 to 5.

The sum of n, p, and q is preferably an integer of 6 or more. The sum of n, p, and q is more preferably an integer of 8 or more. The sum of n, p, and q is also preferably an integer of 60 or less, more preferably an integer of 50 or less, and still more preferably an integer of 40 or less.

In the formula (b), $A^b$ is —$COOX^b$, wherein $X^b$ is H, a metal atom, $NR^{5b}_4$, imidazolium optionally having a substituent, pyridinium optionally having a substituent, or phosphonium optionally having a substituent, wherein $R^{5b}$ is H or an organic group and may be the same or different. $R^{5b}$ is preferably H or an organic group having 1 to 10 carbon atoms, and more preferably H or an organic group having 1 to 4 carbon atoms. Examples of the metal atom include alkali metals (Group 1) and alkaline earth metals (Group 2), and preferred is Na, K, or Li. $X^b$ may be a metal atom or $NR^{5b}_4$, wherein $R^{5b}$ is defined as described above.

$X^b$ is preferably H, an alkali metal (Group 1), an alkaline earth metal (Group 2), or $NR^{5b}_4$, more preferably H, Na, K, Li, or $NH_4$ because they are easily dissolved in water, still more preferably Na, K, or $NH_4$ because they are more easily dissolved in water, particularly preferably Na or $NH_4$, and most preferably $NH_4$ because it can be easily removed. When $X^b$ is $NH_4$, the solubility of the surfactant in an aqueous medium is excellent, and the metal component is unlikely to remain in the fluoropolymer or the final product.

In the formula (b), L is a single bond, —$CO_2$—B—*, —OCO—B—*, —$CONR^{6b}$—B—*, —$NR^{6b}CO$—B—*, or —CO— other than the carbonyl groups in —$CO_2$—B—, —OCO—B—, —$CONR^{6b}$—B—, and —$NR^{6b}CO$—B—, wherein B is a single bond or an alkylene group having 1 to 10 carbon atoms and optionally having a substituent, $R^{6b}$ is H or an alkyl group having 1 to 4 carbon atoms and optionally having a substituent. The alkylene group more preferably has 1 to 5 carbon atoms. $R^{6b}$ is more preferably H or a methyl group. * indicates the side bonded to $A^b$ in the formula.

L is preferably a single bond.

The surfactant preferably has a $^1$H-NMR spectrum in which all peak intensities observed in a chemical shift range of 2.0 to 5.0 ppm give an integral value of 10% or more.

The surfactant preferably has a $^1$H-NMR spectrum in which all peak intensities observed in a chemical shift range of 2.0 to 5.0 ppm give an integral value within the above range. In this case, the surfactant preferably has a ketone structure in the molecule.

The integral value of the surfactant is more preferably 15 or more, and preferably 95 or less, more preferably 80 or less, and still more preferably 70 or less.

The integral value is determined using a heavy water solvent at room temperature. The heavy water content is adjusted to 4.79 ppm.

Further, the carboxylic acid type hydrocarbon surfactant in the present disclosure may be a compound represented by the general formula (1-0) (hereinafter also referred to as "surfactant (1-0)"):

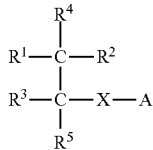

General Formula (1-0)

wherein $R^1$ to $R^5$ each represent H or a monovalent substituent, with the proviso that at least one of $R^1$ and $R^3$ represents a group represented by the general formula: —Y—$R^6$ and at least one of $R^2$ and $R^5$ represents a group represented by the general formula: —X-A or a group represented by the general formula: —Y—$R^6$;

X is the same or different at each occurrence and represents a divalent linking group or a bond;

A is the same or different at each occurrence and represents —COOM, wherein M is H, a metal atom, $NR^7_4$, imidazolium optionally having a substituent, pyridinium optionally having a substituent, or phosphonium optionally having a substituent, wherein $R_7$ is H or an organic group; and Y is the same or different at each occurrence and represents a divalent linking group selected from the group consisting of —S(=O)$_2$—, —O—, —COO—, —OCO—, —CONR$^8$—, and —NR$^8$CO—, or a bond, wherein $R^8$ is H or an organic group;

$R^6$ is the same or different at each occurrence and represents an alkyl group having 1 or more carbon atoms optionally containing, between carbon atoms, at least one selected from the group consisting of a carbonyl group, an ester group, an amide group, and a sulfonyl group; and any two of $R^1$ to $R^5$ optionally bind to each other to form a ring, with the proviso that, when $R^6$ does not contain any of a carbonyl group, an ester group, an amide group, and a sulfonyl group, X is a divalent linking group containing at least one selected from the group consisting of a carbonyl group, an ester group, an amide group, and a sulfonyl group.

In the formula, $R^1$ to $R^5$ each represent H or a monovalent substituent, with the proviso that at least one of $R^1$ and $R^3$ represents a group represented by the general formula: —Y—$R^6$ and at least one of $R^2$ and $R^5$ represents a group represented by the general formula: —X-A or a group represented by the general formula: —Y—$R^6$. Any two of $R^1$ to $R^5$ optionally bind to each other to form a ring.

The substituent which may be contained in the alkyl group for $R^1$ is preferably a halogen atom, a linear or branched alkyl group having 1 to 10 carbon atoms, or a cyclic alkyl group having 3 to 10 carbon atoms, or a hydroxy group, and particularly preferably a methyl group or an ethyl group.

The alkyl group for $R^1$ is preferably free from a carbonyl group.

In the alkyl group, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

The alkyl group preferably does not have any substituent.

$R^1$ is preferably a linear or branched alkyl group having 1 to 10 carbon atoms and optionally having a substituent or a cyclic alkyl group having 3 to 10 carbon atoms and optionally having a substituent, more preferably a linear or branched alkyl group having 1 to 10 carbon atoms and free from a carbonyl group or a cyclic alkyl group having 3 to 10 carbon atoms and free from a carbonyl group, still more preferably a linear or branched alkyl group having 1 to 10 carbon atoms and not having a substituent, further preferably a linear or branched alkyl group having 1 to 3 carbon atoms and not having a substituent, particularly preferably a methyl group (—CH$_3$) or an ethyl group (—C$_2$H$_5$), and most preferably a methyl group (—CH$_3$).

The monovalent substituent is preferably a group represented by the general formula: —Y—$R^6$, a group represented by the general formula: —X-A, —H, and an alkyl group having 1 to 20 carbon atoms and optionally having a substituent, —NH$_2$, —NHR$^9$ (wherein $R^9$ is an organic group), —OH, —COOR$^9$ (wherein $R^9$ is an organic group) or —OR$^9$ ($R^9$ is an organic group). The alkyl group preferably has 1 to 10 carbon atoms.

$R^9$ is preferably an alkyl group having 1 to 10 carbon atoms or an alkylcarbonyl group having 1 to 10 carbon atoms, and more preferably an alkyl group having 1 to 4 carbon atoms or an alkylcarbonyl group having 1 to 4 carbon atoms.

In the formula, X is the same or different at each occurrence and represents a divalent linking group or a bond.

When $R^6$ does not contain none of a carbonyl group, an ester group, an amide group, and a sulfonyl group, X is preferably a divalent linking group containing at least one selected from the group consisting of a carbonyl group, an ester group, an amide group, and a sulfonyl group.

X is preferably a divalent linking group containing at least one bond selected from the group consisting of —CO—, —S(=O)$_2$—, —O—, —COO—, —OCO—, —S(=O)$_2$—O—, —O—S(=O)$_2$—, —CONR$^8$—, and —NR$^8$CO—, a C$_{1-10}$ alkylene group, or a bond. $R^8$ represents H or an organic group.

$R^8$ is preferably H or a C$_{1-10}$ organic group, more preferably H or a C$_{1-4}$ organic group, and still more preferably H.

In the formula, A is the same or different at each occurrence and represents-COOM, wherein M is H, a metal atom, $NR^7_4$, imidazolium optionally having a substituent, pyridinium optionally having a substituent, or phosphonium optionally having a substituent, wherein $R_7$ is H or an organic group; and the four $R^7$ may be the same as or different from each other.

$R^7$ is preferably H or a $C_{1-10}$ organic group, and more preferably H or a $C_{1-4}$ organic group.

Examples of the metal atom include alkali metals (Group 1) and alkaline earth metals (Group 2), and preferred is Na, K, or Li.

M is preferably H, a metal atom, or $NR^7_4$, more preferably H, an alkali metal (Group 1), an alkaline earth metal (Group 2), or $NR^7_4$, still more preferably H, Na, K, Li, or $NH_4$, further preferably Na, K, or $NH_4$, particularly preferably Na or $NH_4$, and most preferably $NH_4$.

In the formula, Y is the same or different at each occurrence and represents a divalent linking group selected from the group consisting of —S(=O)$_2$—, —O—, —COO—, —OCO—, —CONR$^8$—, and —NR$^8$CO—, or a bond, wherein $R^8$ represents H or an organic group.

Y is preferably a divalent linking group selected from the group consisting of a bond, —O—, —COO—, —OCO—, —CONR$^8$—, and —NR$^8$CO—, more preferably a divalent linking group selected from the group consisting of a bond, —COO—, and —OCO—.

$R^8$ is preferably H or a $C_{1-10}$ organic group, more preferably H or a $C_{1-4}$ organic group, and still more preferably H.

In the formula, $R^6$ is the same or different at each occurrence and represents an alkyl group having 1 or more carbon atoms optionally containing, between carbon atoms, at least one selected from the group consisting of a carbonyl group, an ester group, an amide group, and a sulfonyl group. The number of carbon atoms of the organic group in $R^6$ is preferably 2 or more, preferably 20 or less, more preferably 2 to 20, and still more preferably 2 to 10.

When the number of carbon atoms is 2 or more, the alkyl group for $R^6$ optionally contains, between carbon atoms, one or two or more of at least one selected from the group consisting of a carbonyl group, an ester group, an amide group, and a sulfonyl group, but the alkyl group contains no such groups at both ends. In the alkyl group for $R^6$, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

$R^6$ is preferably
a group represented by the general formula: —$R^{10}$—CO—$R^{11}$,
a group represented by the general formula: —$R^{10}$—COO—$R^{11}$,
a group represented by the general formula: —$R^{11}$,
a group represented by the general formula: —$R^{10}$—NR$^8$CO—$R^{11}$, or
a group represented by the general formula: —$R^{10}$—CONR$^8$—$R^{11}$,
wherein $R^8$ is H or an organic group; $R^{10}$ is an alkylene group; and $R^{11}$ is an alkyl group optionally having a substituent.

$R^6$ is more preferably a group represented by the general formula: —$R^{10}$—CO—$R^{11}$.

$R^8$ is preferably H or a $C_{1-10}$ organic group, more preferably H or a $C_{1-4}$ organic group, and still more preferably H.

The alkylene group for $R^{10}$ preferably has 1 or more, and more preferably 3 or more carbon atoms, and preferably 20 or less, more preferably 12 or less, still more preferably 10 or less, and particularly preferably 8 or less carbon atoms.

Further, the alkylene group for $R^{10}$ preferably has 1 to 20, more preferably 1 to 10, and still more preferably 3 to 10 carbon atoms.

The alkyl group for $R^{11}$ may have 1 to 20 carbon atoms, and preferably has 1 to 15, more preferably 1 to 12, still more preferably 1 to 10, further preferably 1 to 8, still further preferably 1 to 6, still much more preferably 1 to 3, particularly preferably 1 or 2, and most preferably 1 carbon atom. The alkyl group for $R^{11}$ preferably consists only of primary carbons, secondary carbons, and tertiary carbons, and particularly preferably consists only of primary carbons and secondary carbons. In other words, $R^{11}$ is preferably a methyl group, an ethyl group, an n-propyl group, or an isopropyl group, and most preferably a methyl group.

The surfactant (1) is preferably a compound represented by the following general formula (1-1), a compound represented by the following general formula (1-2), or a compound represented by the following general formula (1-3), more preferably a compound represented by the general formula (1-1) or a compound represented by the general formula (1-2):

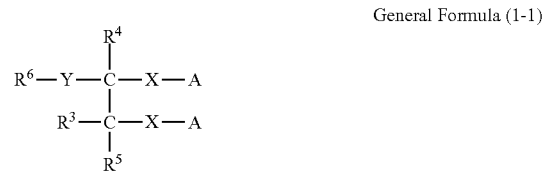

General Formula (1-1)

wherein $R^3$ to $R^6$, X, A, and Y are defined as described above.

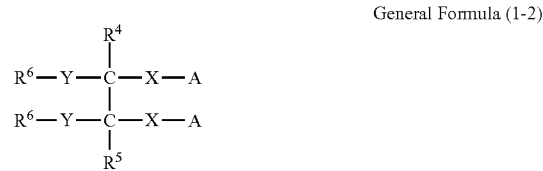

General Formula (1-2)

wherein $R^4$ to $R^6$, X, A, and Y are defined as described above.

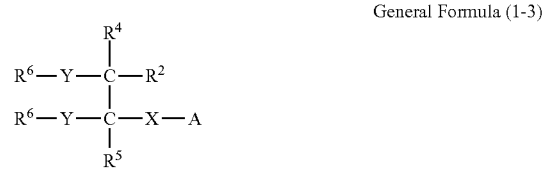

General Formula (1-3)

wherein $R^2$, $R^4$ to $R^6$, X, A, and Y are defined as described above.

The group represented by the general formula: —X-A is preferably
—COOM,
—$R^{12}$COM,
—OCO—$R^{12}$—COOM,
—COO—$R^{12}$—COOM,
—CONR$^8$—$R^{12}$—COMM,
—NR$^8$CO—$R^{12}$—COOM, or
—OS(=O)$_2$—$R^{12}$—COOM, wherein $R^8$ and M are defined as described above; and $R^{12}$ is an alkylene group having 1 to 10 carbon atoms.

In the alkylene group for $R^{12}$, 75% or less of the hydrogen atoms bonded to the carbon atoms may be replaced by halogen atoms, 50% or less thereof may be replaced by halogen atoms, or 25% or less thereof may be replaced by halogen atoms. The alkylene group is preferably a non-halogenated alkylene group free of halogen atoms such as fluorine atoms and chlorine atoms.

The group represented by the general formula: —Y—$R^6$ is preferably

- a group represented by the general formula: —$R^{10}$—CO—$R^{11}$,
- a group represented by the general formula: —OCO—$R^{10}$—CO—$R^{11}$,
- a group represented by the general formula: —COO—$R^{10}$—CO—$R^{11}$,
- a group represented by the general formula: —OCO—$R^{10}$—COO—$R^{11}$,
- a group represented by the general formula: —COO—$R^{11}$,
- a group represented by the general formula: —$NR^8$CO—$R^{10}$—CO—$R^{11}$, or
- a group represented by the general formula: —$CONR^8$—$R^{10}$—$NR^8CO$—$R^{11}$, wherein $R^8$, $R^{10}$, and $R^{11}$ are defined as described above.

In the formula, $R^4$ and $R^5$ are each independently preferably H or an alkyl group having 1 to 4 carbon atoms.

In the alkyl group for $R^4$ and $R^5$, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

$R^3$ in the general formula (1-1) is preferably H or an alkyl group having 1 to 20 carbon atoms and optionally having a substituent, more preferably H or an alkyl group having 1 to 20 carbon atoms and having no substituent, and still more preferably H.

In the alkyl group for $R^3$, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

$R^2$ in the general formula (1-3) is preferably H, OH, or an alkyl group having 1 to 20 carbon atoms and optionally having a substituent, more preferably H, OH, or an alkyl group having 1 to 20 carbon atoms and having no substituent, and still more preferably H or OH.

In the alkyl group for $R^2$, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

Among the carboxylic acid type hydrocarbon surfactants, examples of the aliphatic carboxylic acid type hydrocarbon surfactant include the surfactant represented by the formula (α) described above and a surfactant represented by the following formula (1-0A):

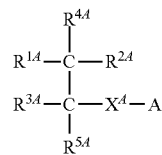

wherein $R^{1A}$ to $R^{5A}$ are H, a monovalent hydrocarbon group optionally containing, between carbon atoms, an ester group, or a group represented by general formula: —$X^A$-A, with the proviso that at least one of $R^{2A}$ or $R^{5A}$ represents a group represented by the general formula: —$X^A$-A;

$X^A$ is the same or different at each occurrence and represents a divalent hydrocarbon group or a bond;

A is the same or different at each occurrence and represents —COOM, wherein M is H, a metal atom, $NR^7_4$, imidazolium optionally having a substituent, pyridinium optionally having a substituent, or phosphonium optionally having a substituent, wherein $R_7$ is H or an organic group; and any two of $R^{1A}$ to $R^{5A}$ may be bonded to each other to form a ring.

In the general formula (1-0A), in $R^{1A}$ to $R^{5A}$, the monovalent hydrocarbon group optionally containing, between carbon atoms, an ester group preferably has 1 to 50 carbon atoms, and more preferably 5 to 20 carbon atoms. The hydrocarbon groups in $R^{1A}$ to $R^{5A}$ are free from a carbonyl group which is not in a carboxyl group or an ester group. Any two of $R^{1A}$ to $R^{5A}$ optionally bind to each other to form a ring. The monovalent hydrocarbon group optionally containing, between carbon atoms, an ester group is preferably an alkyl group.

In the formula, in $X^A$, the number of carbon atoms in the divalent hydrocarbon group is 1 to 50, and more preferably 5 to 20. The hydrocarbon group in $X^A$ is free from a carbonyl group. Examples of the divalent hydrocarbon group include an alkylene group and an alkanediyl group, and preferred is an alkylene group.

In the general formula (1-0A), any one of $R^{2A}$ and $R^{5A}$ is preferably a group represented by the formula: —$X^A$-A, and more preferably, $R^{2A}$ is a group represented by the formula: —$X^A$-A.

In a preferred embodiment, in the general formula (1-0A), $R^{2A}$ is a group represented by the general formula: —$X^A$-A, and $R^{1A}$, $R^{3A}$, $R^{4A}$ and $R^{5A}$ are H. In this case, $X^A$ is preferably a bond or an alkylene group having 1 to 5 carbon atoms.

Another preferred embodiment is an embodiment in which in general formula (1-0A), $R^{2A}$ is a group represented by general formula: —$X^A$-A, $R^{1A}$ and $R^{3A}$ are groups represented by —$Y^A$—$R^6$, $Y^A$ is the same or different at each occurrence, and is —COO—, —OCO—, or a bond, and $R^6$ is the same or different at each occurrence, and is an alkyl group having 1 or more carbon atoms. In this case, it is preferable that $R^{4A}$ and $R^{5A}$ are H.

Examples of the aliphatic carboxylic acid type hydrocarbon surfactant represented by the general formula (1-0A) include glutaric acid or a salt thereof, adipic acid or a salt thereof, pimelic acid or a salt thereof, suberic acid or a salt thereof, azelaic acid or a salt thereof, and sebacic acid or a salt thereof.

The aliphatic carboxylic acid-type hydrocarbon surfactant represented by the general formula (1-0A) may be a 2-chain 2-hydrophilic type synthetic surfactant, and examples of the gemini type surfactant include geminiserf (CHUKYO YUSHI CO., LTD.), Gemsurf α142 (carbon number: 12, lauryl group), Gemsurf α102 (carbon number: 10), and Gemsurf α182 (carbon number: 14).

The production method of the present disclosure may include, before the polymerization step, a step of subjecting the carboxylic acid type hydrocarbon surfactant (in the second production method, an aliphatic carboxylic acid type hydrocarbon surfactant) to a radical treatment or oxidation treatment.

The radical treatment may be any treatment that generates radicals in the carboxylic acid type hydrocarbon surfactant, for example, a treatment in which deionized water and the carboxylic acid type hydrocarbon surfactant are added to the reactor, the reactor is sealed, the system is purged with nitrogen, the reactor is heated and pressurized, a polymerization initiator is charged, the reactor is stirred for a certain time, and then the pressure is released until the pressure in the reactor decreases to the atmospheric pressure, and the reactor is cooled. The oxidation treatment is a treatment in which an oxidizing agent is added to the carboxylic acid type hydrocarbon surfactant. Examples of the oxidizing agent include oxygen, ozone, hydrogen peroxide solution, manganese (IV) oxide, potassium permanganate, potassium dichromate, nitric acid, and sulfur dioxide. In order to promote the radical treatment or the oxidation treatment, the radical treatment or the oxidation treatment may be performed in a pH-adjusted aqueous solution. The pH of the aqueous solution for radical treatment or oxidation treatment is preferably less than 7, and the pH of the aqueous solution can be adjusted by using, for example, sulfuric acid, nitric acid, hydrochloric acid or the like.

In the production method of the present disclosure, the polymerization step may further include a step of adjusting the pH of the aqueous medium containing the carboxylic acid type hydrocarbon surfactant (in the second production method, aliphatic carboxylic acid type hydrocarbon surfactant) to basic. Regarding the basicity, the pH is preferably 7.1 or higher, more preferably 7.5 or higher, still more preferably 8.0 or higher, particularly preferably 8.5 or higher, and still further preferably 9.0 or higher. By adjusting the pH to basic, the surfactant abilities can be increased. The step of adjusting the pH may be performed before or after the step of performing the radical treatment or the oxidation treatment on the carboxylic acid type hydrocarbon surfactant, and is preferably performed thereafter. Examples of the method of adjusting the pH include, but are not limited to, a method of adding a pH adjuster to the aqueous medium. Examples of the pH adjuster include ammonia, NaOH, potassium hydroxide, sodium carbonate, potassium carbonate, ammonium carbonate, sodium hydrogen carbonate, potassium hydrogen carbonate, ammonium hydrogen carbonate, sodium phosphate, potassium phosphate, sodium citrate, potassium citrate, ammonium citrate, sodium gluconate, potassium gluconate, and ammonium gluconate. The pH can be measured by a pH meter manufactured by Orion.

In the production method of the present disclosure, at least one carboxylic acid type hydrocarbon surfactant may be used for the polymerization. In the production method of the present disclosure, two or more of the carboxylic acid type hydrocarbon surfactants may be used as the surfactant in combination, and a surfactant other than the carboxylic acid type hydrocarbon surfactants may also be used in combination therewith insofar as the surfactant is volatile or is allowed to remain in a molded body formed from the fluoropolymer or the like.

Examples of the other surfactants include nonionic surfactants and silicone-based surfactants.

The nonionic surfactant is preferably at least one selected from the group consisting of:

a compound represented by the general formula (240):

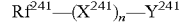

wherein $Rf^{241}$ is a partially fluorinated alkyl group or fully fluorinated alkyl group having 1 to 12 carbon atoms; n is 0 or 1; $X^{241}$ is —O—, —COO—, or —OCO—; $Y^{241}$ is —$(CH_2)_pH$, —$(CH_2)$ pOH, or —$(OR^{241})_q$ $(OR^{242})_rOH$; p is an integer of 1 to 12; q is an integer of 1 to 12; r is an integer of 0 to 12; and $R^{241}$ and $R^{242}$ are each an alkylene group having 2 to 4 carbon atoms, with the proviso that $R^{241}$ and $R^{242}$ are different from each other;

a block polymer represented by the general formula (250):

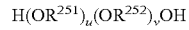

wherein $R^{251}$ and $R^{252}$ are each an alkylene group having 1 to 4 carbon atoms; u and v are each an integer of 1 to 5, with the proviso that $R^{251}$ and $R^{252}$ are different from each other;

a nonionic polymer having a hydrophobic group containing a hydrocarbon group having 8 to 20 carbon atoms and a hydrophilic group containing a polyalkylene oxide in the molecule; and a silicon compound represented by the general formula (260):

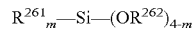

wherein $R^{261}$ is an alkyl group having 1 to 12 carbon atoms; $R^{262}$ is an alkyl group having 1 to 4 carbon atoms; and m is an integer of 1 to 3.

Specific examples of the block polymer represented by the general formula (250) include block polymers composed of at least two segments selected from the group consisting of polyoxyethylene, polyoxypropylene, and polyoxybutylene. Examples thereof include polyoxyethylene-polyoxypropylene block polymers and polyoxyethylene-polyoxybutylene block polymers, and not only A-B block polymers but also A-B-A block polymers are preferred. More preferably, use of a polyoxyethylene-polyoxypropylene block polymer or a polyoxypropylene-polyoxyethylene-polyoxypropylene block polymer allows to prepare a stable fluoropolymer dispersion at a high concentration. In addition, the content of the polyoxyethylene segment is preferably 10 to 50% in view of reducing generation of agglomerates considered to be caused by re-agglomeration, and more preferably 20 to 40% because it allows for the preparation of low viscosity fluoropolymer dispersions. The polyoxyethylene segment may have a molecular weight of, but not limited to, 1,000 to 7,000 g/mol, and in particular, the use of a polyoxyethylene segment having a molecular weight of 2,500 to 6,500 g/mol allows to prepare a dispersion having a low viscosity and excellent dispersibility.

Examples of the silicone-based surfactant include those described in Silicone Surfactants, R. S. M. Hill, Marcel Dekker, Inc., ISBN: 0-8247-00104. The structure of the silicone-based surfactant includes defined hydrophobic moiety and hydrophilic moiety. The hydrophobic moiety contains one or more dihydrocarbyl siloxane units, where the substituents on the silicone atoms are completely hydrocarbon.

In the sense that the carbon atoms of the hydrocarbyl groups are fully substituted with hydrogen atoms where they can be substituted by halogen such as fluorine, these siloxane surfactants can also be regarded as hydrocarbon surfactants, i.e. the monovalent substituents on the carbon atoms of the hydrocarbyl groups are hydrogen.

The hydrophilic moiety of the silicone-based surfactant may contain one or more polar moieties including ionic groups such as phosphonate, phosphate ester, carboxylate, carbonate, taurate (as the free acid, a salt or an ester), phosphine oxides, betaine, betaine copolyol, or quaternary ammonium salts. Ionic hydrophobic moieties may also contain ionically functionalized siloxane grafts.

Examples of such silicone-based surfactants include polydimethylsiloxane-graft-(meth)acrylic acid salts, polydimethylsiloxane-graft-polyacrylate salts, and polydimethylsiloxane-grafted quaternary amines.

The polar moieties of the hydrophilic moiety of the silicone-based surfactant may contain nonionic groups formed by polyethers, such as polyethylene oxide (PEO), and mixed polyethylene oxide/propylene oxide polyethers (PEO/PPO); mono- and disaccharides; and water-soluble heterocycles such as pyrrolidinone. The ratio of ethylene oxide to propylene oxide (EO/PO) may be varied in mixed polyethylene oxide/polypropylene oxide polyethers.

The hydrophilic moiety of the silicone-based surfactant may also contain a combination of ionic moieties and nonionic moieties. Such moieties include, for example, ionically end-functionalized or randomly functionalized polyether or polyol. Preferred for the practice of the present disclosure are silicone-based surfactants that have nonionic moieties, i.e., are nonionic silicone-based surfactants.

The arrangement of the hydrophobic and hydrophilic moieties of the structure of a silicone-based surfactant may take the form of a diblock polymer (AB), triblock polymer (ABA), wherein the "B" represents the siloxane portion of the molecule, or a multi-block polymer. Alternatively, the silicone-based surfactant may contain a graft polymer.

The silicone-based surfactants also include those disclosed in U.S. Pat. No. 6,841,616.

Examples of the siloxane-based anionic hydrocarbon surfactant include SilSense™ PE-100 silicone and SilSense™ CA-1 silicone available from Noveon® Consumer Specialties by Lubrizol Advanced Materials, Inc.

Examples of the anionic hydrocarbon surfactant also include a sulfosuccinate surfactant Lankropol® K8300 by Akzo Nobel Surface Chemistry LLC.

Examples of the sulfosuccinate hydrocarbon surfactant include sodium diisodecyl sulfosuccinate (Emulsogen® SB10 by Clariant) and sodium diisotridecyl sulfosuccinate (Polirol® TR/LNA by Cesalpinia Chemicals SpA).

Examples of the hydrocarbon surfactants also include PolyFox® surfactants by Omnova Solutions, Inc. (PolyFox™ PF-156A, PolyFox™ PF-136A, etc.).

When the carboxylic acid type hydrocarbon surfactant (in the second production method, aliphatic-type carboxylic acid type hydrocarbon surfactant) is used in combination with other surfactants, the content of the carboxylic acid type hydrocarbon surfactant is preferably 50% by mass or more, more preferably 60% by mass or more, still more preferably 70% by mass or more, particularly preferably 80% by mass or more, and particularly preferably 90% by mass or more based on the total amount of the surfactants. In the polymerization step, it is preferable that the carboxylic acid type hydrocarbon surfactant and the other surfactant are not used substantially in combination, and the content of the other surfactant is preferably 1% by mass or less, more preferably 0.5% by mass or less, and still more preferably 0.1% by mass or less of the total amount of the surfactant.

The carboxylic acid type hydrocarbon surfactant is preferably at least one selected from the group consisting of a surfactant represented by the formula ($\alpha$), a surfactant (1-0) represented by the general formula (1-0), a surfactant (a) represented by the formula (a), a surfactant (b) represented by the formula (b), and a surfactant obtained by subjecting any of these surfactants to a radical treatment or oxidation treatment.

The aliphatic carboxylic acid type hydrocarbon surfactant is preferably at least one selected from the group consisting of a surfactant represented by the formula ($\alpha$), a surfactant represented by the general formula (1-0A), and a surfactant obtained by subjecting any of these surfactants to a radical treatment or oxidation treatment, and particularly preferably at least one selected from the group consisting of a surfactant represented by the formula ($\alpha$), a surfactant obtained by subjecting the surfactant represented by the formula ($\alpha$) to a radical treatment or oxidation treatment.

In the polymerization step, the fluoromonomer is preferably polymerized substantially in the absence of a fluorine-containing surfactant.

Conventionally, fluorine-containing surfactants have been used for the polymerization of fluoropolymers, but the production method of the present disclosure allows for obtaining a fluoropolymer powder having a reduced content of the specific fluorine-containing compound without using the fluorine-containing surfactants.

The expression "substantially in the absence of a fluorine-containing surfactant" as used herein means that the amount of the fluorine-containing surfactant in the aqueous medium is 10 ppm or less, preferably 1 ppm or less, more preferably 100 ppb or less, still more preferably 10 ppb or less, and further preferably 1 ppb or less.

Examples of the fluorine-containing surfactant include anionic fluorine-containing surfactants.

The anionic fluorine-containing surfactant may be, for example, a fluorine atom-containing surfactant having 20 or less carbon atoms in total in the portion excluding the anionic group.

The fluorine-containing surfactant may also be a fluorine-containing surfactant having an anionic moiety having a molecular weight of 1000 or less, more preferably 800 or less, and still more preferably 600 or less.

The "anionic moiety" means the portion of the fluorine-containing surfactant excluding the cation. For example, in the case of $F(CF_2)_{n1}COOM$ represented by the formula (I) described later, the anionic moiety is the "$F(CF_2)_{n1}COO$" portion.

Examples of the fluorine-containing surfactant also include fluorine-containing surfactants having a Log POW of 3.5 or less. The Log POW is a partition coefficient between 1-octanol and water, which is represented by Log P (wherein P is the ratio between the concentration of the fluorine-containing surfactant in octanol and the concentration of the fluorine-containing surfactant in water in a phase-separated octanol/water (1:1) liquid mixture containing the fluorine-containing surfactant).

Log POW is determined as follows. Specifically, HPLC is performed on standard substances (heptanoic acid, octanoic acid, nonanoic acid, and decanoic acid) each having a known octanol/water partition coefficient using TOSOH ODS-120T ($\phi$4.6 mm×250 mm, Tosoh Corp.) as a column and acetonitrile/0.6% by mass HClO4 aqueous solution (=1/1 (vol/vol %)) as an eluent at a flow rate of 1.0 ml/min, a sample amount of 300 μL, and a column temperature of 40° C.; with a detection light of UV 210 nm. For each standard substance, a calibration curve is drawn with respect to the elution time and the known octanol/water partition coefficient. Based on the calibration curve, Log POW is calculated from the elution time of the sample liquid in HPLC.

Specific examples of the fluorine-containing surfactant include those disclosed in U.S. Patent Application Publication No. 2007/0015864, U.S. Patent Application Publication No. 2007/0015865, U.S. Patent Application Publication No. 2007/0015866, and U.S. Patent Application Publication No. 2007/0276103, U.S. Patent Application Publication No. 2007/0117914, U.S. Patent Application Publication No. 2007/142541, U.S. Patent Application Publication No. 2008/0015319, U.S. Pat. Nos. 3,250,808, 3,271,341, Japanese Patent Laid-Open No. 2003-119204, International Publication No. WO2005/042593, International Publication No. WO2008/060461, International Publication No. WO2007/046377, International Publication No. WO2007/119526, International Publication No. WO2007/046482, International Publication No. WO2007/046345, U.S. Patent Application Publication No. 2014/0228531, International Publication No. WO2013/189824, and International Publication No. WO2013/189826.

Examples of the anionic fluorine-containing surfactant include a compound represented by the following general formula ($N^0$):

$$X^{n0}-Rf^{n0}-Y^0 \quad (N^0)$$

wherein $X^{n0}$ is H, Cl, or F; $Rf^{n0}$ is a linear, branched, or cyclic alkylene group having 3 to 20 carbon atoms in which some or all of Hs are replaced by F; the alkylene group optionally containing one or more ether bonds in which some of Hs are replaced by Cl; and $Y^0$ is an anionic group.

The anionic group $Y^0$ may be —COOM, —$SO_2$M, or —$SO_3$M, and may be —COOM or —$SO_3$M.

M is H, a metal atom, $NR^7_4$, imidazolium optionally having a substituent, pyridinium optionally having a substituent, or phosphonium optionally having a substituent, wherein $R_7$ is H or an organic group.

Examples of the metal atom include alkali metals (Group 1) and alkaline earth metals (Group 2), such as Na, K, or Li.

$R^7$ may be H or a $C_{1-10}$ organic group, may be H or a $C_{1-4}$ organic group, and may be H or a $C_{1-4}$ alkyl group.

M may be H, a metal atom, or $NR^7_4$, may be H, an alkali metal (Group 1), an alkaline earth metal (Group 2), or $NR^7_4$, and may be H, Na, K, Li, or $NH_4$.

$Rf^{n0}$ may be one in which 50% or more of H has been replaced by fluorine.

Examples of the compound represented by the general formula ($N^0$) include:

a compound represented by the following general formula ($N^1$):

$$X^{n0}-(CF_2)_{m1}-Y^0 \quad (N^1)$$

wherein $X^{n0}$ is H, Cl, and F; m1 is an integer of 3 to 15; and $Y^0$ is as defined above;

a compound represented by the following general formula ($N^2$):

$$Rf^{n1}-O-(CF(CF_3)CF_2O)_{m2}CFX^{n1}-Y^0 \quad (N^2)$$

wherein $Rf^{n1}$ is a perfluoroalkyl group having 1 to 5 carbon atoms; m2 is an integer of 0 to 3; $X^{n1}$ is F or $CF_3$; and $Y^0$ is as defined above;

a compound represented by the following general formula ($N^3$):

$$Rf^{n2}(CH_2)_{m3}-(Rf^{n3})_q-Y^0 \quad (N^3)$$

wherein $Rf^{n2}$ is a partially or fully fluorinated alkyl group having 1 to 13 carbon atoms and optionally containing an ether bond; m3 is an integer of 1 to 3; $Rf^{n3}$ is a linear or branched perfluoroalkylene group having 1 to 3 carbon atoms; q is 0 or 1; and $Y^0$ is as defined above;

a compound represented by the following general formula ($N^4$):

$$Rf^{n4}-O-(CY^{n1}Y^{n2})_p CF_2-Y^0 \quad (N^4)$$

wherein $Rf^{n4}$ is a linear or branched partially or fully fluorinated alkyl group having 1 to 12 carbon atoms and optionally containing an ether bond; and $Y^{n1}$ and $Y^{n2}$ are the same or different and are each H or F; p is 0 or 1; and $Y^0$ is as defined above; and a compound represented by the following general formula ($N^5$):

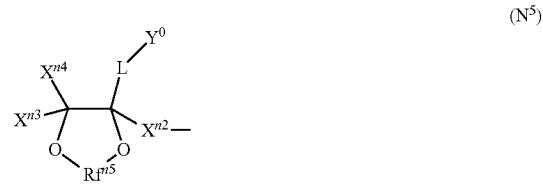

$$(N^5)$$

wherein $X^{n2}$, $X^{n3}$, and $X^{n4}$ may be the same or different and are each H, F, or a linear or branched partial or fully fluorinated alkyl group having 1 to 6 carbon atoms and optionally containing an ether bond; $Rf^{n5}$ is a linear or branched partially or fully fluorinated alkylene group having 1 to 3 carbon atoms and optionally containing an ether bond; L is a linking group; and $Y^0$ is as defined above, with the proviso that the total carbon number of $X^{n2}$, $X^{n3}$, $X^{n4}$, and $Rf^{n5}$ is 18 or less.

More specific examples of the compound represented by the above general formula ($N^0$) include a perfluorocarboxylic acid (I) represented by the following general formula (I), an ω-H perfluorocarboxylic acid (II) represented by the following general formula (II), a perfluoropolyethercarboxylic acid (III) represented by the following general formula (III), a perfluoroalkylalkylenecarboxylic acid (IV) represented by the following general formula (IV), a perfluoroalkoxyfluorocarboxylic acid (V) represented by the following general formula (V), a perfluoroalkylsulfonic acid (VI) represented by the following general formula (VI), an ω-H perfluorosulfonic acid (VII) represented by the following general formula (VII), a perfluoroalkylalkylene sulfonic acid (VIII) represented by the following general formula (VIII), an alkylalkylene carboxylic acid (IX) represented by the following general formula (IX), a fluorocarboxylic acid (X) represented by the following general formula (X), an alkoxyfluorosulfonic acid (XI) represented by the following general formula (XI), a compound (XII) represented by the following general formula (XII), and a compound (XIII) represented by the following general formula (XIII).

The perfluorocarboxylic acid (I) is represented by the following general formula (I):

$$F(CF_2)_{n1}COOM \quad (I)$$

wherein n1 is an integer of 3 to 14; and M is H, a metal atom, $NR^7_4$, imidazolium optionally having a substituent, pyridinium optionally having a substituent, or phosphonium optionally having a substituent, wherein $R^7$ is H or an organic group.

The ω-H perfluorocarboxylic acid (II) is represented by the following general formula (II):

$$H(CF_2)_{n2}COOM \qquad (II)$$

wherein n2 is an integer of 4 to 15; and M is as defined above.

The perfluoropolyethercarboxylic acid (III) is represented by the following general formula (III):

$$Rf^1-O-(CF(CF_3)CF_2O)_{n3}CF(CF_3)COOM \qquad (III)$$

wherein $Rf^1$ is a perfluoroalkyl group having 1 to 5 carbon atoms; n3 is an integer of 0 to 3; and M is as defined above.

The perfluoroalkylalkylenecarboxylic acid (IV) is represented by the following general formula (IV):

$$Rf^2(CH_2)_{n4}Rf^3COOM \qquad (IV)$$

wherein $Rf^2$ is a perfluoroalkyl group having 1 to 5 carbon atoms; $Rf^3$ is a linear or branched perfluoroalkylene group having 1 to 3 carbon atoms; n4 is an integer of 1 to 3; and M is as defined above.

The alkoxyfluorocarboxylic acid (V) is represented by the following general formula (V):

$$Rf^4-O-CY^1Y^2CF_2-COOM \qquad (V)$$

wherein $Rf^4$ is a linear or branched partially or fully fluorinated alkyl group having 1 to 12 carbon atoms and optionally containing an ether bond; $Y^1$ and $Y^2$ are the same or different and are each H or F; and M is as defined above.

The perfluoroalkylsulfonic acid (VI) is represented by the following general formula (VI):

$$F(CF_2)_{n5}SO_3M \qquad (VI)$$

wherein n5 is an integer of 3 to 14; and M is as defined above.

The ω-H perfluorosulfonic acid (VII) is represented by the following general formula (VII):

$$H(CF_2)_{n6}SO_3M \qquad (VII)$$

wherein n6 is an integer of 4 to 14; and M is as defined above.

The perfluoroalkylalkylenesulfonic acid (VIII) is represented by the following general formula (VIII):

$$Rf^5(CH_2)_{n7}SO_3M \qquad (VIII)$$

wherein $Rf^5$ is a perfluoroalkyl group having 1 to 13 carbon atoms; n7 is an integer of 1 to 3; and M is as defined above.

The alkylalkylenecarboxylic acid (IX) is represented by the following general formula (IX):

$$Rf^6(CH_2)_{n8}COOM \qquad (IX)$$

wherein $Rf^6$ is a linear or branched partially or fully fluorinated alkyl group having 1 to 13 carbon atoms and optionally containing an ether bond; n8 is an integer of 1 to 3; and M is as defined above.

The fluorocarboxylic acid (X) is represented by the following general formula (X):

$$Rf^7-O-Rf^8-O-CF_2-COOM \qquad (X)$$

wherein $Rf^7$ is a linear or branched partially or fully fluorinated alkyl group having 1 to 6 carbon atoms and optionally containing an ether bond; $Rf^8$ is a linear or branched partially or fully fluorinated alkyl group having 1 to 6 carbon atoms; and M is as defined above.

The alkoxyfluorosulfonic acid (XI) is represented by the following general formula (XI):

$$Rf^9-O-CY^1Y^2CF_2-SO_3M \qquad (XI)$$

wherein $Rf^9$ is a linear or branched partially or fully fluorinated alkyl group having 1 to 12 carbon atoms and optionally containing an ether bond and optionally containing chlorine; $Y^1$ and $Y^2$ are the same or different and are each H or F; and M is as defined above.

The compound (XII) is represented by the following general formula (XII):

(XII)

wherein $X^1$, $X^2$, and $X^3$ may be the same or different and are H, F, and a linear or branched partially or fully fluorinated alkyl group having 1 to 6 carbon atoms and optionally containing an ether bond; $Rf^{10}$ is a perfluoroalkylene group having 1 to 3 carbon atoms; L is a linking group; and $Y^0$ is an anionic group.

$Y^0$ may be —COOM, —SOM, or —SOM, and may be —SO$_3$M or COOM, where M is as defined above.

Examples of L include a single bond, a partially or fully fluorinated alkylene group having 1 to 10 carbon atoms and optionally containing an ether bond.

The compound (XIII) is represented by the following general formula (XIII):

$$Rf^{11}-O-(CF_2CF(CF_3)O)_{n9}(CF_2O)_{n10}CF_2COOM \qquad (XIII)$$

wherein $Rf^{11}$ is a fluoroalkyl group having 1 to 5 carbon atoms containing chlorine, n9 is an integer of 0 to 3, n10 is an integer of 0 to 3, and M is as defined above. Examples of the compound (XIII) include CF$_2$ClO(CF$_2$CF(CF$_3$)O)$_{n9}$(CF$_2$O)$_{n10}$CF$_2$COONH$_4$ (mixture having an average molecular weight of 750, in the formula, n9 and n10 are as defined above).

As described above, examples of the anionic fluorine-containing surfactant include a carboxylic acid-based surfactant and a sulfonic acid-based surfactant.

The polymerization step may further polymerize fluoromonomer in the presence of a nucleating agent.

The nucleating agent is preferably at least one selected from the group consisting of, for example, fluoropolyether, nonionic surfactant, and chain transfer agent.

In this case, the polymerization step is preferably a step of obtaining a fluoropolymer by polymerizing a fluoromonomer in an aqueous medium in the presence of a carboxylic acid type hydrocarbon-based surfactant and the nucleating agent.

As the fluoropolyether, perfluoropolyether is preferable.

The fluoropolyether preferably has a repeating unit represented by the formulas (1a) to (1d):

$$(-CFCF_3-CF_2-O-)_n \qquad (1a)$$

$$(-CF_2-CF_2-CF_2-O-)_n \qquad (1b)$$

$$(-CF_2-CF_2-O-)_n-(-CF_2-O-)_m \qquad (1c)$$

$$(-CF_2-CFCF_3-O-)_n-(-CF_2-O-)_m \qquad (1d)$$

wherein m and n are integers of 1 or more.

The fluoropolyether is preferably fluoropolyetheric acid or a salt thereof, and the fluoropolyetheric acid is preferably a carboxylic acid, a sulfonic acid, a sulfonamide, or a phosphonic acid, and more preferably a carboxylic acid. Among the fluoropolyetheric acid or a salt thereof, a salt of fluoropolyetheric acid is preferable, an ammonium salt of fluoropolyetheric acid is more preferable, and an ammonium salt of fluoropolyethercarboxylic acid is still more preferable.

The fluoropolyetheric acid or a salt thereof can have any chain structure in which oxygen atoms in the main chain of the molecule are separated by saturated fluorocarbon groups having 1 to 3 carbon atoms. Two or more types of fluorocarbon groups can be present in the molecule.

The fluoropolyether acid or its salt is preferably a compound represented by the following formula:

$$CF_3-CF_2-CF_2-O(-CFCF_3-CF_2-O-)_nCFCF_3-COOH,$$

$$CF_3-CF_2-CF_2-O(-CF_2-CF_2-CF_2-O-)_n-CF_2-CF_2OOH, \text{ or}$$

$$HOOC-CF_2-O(-CF_2-CF_2-O-)_n-(-CF_2-O-)_mCF_2COOH,$$

wherein m and n are the same as above
or a salt thereof.

These structures are described in J. Appl. Polymer Sci., 57, 797 (1995) examined by Kasai. As disclosed herein, such fluoropolyethers can have a carboxylic acid group or a salt thereof at one end or both ends. Similarly, such fluoropolyethers may have a sulfonic acid or phosphonic acid group or a salt thereof at one end or both ends. In addition, fluoropolyethers having acid functional groups at both ends may have different groups at each end. Regarding monofunctional fluoropolyether, the other end of the molecule is usually perfluorinated, but may contain a hydrogen or chlorine atom.

Fluoropolyethers having acid groups at one or both ends have at least two ether oxygens, preferably at least four ether oxygens, and still more preferably at least six ether oxygens. Preferably, at least one fluorocarbon group separating ether oxygens, more preferably at least two of such fluorocarbon groups, has 2 or 3 carbon atoms. Still more preferably, at least 50% of the fluorocarbon groups separating ether oxygens has 2 or 3 carbon atoms. Also preferably, the fluoropolyether has at least 15 carbon atoms in total, and for example, a preferable minimum value of n or n+m in the repeating unit structure is preferably at least 5. Two or more fluoropolyethers having an acid group at one end or both ends can be used in the methods according to the present disclosure. Typically, fluoropolyethers may contain a plurality of compounds in varying proportions within the molecular weight range relative to the average molecular weight, unless special care is taken in the production of a single specific fluoropolyether compound.

The fluoropolyether preferably has a number-average molecular weight of 800 g/mol or more. The fluoropolyether acid or the salt thereof preferably has a number-average molecular weight of less than 6,000 g/mol, because the fluoropolyether acid or the salt thereof may be difficult to disperse in an aqueous medium. The fluoropolyether acid or the salt thereof more preferably has a number-average molecular weight of 800 to 3,500 g/mol, and still more preferably 1,000 to 2,500 g/mol.

The amount of the fluoropolyether is preferably 5 to 3,000 ppm, more preferably 5 to 2,000 ppm, still more preferably 10 ppm, and still more preferably 100 ppm based on the aqueous medium.

Examples of the nonionic surfactant as the nucleating agent include the nonionic surfactant described, and preferred is a fluorine-free nonionic surfactant. Examples thereof include a compound represented by the following general formula (i):

$$R^3-O-A^1-H \qquad (i)$$

wherein $R^3$ is a linear or branched primary or secondary alkyl group having 8 to 18 carbon atoms, and $A^1$ is a polyoxyalkylene chain.

$R^3$ preferably has 10 to 16, more preferably 12 to 16 carbon atoms. When $R^3$ has 18 or less carbon atoms, the aqueous dispersion tends to have good dispersion stability. Further, when $R^3$ has more than 18 carbon atoms, it is difficult to handle due to its high flowing temperature. When $R^3$ has less than 8 carbon atoms, the surface tension of the aqueous dispersion becomes high, so that the permeability and wettability are likely to decrease.

The polyoxyalkylene chain may be composed of oxyethylene and oxypropylene. The polyoxyalkylene chain is composed of an average repeating number of 5 to 20 oxyethylene groups and an average repeating number of 0 to 2 oxypropylene groups, and is a hydrophilic group. The number of oxyethylene units may have either a broad or narrow monomodal distribution as typically supplied, or a broader or bimodal distribution which may be obtained by blending. When the average repeating number of oxypropylene groups is more than 0, the oxyethylene groups and oxypropylene groups in the polyoxyalkylene chain may be arranged in blocks or randomly.

From the viewpoint of viscosity and stability of the aqueous dispersion, a polyoxyalkylene chain composed of an average repeating number of 7 to 12 oxyethylene groups and an average repeating number of 0 to 2 oxypropylene groups is preferred. In particular, when $A^1$ has 0.5 to 1.5 oxypropylene groups on average, low foaming properties are good, which is preferable.

More preferably, $R^3$ is (R')(R")HC—, where R' and R" are the same or different linear, branched, or cyclic alkyl groups, and the total amount of carbon atoms is at least 5, preferably 7 to 17. Preferably, at least one of R' or R" is a branched or cyclic hydrocarbon group.

Specific examples of the nonionic surfactant include $C_{13}H_{27}-O-(C_2H_4O)_{10}-H$, $C_{12}H_{25}-O-(C_2H_4O)_{10}-H$, $C_{10}H_{21}CH(CH_3)CH_2-O-(C_2H_4O)_9-H$, $C_{13}H_{27}-O-(C_2H_4O)_9-(CH(CH_3)CH_2O)-H$, $C_{16}H_{33}-O-(C_2H_4O)_{10}-H$, and $HC(C_5H_{11})(C_7H_{15})-O-(C_2H_4O)_9-H$. Examples of commercially available products of the nonionic surfactant include Genapol X080 (product name, manufactured by Clariant), NOIGEN TDS series (manufactured by DKS Co., Ltd.) exemplified by NOIGEN TDS-80 (trade name), LEOCOL TD series (manufactured by Lion Corporation) exemplified by LEOCOL TD-90 (trade name), LIONOL® TD series (manufactured by Lion Corporation), T-Det A series (manufactured by Harcros Chemicals Inc.) exemplified by T-Det A 138 (trade name), and TERGITOL® 15 S series (manufactured by The Dow Chemical Company).

The nonionic surfactant is preferably an ethoxylate of 2,6,8-trimethyl-4-nonanol having about 4 to about 18 ethylene oxide units on average, an ethoxylate of 2,6,8-trimethyl-4-nonanol having about 6 to about 12 ethylene oxide units on average, or a mixture thereof. This type of nonionic surfactant is also commercially available, for example, as TERGITOL TMN-6, TERGITOL TMN-10, and TERGITOL TMN-100X (all product names, available from Dow Chemical Co., Ltd.).

The hydrophobic group of the nonionic surfactant may be any of an alkylphenol group, a linear alkyl group, and a branched alkyl group.

Examples of the nonionic surfactant include a polyoxyethylene alkylphenyl ether-based nonionic compound represented by the following general formula (i):

wherein $R^4$ is a linear or branched primary or secondary alkyl group having 4 to 12 carbon atoms, and $A^2$ is a polyoxyalkylene chain. Specific examples of the polyoxyethylene alkylphenyl ether-based nonionic compound include Triton® X-100 (trade name, manufactured by The Dow Chemical Company).

Examples of other nonionic surfactants include bifunctional block copolymers supplied from BASF SE as Pluronic® R series, and tridecyl alcohol alkoxylates supplied from BASF SE as Iconol® TDA series.

The amount of the nonionic surfactant is preferably 0.1 to 0.0000001% by mass, more preferably 0.01 to 0.000001% by mass, based on the aqueous medium.

Examples of the chain transfer agent include esters such as dimethyl malonate, diethyl malonate, methyl acetate, ethyl acetate, butyl acetate, and dimethyl succinate, as well as isopentane, methane, ethane, propane, isobutane, methanol, ethanol, isopropanol, acetone, various mercaptans, various halogenated hydrocarbons such as carbon tetrachloride, and cyclohexane.

The chain transfer agent to be used may be a bromine compound or an iodine compound. An example of a polymerization method using a bromine compound or an iodine compound is a method of performing polymerization of a fluoromonomer in an aqueous medium substantially in the absence of oxygen and in the presence of a bromine compound or an iodine compound (iodine transfer polymerization). Representative examples of the bromine compound or the iodine compound to be used include compounds represented by the following general formula:

wherein x and y are each an integer of 0 to 2 and satisfy $1 \leq x+y \leq 2$; and $R^a$ is a saturated or unsaturated fluorohydrocarbon or chlorofluorohydrocarbon group having 1 to 16 carbon atoms, or a hydrocarbon group having 1 to 3 carbon atoms, each of which optionally contains an oxygen atom. By using a bromine compound or an iodine compound, iodine or bromine is introduced into the polymer, and serves as a crosslinking point.

Examples of the iodine compound include 1,3-diiodoperfluoropropane, 2-iodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1,2-bromo-4-iodoperfluorobutene-1, and a monoiodo- and monobromo-substitution product, diiodo- and monobromo-substitution product, and (2-iodoethyl)- and (2-bromoethyl)-substitution product of benzene. These compounds may be used alone or in any combination.

Among these, at least one selected from the group consisting of alkanes and alcohols is preferable from the viewpoints of polymerization reactivity, crosslinkablility, availability, and the like. The alkane preferably has 1 to 6, more preferably 1 to 5 carbon atoms. The alcohol preferably has 1 to 5 carbon atoms, more preferably 1 to 4 carbon atoms. The chain transfer agent is particularly preferably at least one selected from the group consisting of methane, ethane, propane, isobutane, methanol, ethanol, and isopropanol.

The amount of the chain transfer agent is preferably 0.001 to 10,000 ppm based on the aqueous medium. The amount of the chain transfer agent is more preferably 0.01 ppm or more, still more preferably 0.05 ppm or more, and particularly preferably 0.1 ppm or more based on the aqueous medium. Further, the amount of the chain transfer agent is more preferably 1,000 ppm or less, still more preferably 500 ppm or less, and particularly preferably 100 ppm or less based on the aqueous medium.

The chain transfer agent may be added to the reaction vessel at once before initiation of the polymerization, may be added at once after initiation of the polymerization, may be added in multiple portions during the polymerization, or may be added continuously during the polymerization.

Further, in the production method of the present disclosure, in addition to the hydrocarbon surfactant and other compounds having a surfactant function used as necessary, an additive may also be used to stabilize the compounds. Examples of the additive include a buffer, a pH adjuster, a stabilizing aid, and a dispersion stabilizer.

The stabilizing aid is preferably paraffin wax, fluorine-containing oil, a fluorine-containing solvent, silicone oil, or the like. The stabilizing aids may be used alone or in combination of two or more. The stabilizing aid is more preferably paraffin wax. The paraffin wax may be in the form of liquid, semi-solid, or solid at room temperature, and is preferably a saturated hydrocarbon having 12 or more carbon atoms. The paraffin wax usually preferably has a melting point of 40 to 65° C., and more preferably 50 to 65° C.

The amount of the stabilizing aid used is preferably 0.1 to 12% by mass, and more preferably 0.1 to 8% by mass, based on the mass of the aqueous medium used. It is desirable that the stabilizing aid is sufficiently hydrophobic so that the stabilizing aid is completely separated from the fluoropolymer aqueous emulsion after emulsion polymerization of fluoromonomer, and does not serve as a contaminating component.

The polymerization in the production method may be performed by charging a polymerization reactor with an aqueous medium, the hydrocarbon surfactant, a monomer, and optionally other additives, stirring the contents of the reactor, maintaining the reactor at a predetermined polymerization temperature, and adding a predetermined amount of a polymerization initiator to thereby initiate the polymerization reaction. After the initiation of the polymerization reaction, the components such as the monomers, the polymerization initiator, a chain transfer agent, and the surfactant may additionally be added depending on the purpose. The hydrocarbon surfactant may be added after the polymerization reaction is initiated.

The polymerization initiator may be any polymerization initiator capable of generating radicals within the polymerization temperature range, and known oil-soluble and/or water-soluble polymerization initiators may be used. The polymerization initiator may be combined with a reducing agent, for example, to form a redox agent, which initiates the polymerization. The concentration of the polymerization initiator is appropriately determined depending on the types of the monomers, the molecular weight of the target fluoropolymer, and the reaction rate.

The polymerization initiator to be used may be an oil-soluble radical polymerization initiator or a water-soluble radical polymerization initiator.

The oil-soluble radical polymerization initiator may be a known oil-soluble peroxide, and representative examples thereof include dialkyl peroxycarbonates such as diisopropyl peroxydicarbonate and di-sec-butyl peroxydicarbonate; peroxy esters such as t-butyl peroxyisobutyrate and t-butyl peroxypivalate; and dialkyl peroxides such as di-t-butyl peroxide, as well as di[perfluoro(or fluorochloro) acyl] peroxides such as di(ω-hydro-dodecafluorohexanoyl)peroxide, di(ω-hydro-tetradecafluoroheptanoyl)peroxide, di(ω-hydro-hexadecafluorononanoyl)peroxide, di(perfluorobutyryl)peroxide, di(perfluorovaleryl)peroxide, di(perfluorohexanoyl)peroxide, di(perfluoroheptanoyl)peroxide, di(perfluorooctanoyl)peroxide, di(perfluorononanoyl)peroxide, di(ω-chloro-hexafluorobutyryl)peroxide, di(ω-chloro-decafluorohexanoyl)peroxide, di(ω-chloro-tetradecafluorooctanoyl)peroxide, ω-hydro-dodecafluoroheptanoyl-ω-hydrohexadecafluorononanoyl-peroxide, ω-chloro-hexafluorobutyryl-ω-chloro-decafluorohexanoyl-peroxide, ω-hydrododecafluoroheptanoyl-perfluorobutyryl-peroxide, di(dichloropentafluorobutanoyl)peroxide, di(trichlorooctafluorohexanoyl)peroxide, di(tetrachloroundecafluorooctanoyl)peroxide, di(pentachlorotetradecafluorodecanoyl)peroxide, and di(undecachlorodotoriacontafluorodocosanoyl)peroxide.

For example, in a case where the polymerization is performed at a low temperature of 30° C. or lower, the polymerization initiator used is preferably a redox initiator obtained by combining an oxidizing agent and a reducing agent. Examples of the oxidizing agent include persulfates, organic peroxides, potassium permanganate, manganese triacetate, and ammonium cerium nitrate. Examples of the reducing agent include bromate, diimine, and oxalic acid. Examples of the persulfates include ammonium persulfate and potassium persulfate. In order to increase the decomposition rate of the initiator, the combination of the redox initiator may preferably contain a copper salt or an iron salt. An example of the copper salt is copper (II) sulfate and an example of the iron salt is iron (II) sulfate.

Examples of the redox initiator include potassium permanganate/oxalic acid, potassium permanganate/ammonium oxalate, manganese triacetate/oxalic acid, manganese triacetate/ammonium oxalate, ammonium cerium nitrate/oxalic acid, and ammonium cerium nitrate/ammonium oxalate, and potassium permanganate/oxalic acid is preferred. In the case of using a redox initiator, either an oxidizing agent or a reducing agent may be charged into a polymerization tank in advance, followed by adding the other continuously or intermittently thereto to initiate the polymerization. For example, in the case of using potassium permanganate/oxalic acid, preferably, oxalic acid is charged into a polymerization tank and potassium permanganate is continuously added thereto.

The polymerization initiator may be added in any amount, and the initiator in an amount that does not significantly decrease the polymerization rate (e.g., several parts per million in water) or more may be added at once in the initial stage of polymerization, or may be added successively or continuously. The upper limit thereof falls within a range where the reaction temperature is allowed to increase while the polymerization reaction heat is removed through the device surfaces. The upper limit thereof is more preferably within a range where the polymerization reaction heat can be removed through the device surfaces.

The polymerization initiator may be a radical polymerization initiator. The radical polymerization initiator is preferably a peroxide. Examples of the radical polymerization initiator include the oil-soluble radical polymerization initiator and the water-soluble radical polymerization initiator described above, and the water-soluble radical polymerization initiator is preferred. The water-soluble radical polymerization initiator is more preferably a peroxide, and still more preferably a persulfate, an organic peroxide, or a mixture thereof. Examples of the persulfate include ammonium persulfate and potassium persulfate. Examples of the organic peroxide include disuccinic acid peroxide and diglutaric acid peroxide. Still more preferred are ammonium persulfate and disuccinic acid peroxide. In the polymerization step, for example, 5 ppm or more of ammonium persulfate is preferably added to the aqueous medium, more preferably 10 ppm or more, still more preferably 20 ppm or more, further preferably 30 ppm or more, still further preferably 40 ppm or more, yet still further preferably 50 ppm or more, particularly preferably 80 ppm or more, and very particularly preferably 100 ppm or more. In the polymerization step, the radical polymerization initiator may be added continuously or intermittently after the polymerization is initiated.

The aqueous medium is a reaction medium in which the polymerization is performed, and means a liquid containing water. The aqueous medium may be any medium containing water, and it may be one containing water and, for example, any of fluorine-free organic solvents such as alcohols, ethers, and ketones, and/or fluorine-containing organic solvents having a boiling point of 40° C. or lower.

In the aqueous dispersion obtained by the polymerization, the average primary particle size of the fluoropolymer is, for example, 50 to 500 nm. The lower limit of the average primary particle size is preferably 100 nm, and more preferably 150 nm. The upper limit of the average primary particle size is preferably 400 nm, and more preferably 350 nm.

The average primary particle size can be determined by dynamic light scattering. The average primary particle size may be determined by preparing a fluoropolymer aqueous dispersion with a fluoropolymer solid concentration adjusted to about 1.0% by mass and using a dynamic light scattering method at 25° C. with 70 measurement processes, wherein the solvent (water) has a refractive index of 1.3328 and the solvent has a viscosity of 0.8878 mPa·s. The dynamic light scattering may be performed by, for example, ELSZ-1000S (manufactured by Otsuka Electronics Co., Ltd.).

The carboxylic acid type hydrocarbon surfactant can also be suitably used as a dispersant for dispersing the fluoropolymer obtained by polymerization in an aqueous medium.

In the polymerization, an aqueous dispersion containing the particles made of the fluoropolymer, the surfactant, and the aqueous medium is usually obtained. In the aqueous dispersion, the particles made of the fluoropolymer are dispersed in an aqueous medium in the presence of the surfactant.

The lower limit value of the content of the carboxylic acid type hydrocarbon surfactant in the aqueous dispersion is preferably 10 ppb, more preferably 100 ppb, still more preferably 1 ppm, further preferably 10 ppm, and particularly preferably 50 ppm based on the fluoropolymer. The upper limit value thereof is preferably 100,000 ppm, more preferably 50,000 ppm, still more preferably 10,000 ppm, and still more preferably 5,000 ppm based on the fluoropolymer.

The aqueous dispersion may be any of an aqueous dispersion obtained by the polymerization, a dispersion obtained by concentrating this aqueous dispersion or subjecting the aqueous dispersion to dispersion stabilization treatment, and an aqueous dispersion obtained by dispersing powder made of the fluoropolymer into an aqueous medium in the presence of the surfactant.

The aqueous dispersion may also be produced as an aqueous dispersion by a method including a step (I) of bringing the aqueous dispersion obtained by the polymerization into contact with an anion exchange resin or a mixed bed containing an anion exchange resin and a cation exchange resin in the presence of a nonionic surfactant (I), and/or a step (II) of concentrating the aqueous dispersion obtained by this step such that the solid concentration is 30 to 70% by mass based on 100% by mass of the aqueous dispersion (II).

The nonionic surfactant may be, but is not limited to, any of those to be described later. The anion exchange resin to be used may be, but is not limited to, a known one. The contact with the anion exchange resin may be performed by a known method.

A method for producing the aqueous dispersion may include subjecting the aqueous dispersion obtained by the polymerization to the step (I), and subjecting the aqueous dispersion obtained in the step (I) to the step (II) to produce a purified aqueous dispersion. The step (II) may also be carried out without carrying out the step (I) to produce a purified aqueous dispersion. Further, the step (I) and the step (II) may be repeated or combined.

Examples of the anion exchange resin include known ones such as a strongly basic anion exchange resin containing as a functional group a —N+X—(CH$_3$)$_3$ group (wherein X is Cl or OH) or a strongly basic anion exchange resin containing a —N+X—(CH$_3$)$_3$(C$_2$H$_4$OH) group (wherein X is as described above). Specific examples thereof include those described in International Publication No. WO99/62858, International Publication No. WO03/020836, International Publication No. WO2004/078836, International Publication No. WO2013/027850, and International Publication No. WO2014/084399.

Examples of the cation exchange resin include, but are not limited to, known ones such as a strongly acidic cation exchange resin containing as a functional group a —SO$_3$— group and a weakly acidic cation exchange resin containing as a functional group a —COO— group. Of these, from the viewpoint of achieving good removal efficiency, a strongly acidic cation exchange resin is preferred, a H$^+$ form strongly acidic cation exchange resin is more preferred.

The "mixed bed containing a cation exchange resin and an anion exchange resin" encompasses, but is not limited to, those in which the resins are filled into a single column, those in which the resins are filled into different columns, and those in which the resins are dispersed in an aqueous dispersion.

The concentration may be carried out by a known method. Specific examples include those described in International Publication No. WO2007/046482 and International Publication No. WO2014/084399.

Examples thereof include phase separation, centrifugal sedimentation, cloud point concentration, electric concentration, electrophoresis, filtration treatment using ultrafiltration, filtration treatment using a reverse osmosis membrane (RO membrane), and nanofiltration treatment. The concentration may concentrate the fluoropolymer concentration to be 30 to 70% by mass in accordance with the application thereof. The concentration may impair the stability of the dispersion. In such a case, a dispersion stabilizer may be further added.

The dispersion stabilizer added may be the aforementioned nonionic surfactant or various other surfactants.

The nonionic surfactant is the same as the nonionic surfactant exemplified as the nucleating agent described above, and can be appropriately selected from the nonionic surfactants described above. The nonionic surfactant is preferably free from an aromatic moiety.

Also, the cloud point of the nonionic surfactant is a measure of its solubility in water. The surfactant used in the aqueous dispersion of the present disclosure has a cloud point of about 30° C. to about 90° C., preferably about 35° C. to about 85° C.

The total amount of the dispersion stabilizer is 0.5 to 20% by mass in terms of concentration, based on the solid of the dispersion. When the amount of the dispersion stabilizer is less than 0.5% by mass, the dispersion stability may deteriorate, and when the amount thereof is more than 20% by mass, dispersion effects commensurate with the amount thereof may not be obtained, which is impractical. The lower limit of the amount of the dispersion stabilizer is more preferably 2% by mass, while the upper limit thereof is more preferably 12% by mass.

The method for producing a fluoropolymer powder of the present disclosure may include a step of recovering the fluoropolymer aqueous dispersion obtained in the polymerization step.

The method for producing a fluoropolymer powder of the present disclosure may also include a step of recovering the coagulated wet fluoropolymer powder.

Examples of the fluoropolymer include TFE polymer in which the monomer with the highest mole fraction of monomers in the polymer (hereinafter referred to as "most monomer") is TFE, VDF polymer in which the most monomer is VDF, and a CTFE polymer in which the most monomer is CTFE. Hereinafter, more preferred embodiments will be described for each fluoropolymer.

The TFE polymer may be preferably a TFE homopolymer or a copolymer composed of (1) TFE, (2) one or more fluorine-containing monomers other than TFE having 2 to 8 carbon atoms, particularly VDF, HFP or CTFE, and (3) other monomers. Examples of (3) the other monomer include fluoro(alkyl vinyl ether) having an alkyl group having 1 to 5 carbon atoms, particularly 1 to 3 carbon atoms; fluorodioxol; perfluoroalkylethylene; ω-hydroperfluoroolefin; and perfluoroallyl ether.

The TFE polymer may also be a copolymer of TFE and one or more fluorine-free monomers. Examples of the fluorine-free monomer include alkenes such as ethylene and propylene; vinyl esters; and vinyl ethers. The TFE polymer may also be a copolymer of TFE, one or more fluorine-containing monomers having 2 to 8 carbon atoms, and one or two or more fluorine-free monomers.

The VDF polymer may preferably be a copolymer made of (1) VDF, (2) one or more fluoroolefins other than VDF having 2 to 8 carbon atoms, particularly TFE, HFP or CTFE, and (3) perfluoro(alkyl vinyl ether) having an alkyl group having 1 to 5 carbon atoms, particularly 1 to 3 carbon atoms.

The CTFE polymer may preferably be a CTFE homopolymer, or a copolymer made of (1) CTFE, (2) one or more fluoroolefins other than CTFE having 2 to 8 carbon atoms, particularly TFE or HFP, and (3) perfluoro(alkyl vinyl ether) having an alkyl group having 1 to 5 carbon atoms, particularly 1 to 3 carbon atoms.

The CTFE polymer may also be a copolymer of CTFE and one or more fluorine-free monomers, and examples of the fluorine-free monomers include alkenes such as ethylene and propylene; vinyl esters; and vinyl ethers.

The fluoropolymer produced by the production method of the present disclosure may be vitreous, plastic, or elastomeric. The fluoropolymer is amorphous or partially crystallized, and may be subjected to compression sintering, melt fabrication, or non-melt fabrication.

The production method of the present disclosure can suitably provide (I) non melt-processible fluororesins, including tetrafluoroethylene polymers (TFE polymers (PTFE)); (II) melt-fabricable fluororesins, including ethylene/TFE copolymers (ETFE), TFE/HFP copolymers (FEP), TFE/perfluoro(alkyl vinyl ether) copolymers (e.g., PFA, MFA), TFE/perfluoroallyl ether copolymer, and electrolyte polymer precursor.

The fluoropolymer is preferably a fluororesin, more preferably a fluororesin having a fluorine substitution percentage calculated by the following formula of 50% or more, still more preferably a fluororesin having a fluorine substitution percentage of more than 50%, further preferably a fluororesin having a fluorine substitution percentage of 55% or more, further preferably a fluororesin having a fluorine substitution percentage of 60% or more, further preferably a fluororesin having a fluorine substitution percentage of 75% or more, particularly preferably a fluororesin having a fluorine substitution percentage of 80% or more, and most preferably a fluororesin having a fluorine substitution percentage of 90 to 100%, that is, a perfluororesin.

Fluorine substitution percentage (%)=(number of fluorine atoms bonded to carbon atoms constituting fluoropolymer)/((number of hydrogen atoms bonded to carbon atoms constituting fluoropolymer)+(number of fluorine atoms and chlorine atoms bonded to carbon atoms constituting the fluoropolymer))×100 (Formula)

The perfluororesin is more preferably a fluororesin having a fluorine substitution percentage of 95 to 100%, still more preferably PTFE, FEP, or PFA, particularly preferably PTFE, and still further preferably high-molecular-weight PTFE.

The fluoropolymer may have a core-shell structure. Examples of the fluoropolymer having a core-shell structure include modified PTFE containing a high-molecular-weight PTFE core in the particles and a lower-molecular-weight PTFE or modified PTFE shell. Examples of such modified PTFE include PTFE disclosed in National Publication of International Patent Application No. 2005-527652.

The core-shell structure may have the following structures.

| | |
|---|---|
| Core: TFE homopolymer | Shell: TFE homopolymer |
| Core: Modified PTFE | shell: TFE homopolymer |
| Core: Modified PTFE | Shell: Modified PTFE |
| Core: TFE homopolymer | Shell: Modified PTFE |
| Core: Low-molecular-weight PTFE | Shell: High-molecular-weight PTFE |
| Core: High-molecular-weight PTFE | Shell: Low-molecular-weight PTFE |

In the fluoropolymer having a core-shell structure, the lower limit of the core ratio is preferably 0.5% by mass, more preferably 1.0% by mass, still more preferably 3.0% by mass, particularly preferably 5.0% by mass, and most preferably 10.0% by mass. The upper limit of the core ratio is preferably 99.5% by mass, more preferably 99.0% by mass, still more preferably 98.0% by mass, further preferably 97.0% by mass, particularly preferably 95.0% by mass, and most preferably 90.0% by mass.

In the fluoropolymer having a core-shell structure, the lower limit of the shell ratio is preferably 0.5% by mass, more preferably 1.0% by mass, still more preferably 3.0% by mass, particularly preferably 5.0% by mass, and most preferably 10.0% by mass. The upper limit of the shell ratio is preferably 99.5% by mass, more preferably 99.0% by mass, still more preferably 98.0% by mass, further preferably 97.0% by mass, particularly preferably 95.0% by mass, and most preferably 90.0% by mass.

In the fluoropolymer having a core-shell structure, the core or the shell may have two or more layers. For example, the fluoropolymer may be a fluoropolymer having a trilayer structure having a core central portion of modified PTFE, a core outer layer portion of TFE homopolymer, and a shell of modified PTFE. An example of the fluoropolymer having such a trilayer structure is PTFE disclosed in International Publication No. WO2006/054612.

The above-mentioned (I) non melt-processible fluororesin and (II) melt-fabricable fluororesin preferably produced by the production method of the present disclosure are preferably produced by the following embodiments.

(I) Non Melt-Processible Fluororesin

In the production method of the present disclosure, the polymerization of TFE is usually performed at a polymerization temperature of 10 to 150° C. and a polymerization pressure of 0.05 to 5 MPaG. For example, the polymerization temperature is more preferably 30° C. or higher, and still more preferably 50° C. or higher. Further, the polymerization temperature is more preferably 120° C. or lower, and still more preferably 100° C. or lower. Further, the polymerization pressure is more preferably 0.3 MPaG or higher, still more preferably 0.5 MPaG or higher, more preferably 5.0 MPaG or lower, and still more preferably 3.0 MPaG or lower. In particular, from the viewpoint of improving the yield of the fluoropolymer, the polymerization pressure is preferably 1.0 MPaG or higher, more preferably 1.2 MPaG or higher, still more preferably 1.5 MPaG or higher, and more preferably 2.0 MPaG or higher.

In one embodiment, in the polymerization, pure water is charged into a pressure-resistant reaction vessel equipped with a stirrer, after deoxidation, TFE is charged, the temperature is set to a predetermined temperature, and a polymerization initiator is added to initiate the reaction. When the pressure decreases as the reaction progresses, additional TFE is continuously or intermittently fed to maintain the initial pressure. When the amount of TFE fed reaches a predetermined level, feeding is stopped, and then TFE in the reaction vessel is purged and the temperature is returned to room temperature, whereby the reaction is completed. Additional TFE may be added continuously or intermittently to prevent pressure drop.

In the production of TFE polymer (PTFE), various known modifying monomers can also be used in combination. In the present specification, the PTFE is a concept including not only a TFE homopolymer but also a copolymer of TFE and a modifying monomer, which is non melt-processible (hereinafter referred to as "modified PTFE").

The PTFE may be a TFE homopolymer, or may be a modified PTFE containing 99.0% by mass or more of a polymerization unit based on TFE and 1.0% by mass or less of a polymerization unit based on a modifying monomer.

In the modified PTFE, the content of the polymerization unit based on the modifying monomer (hereinafter, also referred to as "modifying monomer unit") is preferably in the range of 0.00001 to 1.0% by mass based on the total polymerization units of modified PTFE. The lower limit of the modifying monomer unit is more preferably 0.0001% by mass, still more preferably 0.001% by mass, and further preferably 0.005% by mass. The upper limit of the modifying monomer is 0.90% by mass, 0.50% by mass, 0.40% by mass, 0.30% by mass, 0.20% by mass, 0.15% by mass, 0.10% by mass, and 0.05% by mass.

The term "modifying monomer unit" as used herein means a portion of the molecular structure of the PTFE as a part derived from the modifying monomer.

The content of each monomer unit constituting the PTFE can be calculated herein by any appropriate combination of NMR, FT-IR, elemental analysis, and X-ray fluorescence analysis depending on the type of the monomer. Further, the content of each monomer unit constituting PTFE can also be obtained by calculation from the amount of the modifying monomer added used for the polymerization.

The modifying monomer is not limited as long as it can be copolymerized with TFE, and examples thereof include fluoromonomers and non-fluoromonomers.

Examples of the non-fluoromonomer include, but not limited to, a monomer represented by the general formula:

$CH_2=CR^{Q1}-LR^{Q2}$ wherein $R^{Q1}$ represents a hydrogen atom or an alkyl group; L represents a single bond, —CO—O—*, —O—CO—* or —O—; * represents a bonding position with the $R^{Q2}$; and $R^{Q2}$ represents a hydrogen atom, an alkyl group, or a nitrile group.

Examples of the non-fluoromonomer include methyl acrylate, methyl methacrylate, ethyl acrylate, ethyl methacrylate, propyl acrylate, propyl methacrylate butyl acrylate, butyl methacrylate, hexyl methacrylate, cyclohexyl methacrylate, vinyl methacrylate, vinyl acetate, acrylic acid, methacrylic acid, acrylonitrile, methacrylonitrile, ethyl vinyl ether, and cyclohexyl vinyl ether. Among these, the non-fluoromonomer is preferably butyl methacrylate, vinyl acetate, or acrylic acid.

The fluoromonomer may be any modifying monomer copolymerizable with TFE, and examples thereof include perfluoroolefins such as hexafluoropropylene (HFP); hydrogen-containing fluoroolefins such as trifluoroethylene and vinylidene fluoride (VDF); perhaloolefins such as chlorotrifluoroethylene; fluorovinyl ethers; (perfluoroalkyl)ethylenes; and perfluoroallyl ethers. The modifying monomer to be used may be one kind or a plurality of kinds.

Examples of the perfluorovinyl ether include, but are not limited to, a perfluoro unsaturated compound represented by the following general formula (A):

$CF_2=CF—ORf$     (A)

wherein $R_f$ represents a perfluoroorganic group. The "perfluoroorganic group" as used herein means an organic group in which all hydrogen atoms bonded to the carbon atoms are replaced by fluorine atoms. The perfluoroorganic group optionally has ether oxygen.

Examples of the fluorovinyl ether include perfluoro(alkyl vinyl ether) (PAVE) in which Rf is a perfluoroalkyl group having 1 to 10 carbon atoms in the general formula (A). The perfluoroalkyl group preferably has 1 to 5 carbon atoms.

Examples of the perfluoroalkyl group in the PAVE include a perfluoromethyl group, a perfluoroethyl group, a perfluoropropyl group, a perfluorobutyl group, a perfluoropentyl group, and a perfluorohexyl group.

Examples of the perfluorovinyl ether further include those represented by the general formula (A) in which Rf is a perfluoro(alkoxyalkyl) group having 4 to 9 carbon atoms; those in which Rf is a group represented by the following formula:

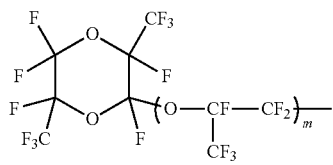

wherein m represents 0 or an integer of 1 to 4; and those in which $R_f$ is a group represented by the following formula:

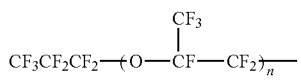

wherein n is an integer of 1 to 4.

Examples of hydrogen-containing fluoroolefins include $CH_2=CF_2$, $CFH=CH_2$, $CFH=CF_2$, $CF_2=CFCF_3$, $CH_2=CFCF_3$, $CH_2=CHCF_3$, $CHF=CHCF_3$ (E-form), and $CHF=CHCF_3$ (Z-form).

The perfluorovinyl ether is preferably at least one selected from the group consisting of perfluoro(methyl vinyl ether) (PMVE), perfluoro(ethyl vinyl ether) (PEVE), and perfluoro (propyl vinyl ether) (PPVE), and more preferably PMVE.

Examples of the (perfluoroalkyl)ethylene (PFAE) include, but are not limited to, (perfluorobutyl)ethylene (PFBE), and (perfluorohexyl)ethylene.

Examples of perfluoroallyl ether include a fluoromonomer represented by the general formula:

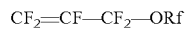

$CF_2=CF—CF_2—ORf$ wherein $R_f$ represents a perfluoroorganic group.

$R_f$ of the general formula is the same as $R_f$ of the general formula (A). $R_f$ is preferably a perfluoroalkyl group having 1 to 10 carbon atoms or a perfluoroalkoxyalkyl group having 1 to 10 carbon atoms. The perfluoroallyl ether is preferably at least one selected from the group consisting of $CF_2=CF—CF_2—O—CF_3$, $CF_2=CF—CF_2—O—C_2F_5$, $CF_2=CF—CF_2—O—C_3F_7$, and $CF_2=CF—CF_2—O—C_4F_9$, more preferably at least one selected from the group consisting of $CF_2=CF—CF_2—O—C_2F_5$, $CF_2=CF—CF_2—O—C_3F_7$, and $CF_2=CF—CF_2—O—C_4F_9$, and still more preferably $CF_2=CF—CF_2—O—CF_2CF_2CF_3$.

Preferred examples of the modifying monomer also include a comonomer (3) having a monomer reactivity ratio of 0.1 to 8. The presence of the comonomer (3) makes it possible to obtain PTFE particles having a small particle size, and to thereby obtain an aqueous dispersion having high dispersion stability.

The monomer reactivity ratio in the copolymerization with TFE is a value obtained by dividing a rate constant when the propagating radical reacts with TFE when the propagating radical is less than a repeating unit based on TFE by a rate constant when the propagating radical reacts with a comonomer. The lower this value is, the more reactive the comonomer is with TFE. The monomer reactivity ratio can be calculated by copolymerizing the TFE and the

comonomer, determining the compositional features in the polymer formed immediately after initiation, and calculating the reactivity ratio by Fineman-Ross equation.

The copolymerization is performed using 3,600 g of deionized degassed water, 1,000 ppm of ammonium perfluorooctanoate based on the water, and 100 g of paraffin wax contained in an autoclave made of stainless steel with an internal volume of 6.0 L at a pressure of 0.78 MPaG and a temperature of 70° C. A comonomer in an amount of 0.05 g, 0.1 g, 0.2 g, 0.5 g, or 1.0 g is added into the reactor, and then 0.072 g of ammonium persulfate (20 ppm based on the water) is added thereto. To maintain the polymerization pressure at 0.78 MPaG, TFE is continuously fed thereinto. When the charged amount of TFE reaches 1,000 g, stirring is stopped and the pressure is released until the pressure in the reactor decreases to the atmospheric pressure. After cooling, the paraffin wax is separated to obtain an aqueous dispersion containing the resulting polymer. The aqueous dispersion is stirred so that the resulting polymer coagulates, and the polymer is dried at 150° C. The compositional features in the resulting polymer are calculated by appropriate combination of NMR, FT-IR, elemental analysis, and X-ray fluorescence analysis depending on the types of the monomers.

The comonomer (3) having a monomer reactivity ratio of 0.1 to 8 is preferably at least one selected from the group consisting of comonomers represented by the formulas (3a) to (3d):

$$CH_2=CH-Rf^1 \quad (3a)$$

wherein $Rf^1$ is preferably a perfluoroalkyl group having 1 to 10 carbon atoms;

$$CF_2=CF-O-Rf^2 \quad (3b)$$

wherein $Rf^2$ is preferably a perfluoroalkyl group having 1 to 2 carbon atoms;

$$CF_2=CF-O-(CF_2)_nCF=CF_2 \quad (3c)$$

wherein n is 1 or 2; and

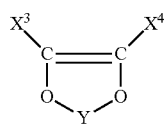

(3d)

wherein $X^3$ and $X^4$ are each F, Cl, or a methoxy group, and Y is the formula $Y^1$ or $Y^2$,

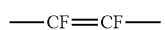

—CF=CF— (Y1)

(Y2)

wherein Z and Z' are each F or a fluorinated alkyl group having 1 to 3 carbon atoms.

The content of the comonomer (3) unit is preferably in the range of 0.00001 to 1.0% by mass based on the total polymerization units of PTFE. The lower limit thereof is more preferably 0.0001% by mass, still more preferably 0.001% by mass, and further preferably 0.005% by mass. The upper limit thereof is 0.90% by mass, 0.50% by mass, 0.40% by mass, 0.30% by mass, 0.20% by mass, 0.15% by mass, 0.10% by mass, 0.08% by mass, 0.05% by mass, and 0.01% by mass in the order of preference.

The modifying monomer is preferably at least one selected from the group consisting of hexafluoropropylene, chlorotrifluoroethylene, vinylidene fluoride, fluoro(alkyl vinyl ether), (perfluoroalkyl)ethylene, ethylene, and modifying monomers having a functional group capable of reacting by radical polymerization and a hydrophilic group, in view of obtaining an aqueous dispersion of modified polytetrafluoroethylene particles having a small average primary particle size, a small aspect ratio of primary particles, and excellent stability. The use of the modifying monomer allows for obtaining an aqueous dispersion of PTFE having a smaller average primary particle size, a smaller aspect ratio of the primary particles, and excellent dispersion stability. Also, an aqueous dispersion having a smaller amount of uncoagulated polymer can be obtained.

The modifying monomer preferably contains at least one selected from the group consisting of hexafluoropropylene, perfluoro(alkyl vinyl ether) and (perfluoroalkyl)ethylene from the viewpoint of reactivity with TFE.

The modifying monomer more preferably contains at least one selected from the group consisting of hexafluoropropylene, perfluoro(methyl vinyl ether), perfluoro(propyl vinyl ether), (perfluorobutyl)ethylene, (perfluorohexyl)ethylene, and (perfluorooctyl)ethylene.

The total amount of the hexafluoropropylene unit, the perfluoro(alkyl vinyl ether) unit and the (perfluoroalkyl)ethylene unit is preferably in the range of 0.00001 to 1% by mass based on total polymerization units of PTFE. The lower limit of the total amount is more preferably 0.0001% by mass, still more preferably 0.001% by mass, and still more preferably 0.005% by mass. The upper limit thereof is 0.90% by mass, 0.50% by mass, 0.40% by mass, 0.30% by mass, 0.20% by mass, 0.15% by mass, 0.10% by mass, 0.08% by mass, 0.05% by mass, and 0.01% by mass in the order of preference.

It is also preferable that the modifying monomer contains a modifying monomer having a functional group capable of reacting by radical polymerization and a hydrophilic group (hereinafter, referred to as "modifying monomer (A)").

The presence of the modifying monomer (A) makes it possible to obtain PTFE particles having a small primary particle size, and to thereby obtain an aqueous dispersion having high dispersion stability. In addition, the amount of uncoagulated polymer can be reduced. Furthermore, the aspect ratio of the primary particles can be made small.

The amount of the modifying monomer (A) used is preferably an amount exceeding 0.1 ppm of the aqueous medium, more preferably an amount exceeding 0.5 ppm, still more preferably an amount exceeding 1.0 ppm, further preferably 5 ppm or more, and particularly preferably 10 ppm or more. When the amount of the modifying monomer (A) used is too small, the average primary particle size of the obtained PTFE may not be reduced.

The amount of the modifying monomer (A) used may be in the above range, and the upper limit may be, for example, 5,000 ppm. Further, in the production method, the modifying monomer (A) may be added to the system during the reaction in order to improve the stability of the aqueous dispersion during or after the reaction.

Since the modifying monomer (A) is highly water-soluble, even if the unreacted modifying monomer (A) remains in the aqueous dispersion, it can be easily removed in the concentration step or the coagulation/washing step.

The modifying monomer (A) is incorporated into the resulting polymer in the process of polymerization, and the concentration of the modifying monomer (A) in the polymerization system itself is low and the amount incorporated into the polymer is small, so that there is no problem of lowered heat resistance of PTFE or coloring of PTFE after sintering.

Examples of the hydrophilic group in the modifying monomer (A) include —$NH_2$, —$PO_3M$, —$PO(OM)_2$, —$OPO_3M$, —$OPO(OM)_2$, —$SO_3M$, —$OSO_3M$, and —COOM, wherein M is H, a metal atom, $NR^7_4$, imidazolium optionally having a substituent, pyridinium optionally having a substituent, or phosphonium optionally having a substituent, wherein $R^7$ is H or an organic group and may be the same or different; any two of them optionally bind to each other to form a ring. The hydrophilic group is particularly preferably —$SO_3M$ or —COOM. The organic group for $R^7$ is preferably an alkyl group. $R^7$ is preferably H or a $C_{1-10}$ organic group, more preferably H or a $C_{1-4}$ organic group, and still more preferably H or a $C_{1-4}$ alkyl group.

Examples of the metal atom include monovalent and divalent metal atoms, and examples thereof include alkali metals (Group 1) and alkaline earth metals (Group 2), and preferred is Na, K or Li.

Examples of the "functional group capable of reacting by radical polymerization" in the modifying monomer (A) include a group having an ethylenically unsaturated bond such as a vinyl group and an allyl group. The group having an ethylenically unsaturated bond may be represented by the following formula:

$$CX^eX^g=CX^fR—$$

wherein $X^e$, $X^f$ and $X^g$ are each independently F, Cl, H, $CF_3$, $CF_2H$, $CFH_2$ or $CH_3$; and R is a linking group. Examples of the linking group R include linking groups as $R^a$ which will be described later. Preferred examples thereof include groups having an unsaturated bond such as —CH=$CH_2$, —CF=$CH_2$, —CH=$CF_2$, —CF=$CF_2$, —$CH_2$—CH=$CH_2$, —$CF_2$—CF=$CH_2$, —$CF_2$—CF=$CF_2$, —(C=O)—CH=$CH_2$, —(C=O)—CF=$CH_2$, —(C=O)—CH=$CF_2$, —(C=O)—CF=$CF_2$, —(C=O)—C($CH_3$)=$CH_2$, —(C=O)—C($CF_3$)=$CH_2$, —(C=O)—C($CH_3$)=$CF_2$, —(C=O)—C($CF_3$)=$CF_2$, —O—$CH_2$—CH=$CH_2$, —O—$CF_2$—CF=$CH_2$, —O—$CH_2$—CH=$CF_2$, and —O—$CF_2$—CF=$CF_2$.

Since the modifying monomer (A) has a functional group capable of reacting by radical polymerization, it is presumed that when used in the polymerization, it reacts with TFE at the initial stage of the polymerization reaction and forms particles with high stability having a hydrophilic group derived from the modifying monomer (A). Therefore, it is considered that the number of particles increases when the polymerization is performed in the presence of the modifying monomer (A).

The polymerization may be performed in the presence of one or more of the modifying monomers (A).

In the polymerization, a compound having an unsaturated bond may be used as the modifying monomer (A).

The modifying monomer (A) is preferably a compound represented by the general formula (4):

$$CX^iX^k=CX^jR^a—(CZ^1Z^2)_k—Y^3 \qquad (4)$$

wherein $X^i$, $X^j$, and $X^k$ are each independently F, Cl, H, or $CF_3$; $Y^3$ is a hydrophilic group; $R^a$ is a linking group; $Z^1$ and $Z^2$ are each independently H, F, or $CF_3$; and k is 0 or 1.

Examples of the hydrophilic group include —$NH_2$, —$PO_3M$, —$PO(OM)_2$, —$OPO_3M$, —$OPO(OM)_2$, —$SO_3M$, —$OSO_3M$, and —COOM, wherein M is H, a metal atom, $NR^7_4$, imidazolium optionally having a substituent, pyridinium optionally having a substituent, or phosphonium optionally having a substituent, wherein $R_7$ is H or an organic group and may be the same or different; and any two of them optionally bind to each other to form a ring. The hydrophilic group is particularly preferably —SOM or —COOM. The organic group for $R^7$ is preferably an alkyl group. $R^7$ is preferably H or a $C_{1-10}$ organic group, more preferably H or a $C_{1-4}$ organic group, and still more preferably H or a $C_{1-4}$ alkyl group.

Examples of the metal atom include monovalent and divalent metal atoms, and examples thereof include alkali metals (Group 1) and alkaline earth metals (Group 2), and preferred is Na, K or Li.

By using the modifying monomer (A), it is possible to obtain an aqueous dispersion having a smaller average primary particle size and superior stability. Also, the aspect ratio of the primary particles can be made smaller.

$R^a$ is a linking group. The term "linking group" as used herein refers to a divalent linking group. The linking group may be a single bond, and preferably contains at least one carbon atom, and the number of carbon atoms may be 2 or more, 4 or more, 8 or more, 10 or more, or 20 or more. The upper limit thereof is not limited, and may be 100 or less, or 50 or less, for example.

The linking group may be linear or branched, cyclic or acyclic, saturated or unsaturated, substituted or unsubstituted, and may optionally contain one or more heteroatoms selected from the group consisting of sulfur, oxygen and nitrogen, and may optionally contain one or more functional groups selected from the group consisting of ester, amide, sulfonamide, carbonyl, carbonate, urethane, urea and carbamate. The linking group may not contain a carbon atom and may be a catenary heteroatom such as oxygen, sulfur or nitrogen.

$R^a$ is preferably, for example, a catenary heteroatom such as oxygen, sulfur, or nitrogen, or a divalent organic group.

When $R^a$ is a divalent organic group, the hydrogen atom bonded to the carbon atom may be replaced by a halogen other than fluorine, such as chlorine, and may or may not contain a double bond. Further, $R^a$ may be linear or branched, may be either cyclic or acyclic. Further, $R^a$ is a functional group (for example, esters, ethers, ketones, amines, and halides).

$R^a$ may also be a non-fluorinated divalent organic group or a partially fluorinated or perfluorinated divalent organic group.

$R^a$ may be, for example, a hydrocarbon group in which no fluorine atom is bonded to a carbon atom, a hydrocarbon group in which a part of hydrogen atoms bonded to a carbon atom is substituted with a fluorine atom, a hydrocarbon group in which all of the hydrogen atoms bonded to carbon atoms are substituted with a fluorine atom, or a hydrocarbon group containing —(C=O)—, —(C=O)—O—, or —(C=O)—, which may contain an oxygen atom, contain a double bond, or contain a functional group.

$R^a$ is preferably —(C=O)—, —(C=O)—O—, or a hydrocarbon group having 1 to 100 carbon atoms which may contain an ether bond and may contain a carbonyl group, and in the hydrocarbon group, part or all of hydrogen atoms bonded to carbon atoms may be substituted with fluorine.

$R^a$ is preferably at least one selected from the group consisting of —$(CH_2)_a$—, —$(CF_2)_a$—, —O—$(CF_2)_a$—, —$(CF_2)_a$—O—$(CF_2)_b$—, —O$(CF_2)_a$—O—$(CF_2)_b$—, —$(CF_2)_a$—[O—$(CF_2)_b]_c$—, —O$(CF_2)_a$—[O—$(CF_2)_b]_c$—, —[$(CF_2)_a$—O]$_b$—[$(CF_2)_c$—O]$_a$—, —O[$(CF_2)_a$—O]$_b$—

$[(CF_2)_c-O]_a-$, $-O-[CF_2CF(CF_3)O]_a-(CF_2)_b-$, $-(C=O)-$, $-(C=O)-O-$, $-(C=O)-(CH_2)_a-$, $-(C=O)-(CF_2)_a-$, $-(C=O)-O-(CH_2)_a-$, $(C=O)-O-(CF_2)_a-$, $-(C=O)-[(CH_2)_a-O]_b-$, $-(C=O)-[(CF_2)_a-O]_b-$, $(C=O)-O[(CH_2)_a-O]_b-$, $-(C=O)-O[(CF_2)_a-O]_b-$, $-(C=O)-O[(CH_2)_a-O]_b-(CH_2)_a-O]_b-(CH_2)_c-$, $-(C=O)-O[(CF_2)_a-O]_b-(CF_2)_c-$, $-(C=O)-(CH_2)_a-O-(CH_2)_b-$, $-(C=O)-(CF_2)_a-O-(CF_2)_b-$, $-(C=O)-O-(CH_2)_a-O-(CH_2)_b-$, $-(C=O)-O-(CF_2)_a-O-(CF_2)_b-$, $-(C=O)-O-C_6H_4-$, and combinations thereof.

In the formula, a, b, c, and d are independently at least 1 or more. a, b, c and d may be independently 2 or more, 3 or more, 4 or more, 10 or more, and 20 or more. The upper limit of a, b, c and d is, for example, 100.

Specific examples suitable for $R^a$ include $-CF_2-O-$, $-CF_2-O-CF_2-$, $-CF_2-O-CH_2-$, $-CF_2-O-CH_2CF_2-$, $-CF_2-O-CF_2CF_2-$, $-CF_2-O-CF_2CH_2-$, $-CF_2-O-CF_2CF_2CH_2-$, $-CF_2-O-CF(CF_3)-$, $-CF_2-O-CF(CF_3)CF_2-$, $-CF_2-O-CF(CF_3)CF_2-O-$, $-CF_2-O-CF(CF_3)CH_2-$, $-(C=O)-$, $-(C=O)-O-$, $-(C=O)-(CH_2)-$, $-(C=O)-(CF_2)-$, $-(C=O)-$. $O-(CH_2)-$, $-(C=O)-O-(CF_2)-$, $-(C=O)-[(CH_2)_2-O]_n-$, $-(C=O)-[(CF_2)_2-O]_n-$, $-(C=O)-O[(CH_2)_2-O]_n-$, $-(C=O)-O[(CF_2)_2-O]_n-$, $-(C=O)-O[(CH_2)_2-O]_n-(CH_2)-$, $-(C=O)-O[(CF_2)_2-O]_n-(CF_2)-$, $-(C=O)-(CH_2)_2-O-(CH_2)-$, $-(C=O)-(CF_2)_2-O-(CF_2)-$, $-(C=O)-O-(CH_2)_2-O-(CH_2)-$, $-(C=O)-O-(CF_2)_2-O-(CF_2)-$, and $-(C=O)-O-C_6H_4-$. Of these, $R^a$ is preferably, $-CF_2-O-$, $-CF_2-O-CF_2-$, $-CF_2-O-CF_2CF_2-$, $-CF_2-O-CF(CF_3)-$, $-CF_2-O-CF(CF_3)CF_2-$, $-CF_2-O-CF(CF_3)CF_2-O-$, $-(C=O)-$, $-(C=O)-O-$, $-(C=O)-(CH_2)-$, $-(C=O)-O-(CH_2)-$, $-(C=O)-O[(CH_2)_2-O]_n-$, $-(C=O)-O[(CH_2)_2-O]_n-(CH_2)-$, $-(C=O)-(CH_2)_2-O-(CH_2)-$, or $-(C=O)-O-C_6H_4-$.

In the formula, n is an integer of 1 to 10.

$-R^a-(CZ^1Z^2)_k-$ in the general formula (4) is preferably $-CF_2-O-CF_2-$, $-CF_2-O-CF(CF_3)-$, $-CF_2-O-C(CF_3)_2-$, $-CF_2-O-CF_2-CF_2-$, $-CF_2-O-CF_2-CF(CF_3)-$, $-CF_2-O-CF_2-C(CF_3)_2-$, $-CF_2-O-CF_2CF_2-CF_2-$, $-CF_2-O-CF_2CF_2-CF(CF_3)-$, $-CF_2-O-CF_2CF_2-C(CF_3)_2-$, $-CF_2-O-CF(CF_3)-CF_2-$, $-CF_2-O-CF(CF_3)-CF(CF_3)-$, $-CF_2-O-CF(CF_3)-C(CF_3)_2-$, $-CF_2-O-CF(CF_3)CF_2-CF_2-$, $-CF_2-O-CF(CF_3)-CF(CF_3)-$, $-CF_2-O-CF(CF_3)-C(CF_3)_2-$, $-CF_2-O-CF(CF_3)CF_2-CF(CF_3)-$, $-CF_2-O-CF(CF_3)CF_2-C(CF_3)_2-$, $-CF_2-O-CF(CF_3)CF_2-O-CF_2-$, $-CF_2-O-CF(CF_3)CF_2-O-CF(CF_3)-$, $-CF_2-O-CF(CF_3)CF_2-O-C(CF_3)_2-$, $-(C=O)-$, $-(C=O)-O-$, $-(C=O)-(CH_2)-$, $(C=O)-(CF_2)-$, $-(C=O)-O-(CH_2)-$, $-(C=O)-O-(CF_2)-$, $-(C=O)-[(CH_2)_2-O]_n-(CH_2)-$, $-(C=O)-[(CF_2)_2-O]_n-(CF_2)-$, $-(C=O)-[(CH_2)_2-O]_n-(CH_2)-(CH_2)-$, $-(C=O)-[(CF_2)_2-O]_n-(CF_2)-(CF_2)-$, $-(C=O)-O[(CH_2)_2-O]_n-(CF_2)-$, $-(C=O)-O[(CH_2)_2-O]_n-(CH_2)-(CH_2)-$, $-(C=O)-O[(CF_2)_2-O]_n-(CF_2)-$, $-(C=O)-O[(CF_2)_2-O]_n-(CF_2)-(CF_2)-$, $-(C=O)-(CH_2)_2-O-(CH_2)-$, $-(C=O)-O-(CH_2)_2-O-(CH_2)-$, $-(C=O)-O-(CH_2)_2-O-(CH_2)-(CH_2)-$, $-(C=O)-O-(CF_2)_2-O-(CF_2)-$, $-(C=O)-O-(CH_2)_2-O-(CH_2)-C(CF_3)_2-$, $-(C=O)-O-(CF_2)_2-O-(CF_2)-C(CF_3)_2-$, or $-(C=O)-O-C_6H_4-C(CF_3)_2-$, and more preferably $-CF_2-O-CF(CF_3)-$, $-CF_2-O-CF_2-CF(CF_3)-$, $-CF_2-O-CF_2CF_2-CF(CF_3)-$, $-CF_2-O-CF(CF_3)-CF(CF_3)-$, $-CF_2-O-CF(CF_3)CF_2-CF(CF_3)-$, $-CF_2-O-CF(CF_3)CF_2-O-CF(CF_3)-$, $-(C=O)-$, $-(C=O)-O-(CH_2)-$, $-(C=O)-O-(CH_2)-(CH_2)-$, $-(C=O)-O[(CH_2)_2-O]_n-(CH_2)-(CH_2)-$, $-(C=O)-O-(CH_2)_2-O-(CH_2)C(CF_3)_2-$, or $-(C=O)-O-C_6H_4-C(CF_3)_2-$.

In the formula, n is an integer of 1 to 10.

Specific examples of the compound represented by the general formula (4) include

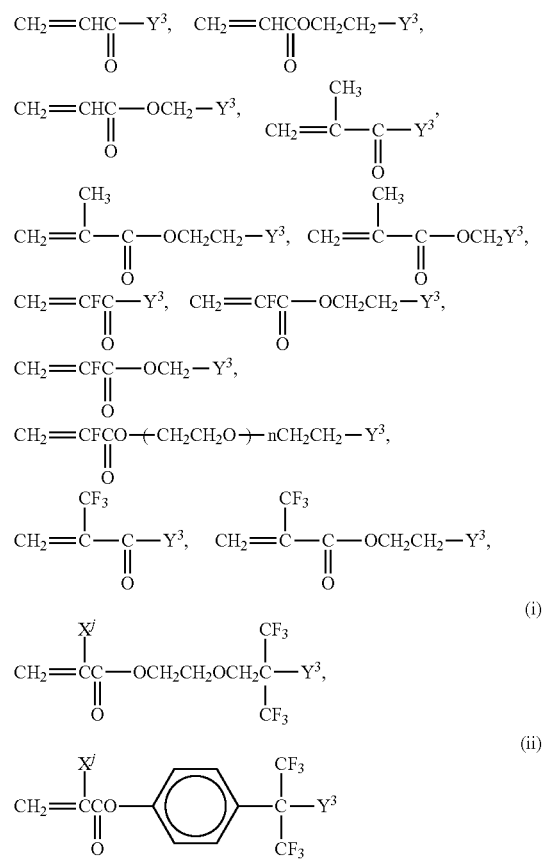

wherein $X^j$ and $Y^3$ are as described above, and n is an integer from 1 to 10.

$R^a$ is preferably a divalent group represented by following general formula (r1):

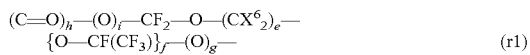

(r1)

wherein each $X^6$ is independently H, F, or $CF_3$, e is an integer of 0 to 3, f is an integer of 0 to 3, g is 0 or 1, h is 0 or 1, and i is 0 or 1, and is also preferably a divalent group represented by following general formula (r2):

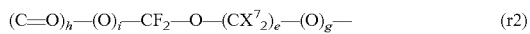

(r2)

wherein each $X^7$ is independently H, F, or $CF_3$, e is an integer of 0 to 3, g is 0 or 1, h is 0 or 1, and i is 0 or 1.

$R^a$—$(CZ^1Z^2)_k$— of the general formula (4) is preferably a divalent group represented by the following formula (t1):

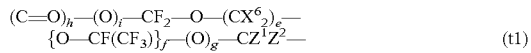

(C=O)$_h$—(O)$_i$—CF$_2$—O—(CX$^6{}_2$)$_e$—{O—CF(CF$_3$)}$_f$—(O)$_g$—CZ$^1$Z$^2$— (t1)

wherein each $X^6$ is independently H, F, or CF$_3$, e is an integer of 0 to 3, f is an integer of 0 to 3, g is 0 or 1, h is 0 or 1, i is 0 or 1, and $Z^1$ and $Z^2$ are each independently F or CF$_3$, and in the formula (t1), it is more preferable that one of $Z^1$ and $Z^2$ is F and the other is CF$_3$.

Further, in the general formula (4), $R^a$—$(CZ^1Z^2)_k$— is also preferably a divalent group represented by the following formula (t2):

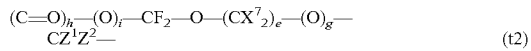

(C=O)$_h$—(O)$_i$—CF$_2$—O—(CX$^7{}_2$)$_e$—(O)$_g$—CZ$^1$Z$^2$— (t2)

wherein each $X^7$ is independently H, F, or CF$_3$, e is an integer of 0 to 3, g is 0 or 1, h is 0 or 1, i is 0 or 1, and $Z^1$ and $Z^2$ are each independently F or CF$_3$, and in the formula (t2), it is more preferable that one of $Z^1$ and $Z^2$ is F and the other is CF$_3$.

It is also preferable that the compound represented by the general formula (4) has a C—F bond and does not have a C—H bond, except for the hydrophilic group ($Y^3$). That is, in the general formula (4), it is preferable that all of $X^i$, $X^j$, and $X^k$ are F, and $R^a$ is a perfluoroalkylene group having one or more carbon atoms, and the perfluoroalkylene group may be linear or branched, cyclic or acyclic, and may contain at least one catenary heteroatom. The number of carbon atoms of the perfluoroalkylene group may be 2 to 20, and may be 4 to 18.

The compound represented by the general formula (4) may be partially fluorinated. That is, the compound represented by the general formula (4) preferably has at least one hydrogen atom bonded to a carbon atom and at least one fluorine atom bonded to a carbon atom, except for hydrophilic groups ($Y^3$).

The compound represented by the general formula (4) is also preferably a compound represented by the following formula (4a):

CF$_2$=CF—O—Rf$^0$—Y$^3$ (4a)

wherein $Y^3$ is a hydrophilic group, and Rf$^0$ is a perfluorinated divalent linking group that is perfluorinated and may be linear or branched, cyclic or acyclic, saturated or unsaturated, substituted or unsubstituted, and optionally contains one or more heteroatoms selected from the group consisting of sulfur, oxygen and nitrogen.

The compound represented by the general formula (4) is also preferably a compound represented by the following formula (4b):

CH$_2$=CH—O—Rf$^0$—Y$^3$ (4b)

wherein $Y^3$ is a hydrophilic group and $R_f{}^0$ is a perfluorinated divalent linking group defined by the formula (4a).

In a preferred embodiment, in the general formula (4), $Y^3$ is —OSO$_3$M. Examples of the compound represented by the general formula (4) when $Y^3$ is —OSO$_3$M include CF$_2$=CF(OCF$_2$CF$_2$CH$_2$OSO$_3$M), CH$_2$=CH((CF$_2$)$_4$CH$_2$OSO$_3$M), CF$_2$=CF(O(CF$_2$)$_4$CH$_2$OSO$_3$M), CF$_2$=CF(OCF$_2$CF(CF$_3$)CH$_2$OSO$_3$M), CF$_2$=CF(OCF$_2$CF(CF$_3$)OCF$_2$CF$_2$CH$_2$OSO$_3$M), CH$_2$=CH((CF$_2$)$_4$CH$_2$OSO$_3$M), CF$_2$=CF(OCF$_2$CF$_2$SO$_2$N(CH$_3$)CH$_2$CH$_2$OSO$_3$M), CH$_2$=CH(CF$_2$CF$_2$CH$_2$OSO$_3$M), CF$_2$=CF(OCF$_2$CF$_2$CF$_2$CF$_2$SO$_2$N(CH$_3$)CH$_2$CH$_2$OSO$_3$M), and CH$_2$=CH(CF$_2$CF$_2$CH$_2$OSO$_3$M). In the formula, M is as described above.

In a preferred embodiment, in the general formula (4), $Y^3$ is —SO$_3$M. Examples of the compound represented by the general formula (4) when $Y^3$ is —SOM include CF$_2$=CF(OCF$_2$CF$_2$SO$_3$M), CF$_2$=CF(O(CF$_2$)$_4$SO$_3$M), CF$_2$=CF(OCF$_2$CF(CF$_3$)SO$_3$M), CF$_2$=CF(OCF$_2$CF(CF$_3$)OCF$_2$CF$_2$SO$_3$M), CH$_2$=CH(CF$_2$CF$_2$SO$_3$M), CF$_2$=CF(OCF$_2$CF(CF$_3$)OCF$_2$CF$_2$CF$_2$CF$_2$SO$_3$M), CH$_2$=CH((CF$_2$)$_4$SO$_3$M), CH$_2$=CH(CF$_2$CF$_2$SO$_3$M), and CH$_2$=CH((CF$_2$)$_3$SO$_3$M). In the formula, M is as described above.

In a preferred embodiment, in the general formula (4), $Y^3$ is —COOM. When $Y^3$ is —COOM, examples of the compound represented by the general formula (4) include CF$_2$=CF(OCF$_2$CF$_2$COOM), CF$_2$=CF(OCF$_2$CF$_2$CF$_2$COOM), CF$_2$=CF(O(CF$_2$)$_5$COOM), CF$_2$=CF(OCF$_2$CF(CF$_3$)COOM), CF$_2$=CF(OCF$_2$CF(CF$_3$)O(CF$_2$)$_n$COOM) (n is greater than 1), CH$_2$=CH(CF$_2$CF$_2$COOM), CH$_2$=CH((CF$_2$)$_4$COOM), CH$_2$=CH(CF$_2$CF$_2$COOM), CH$_2$=CH((CF$_2$)$_3$COOM), CF$_2$=CF(OCF$_2$CF$_2$SO$_2$NR'CH$_2$COOM), CF$_2$=CF(O(CF$_2$)$_4$SO$_2$NR'CH$_2$COOM), CF$_2$=CF(OCF$_2$CF(CF$_3$)SO$_2$NR'CH$_2$COOM), CF$_2$=CF(OCF$_2$CF(CF$_3$)OCF$_2$CF$_2$SO$_2$NR'CH$_2$COOM), CH$_2$=CH(CF$_2$CF$_2$SO$_2$NR'CH$_2$COOM), CF$_2$=CF(OCF$_2$CF(CF$_3$)OCF$_2$CF$_2$CF$_2$CF$_2$SO$_2$NR'CH$_2$COOM), CH$_2$=CH((CF$_2$)$_4$SO$_2$NR'CH$_2$COOM), CH$_2$=CH(CF$_2$CF$_2$SO$_2$NR'CH$_2$COOM), and CH$_2$=CH((CF$_2$)$_3$SO$_2$NR'CH$_2$COOM). In the formula, R' is H or a $C_{1-4}$ alkyl group, and M is as described above.

In a preferred embodiment, in the general formula (4), $Y^3$ is —OPO$_3$M or —OP(O)(OM)$_2$. Examples of the compound represented by the general formula (4) when $Y^3$ is —OPO$_3$M or —OP(O)(OM)$_2$ include CF$_2$=CF(OCF$_2$CF$_2$CH$_2$OP(O)(OM)$_2$), CF$_2$=CF(O(CF$_2$)$_4$CH$_2$OP(O)(OM)$_2$), CF$_2$=CF(OCF$_2$CF(CF$_3$)CH$_2$OP(O)(OM)$_2$), CF$_2$=CF(OCF$_2$CF(CF$_3$)OCF$_2$CF$_2$CH$_2$OP(O)(OM)$_2$), CF$_2$=CF(OCF$_2$CF$_2$SO$_2$N(CH$_3$)CH$_2$CH$_2$OP(O)(OM)$_2$), CF$_2$=CF(OCF$_2$CF$_2$CF$_2$CF$_2$SO$_2$N(CH$_3$)CH$_2$CH$_2$OP(O)(OM)$_2$), CH$_2$=CH(CF$_2$CF$_2$CH$_2$OP(O)(OM)$_2$), CH$_2$=CH((CF$_2$)$_4$CH$_2$OP(O)(OM)$_2$), CH$_2$=CH(CF$_2$CF$_2$CH$_2$OP(O)(OM)$_2$), and CH$_2$=CH((CF$_2$)$_3$CH$_2$OP(O)(OM)$_2$)—. In the formula, M is as described above.

In a preferred embodiment, in the general formula (4), $Y^3$ is —PO$_3$M or —P(O)(OM)$_2$. Examples of the compound represented by the general formula (4) when $Y^3$ is —PO$_3$M or —P(O)(OM)$_2$ include CF$_2$=CF(OCF$_2$CF$_2$P(O)(OM)$_2$), CF$_2$=CF(O(CF$_2$)$_4$P(O)(OM)$_2$), CF$_2$=CF(OCF$_2$CF(CF$_3$)P(O)(OM)$_2$), CF$_2$=CF(OCF$_2$CF(CF$_3$)OCF$_2$CF$_2$P(O)(OM)$_2$), CH$_2$=CH(CF$_2$CF$_2$P(O)(OM)$_2$), CH$_2$=CH((CF$_2$)$_4$P(O)(OM)$_2$), CH$_2$=CH(CF$_2$CF$_2$P(O)(OM)$_2$), and CH$_2$=CH((CF$_2$)$_3$P(O)(OM)$_2$), and in the formula, M is as described above.

The compound represented by the general formula (4) is preferably at least one selected from the group consisting of a monomer represented by the following general formula (5):

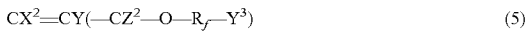

CX$^2$=CY(—CZ$^2$—O—R$_f$—Y$^3$) (5)

wherein X is the same or different, and is —H or —F, Y is —H, —F, an alkyl group or a fluorine-containing alkyl group, and Z is the same or different, —H, —F, an alkyl group or a fluorine-containing alkyl group; R$_f$ is a fluorine-containing alkylene group having 1 to 40 carbon atoms or a fluorine-containing alkylene group having 2 to 100 carbon atoms and having an ether bond; and $Y^3$ is as described above;

a monomer represented by the following general formula (6):

$$CX^2=CY(-O-R_f-Y^3) \quad (6)$$

wherein X is the same or different, and is —H or —F, Y is —H, —F, an alkyl group or a fluorine-containing alkyl group, and $R_f$ is a fluorine-containing alkylene group having 1 to 40 carbon atoms or a fluorine-containing alkylene group having 2 to 100 carbon atoms and having an ether bond; and $Y^3$ is as described above; and a monomer represented by the following general formula (7):

$$CX^2=CY(-R_f-Y^3) \quad (7)$$

wherein X is the same or different, and is —H or —F, Y is —H, —F, an alkyl group or a fluorine-containing alkyl group, and $R_f$ is a fluorine-containing alkylene group having 1 to 40 carbon atoms or a fluorine-containing alkylene group having 2 to 100 carbon atoms and having an ether bond; and $Y^3$ is as described above.

The fluorine-containing alkylene group having 2 to 100 carbon atoms and having an ether bond is an alkylene group which does not include a structure in which an oxygen atom is an end and contains an ether bond between carbon atoms.

In the general formula (5), X is —H or —F. X may be both —F or at least one of them may be —H. For example, one may be —F and the other may be —H, or both may be —H.

In the general formula (5), Y is —H, —F, an alkyl group, or a fluorine-containing alkyl group.

The alkyl group may be a fluorine atom-free alkyl group and may have 1 or more carbon atoms. The alkyl group preferably has 6 or less, more preferably 4 or less, and still more preferably 3 or less carbon atoms.

The fluorine-containing alkyl group is an alkyl group containing at least one fluorine atom, and may have 1 or more carbon atoms. The fluorine-containing alkyl group preferably has 6 or less, more preferably 4 or less, and still more preferably 3 or less carbon atoms.

Y is preferably —H, —F, or —CF 3, and more preferably —F.

In the general formula (5), Z is the same or different, and is —H, —F, an alkyl group or a fluoroalkyl group.

The alkyl group may be a fluorine atom-free alkyl group and may have 1 or more carbon atoms. The alkyl group preferably has 6 or less, more preferably 4 or less, and still more preferably 3 or less carbon atoms.

The fluorine-containing alkyl group is an alkyl group containing at least one fluorine atom, and may have 1 or more carbon atoms. The fluorine-containing alkyl group preferably has 6 or less, more preferably 4 or less, and still more preferably 3 or less carbon atoms.

Z is preferably —H, —F, or —$CF_3$, and more preferably —F.

In the general formula (5), at least one of X, Y, and Z preferably contains a fluorine atom. For example, X may be —H and Y and Z may be —F.

In the general formula (5), $R_f$ is a fluorine-containing alkylene group having 1 to 40 carbon atoms or a fluorine-containing alkylene group having 2 to 100 carbon atoms and having an ether bond.

The fluorine-containing alkylene group preferably has 2 or more carbon atoms. Further, the fluorine-containing alkylene group preferably has 30 or less, more preferably 20 or less, and further preferably 10 or less. Examples of the fluorine-containing alkylene group include —$CF_2$—, —$CH_2CF_2$—, —$CF_2CF_2$—, —$CF_2CH_2$—, —$CF_2CF_2CH_2$—, —$CF(CF_3)$—, —$CF(CF_3)CF_2$—, and —$CF(CF_3)CH_2$—. The fluorine-containing alkylene group is preferably a perfluoroalkylene group.

The fluorine-containing alkylene group having an ether bond preferably has 3 or more carbon atoms. Further, the fluorine-containing alkylene group having an ether bond preferably has 60 or less, more preferably 30 or less, and still more preferably 12 or less carbon atoms.

The fluorine-containing alkylene group having an ether bond is also preferably a divalent group represented by the following formula:

$$-(CFCF_2O)_{p1}-(CF_2O)_{q1}-(CZ^2{}_2CF_2CF_2O)_{r1}-CZ^3-(CF_2)_{s1}-(CH_2)_{t1}-$$
$$\phantom{xxxxx}|\phantom{xxxxxxxxxxxxxxxxxxxxxxxxxxxxxxxxxxx}|$$
$$\phantom{xxxx}Z^1\phantom{xxxxxxxxxxxxxxxxxxxxxxxxxxxxxxxxxx}Z^4$$

wherein $Z^1$ is F or $CF_3$; $Z^2$ and $Z^3$ are each H or F; $Z^4$ is H, F, or $CF_3$; p1+q1+r1 is an integer of 1 to 10; s1 is 0 or 1; and t1 is an integer of 0 to 5.

Specific examples of the fluorine-containing alkylene group having an ether bond include —$CF(CF_3)CF_2$—O—$CF(CF_3)$—, —$(CF(CF_3)CF_2$—O$)_n$—$CF(CF_3)$— (wherein n is an integer of 1 to 10), —$CF(CF_3)CF_2$—O—$CF(CF_3)CH_2$—, —$(CF(CF_3)CF_2$—O$)_n$—$CF(CF_3)CH_2$— (wherein n is an integer of 1 to 10), —$CH_2CF_2CF_2O$—$CH_2CF_2CH_2$—, —$CF_2CF_2CF_2O$—$CF_2CF_2$—, —$CF_2CF_2CF_2O$—$CF_2CF_2CH_2$—, —$CF_2CF_2O$—$CF_2$—, and —$CF_2CF_2O$—$CF_2CH_2$—. The fluorine-containing alkylene group having an ether bond is preferably a perfluoroalkylene group.

In the general formula (5), $Y^3$ is preferably —COOM, —$SO_3M$, or —$OSO_3M$, wherein M is H, a metal atom, $NR^7{}_4$, imidazolium optionally having a substituent, pyridinium optionally having a substituent, or phosphonium optionally having a substituent, wherein $R_7$ is H or an organic group and may be the same or different; and any two of thereof optionally bind to each other to form a ring.

The organic group for $R^7$ is preferably an alkyl group. $R^7$ is preferably H or a $C_{1-10}$ organic group, more preferably H or a $C_{1-4}$ organic group, and still more preferably H or a $C_{1-4}$ alkyl group.

Examples of the metal atom include alkali metals (Group 1) and alkaline earth metals (Group 2), and preferred is Na, K, or Li.

M is preferably —H, a metal atom, or —$NR^7{}_4$, more preferably —H, an alkali metal (Group 1), an alkaline earth metal (Group 2), or —$NR^7{}_4$, still more preferably —H, —Na, —K, —Li, or —$NH_4$, further preferably —Na, —K, or —$NH_4$, particularly preferably —Na or —$NH_4$, and most preferably —$NH_4$.

$Y^3$ is preferably —COOM or —$SO_3M$, and more preferably —COOM.

The monomer represented by the general formula (5) is preferably a monomer (5a) represented by the following general formula (5a):

$$CH_2=CF(-CF_2-OR_f-Y^3) \quad (5a)$$

wherein Rf and $Y^3$ are as described above.

Specific examples of the monomer represented by the general formula (5a) include a monomer represented by the following formula:

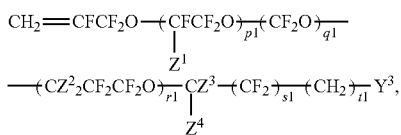

wherein $Z^1$ is F or $CF_3$; $Z^2$ and $Z^3$ are each H or F; $Z^4$ is H, F, or $CF_3$; p1+q1+r1 is an integer of 0 to 10; s1 is 0 or 1; t1 is an integer of 0 to 5; and $Y^3$ is as described above, with the proviso that, when both $Z^3$ and $Z^4$ are H, p1+q1+r1+s1 is not 0. More specific examples thereof include:

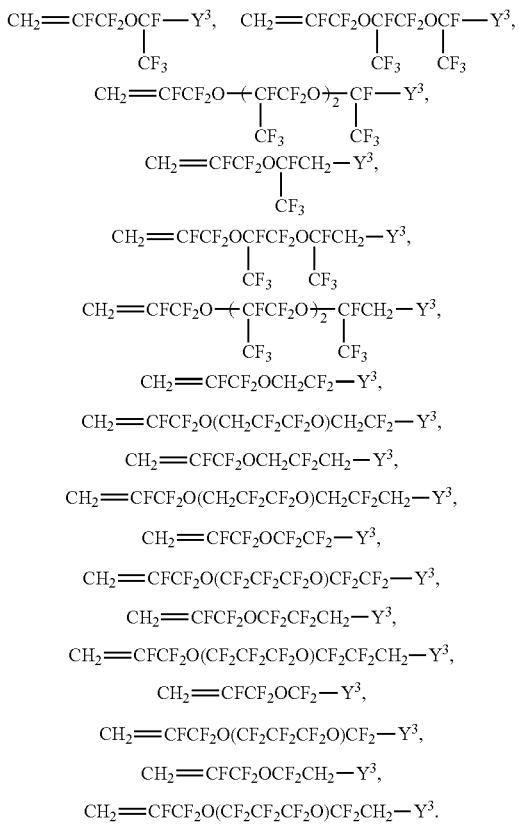

Of these, preferred are:

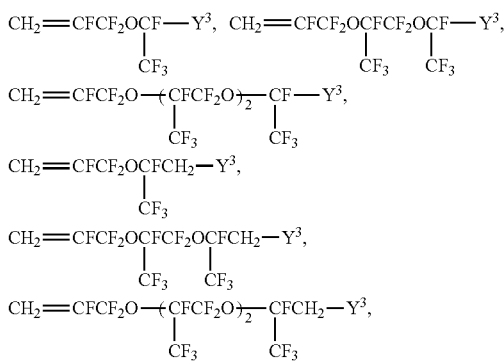

The monomer represented by the general formula (5a) is preferably one in which $Y^3$ in the formula (5a) is —COOM, and in particular, is preferably at least one selected from the group consisting of $CH_2$=$CFCF_2OCF(CF_3)COOM$ and $CH_2$=$CFCF_2OCF(CF_3)CF_2OCF(CF_3)COOM$ (where M is as defined above), and more preferably $CH_2$=$CFCF_2OCF$ $(CF_3)COOM$.

The monomer represented by the general formula (5) is preferably a monomer (5b) represented by the following general formula (5b):

$$CX^2{}_2\!=\!CFCF_2\!-\!O\!-\!(CF(CF_3)CF_2O)_{n5}\!-\!CF(CF_3)\!-\!Y^3 \quad (5b)$$

wherein each $X^2$ is the same and represents F or H; and n5 represents an integer of 0 or 1 to 10, and $Y^3$ is the same as defined above.

In the formula (5b), n5 is preferably 0 or an integer of 1 to 5, more preferably 0, 1 or 2, and still more preferably 0 or 1 in terms of obtaining stability of the aqueous dispersion. $Y^3$ is preferably —COOM in terms of moderate water solubility and stability of the aqueous dispersion can be obtained, and M is preferably H or $NH_4$ in terms of hardly remaining as impurities and improving heat resistance of the obtained molded body.

Examples of the monomer represented by the general formula (5b) include $CH_2$=$CFCF_2OCF(CF_3)COOM$ and $CH_2$=$CFCF_2OCF(CF_3)CF_2OCF(CF_3)COOM$ (where M is as defined above).

Examples of the monomer represented by the general formula (5) further include a monomer represented by the following general formula (5c):

$$CF_2\!=\!CFCF_2\!-\!OR_f\!-\!Y^3 \quad (5c)$$

wherein Rf and $Y^3$ are as described above.
More specific examples thereof include:

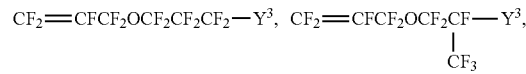

In the general formula (6), X is —H or —F. X may be both —F or at least one of thereof may be —H. For example, one may be —F and the other may be —H, or both may be —H.

In the general formula (6), Y is —H, —F, an alkyl group; or a fluorine-containing alkyl group.

The alkyl group may be a fluorine atom-free alkyl group and may have 1 or more carbon atoms. The alkyl group preferably has 6 or less, more preferably 4 or less, and still more preferably 3 or less carbon atoms.

The fluorine-containing alkyl group is an alkyl group containing at least one fluorine atom, and may have 1 or more carbon atoms. The fluorine-containing alkyl group preferably has 6 or less, more preferably 4 or less, and still more preferably 3 or less carbon atoms.

Y is preferably —H, —F, or —CF 3, and more preferably —F.

In the general formula (6), at least one of X and Y preferably contains a fluorine atom. For example, X may be —H and Y and Z may be —F.

In the general formula (6), Rf is a fluorine-containing alkylene group having 1 to 40 carbon atoms or a fluorine-containing alkylene group having 2 to 100 carbon atoms and having an ether bond.

The fluorine-containing alkylene group preferably has 2 or more carbon atoms. Further, the fluorine-containing alkylene group preferably has 30 or less, more preferably 20 or less, and still more preferably 10 or less carbon atoms. Examples of the fluorine-containing alkylene group include —$CF_2$—, —$CH_2CF_2$—, —$CF_2CF_2$—, —$CF_2CH_2$—, —$CF_2CF_2CH_2$—, —$CF(CF_3)$—, —$CF(CF_3)CF_2$—, and —$CF(CF_3)CH_2$—. The fluorine-containing alkylene group is preferably a perfluoroalkylene group.

In the general formula (6), $Y^3$ is preferably —COOM, —$SO_3M$, or —$OSO_3M$, wherein M is H, a metal atom, $NR^7_4$, imidazolium optionally having a substituent, pyridinium optionally having a substituent, or phosphonium optionally having a substituent, wherein $R^7$ is H or an organic group and may be the same or different; and any two of thereof optionally bind to each other to form a ring.

The organic group for $R^7$ is preferably an alkyl group. $R^7$ is preferably H or a $C_{1-10}$ organic group, more preferably H or a $C_{1-4}$ organic group, and still more preferably H or a $C_{1-4}$ alkyl group.

Examples of the metal atom include alkali metals (Group 1) and alkaline earth metals (Group 2), and preferred is Na, K, or Li.

M is preferably —H, a metal atom, or —$NR^7_4$, more preferably —H, an alkali metal (Group 1), an alkaline earth metal (Group 2), or —$NR^7_4$, still more preferably —H, —Na, —K, —Li, or —$NH_4$, further preferably —Na, —K, or —$NH_4$, particularly preferably —Na or —$NH_4$, and most preferably —$NH_4$.

$Y^3$ is preferably —COOM or —$SO_3M$, and more preferably —COOM.

The monomer represented by the general formula (6) is preferably at least one selected from the group consisting of monomers represented by the following general formulae (6a), (6b), (6c), (6d), and (6e):

$$CF_2=CF-O-(CF_2)_{n1}-Y^3 \quad (6a)$$

wherein n1 represents an integer of 1 to 10 and is as defined above;

$$CF_2=CF-O-(CF_2C(CF_3)F)_{n2}-Y^3 \quad (6b)$$

wherein n2 represents an integer of 1 to 5; and $Y^3$ is as defined above;

$$CF_2=CF-O-(CFX^1)_{n3}-Y^3 \quad (6c)$$

wherein $X^1$ represents F or $CF_3$; n3 represents an integer of 1 to 10; and $Y^3$ is as defined above;

$$CF_2=CF-O-(CF_2CFX^1O)_{n4}-(CF_2)_{n6}-Y^3 \quad (6d)$$

wherein n4 represents an integer of 1 to 10; n6 represents an integer of 1 to 3; and $Y^3$ and $X^1$ are as defined above; and $$CF_2=CF-O-(CF_2CF_2CFX^1O)_{n5}-CF_2CF_2CF_2-Y^3 \quad (6e)$$

wherein n5 represents an integer of 0 to 10; and $Y^3$ and $X^1$ are as defined above.

In the formula (6a), n1 is preferably an integer of 5 or less, and more preferably an integer of 2 or less. $Y^3$ is preferably —COOM in terms of moderate water solubility and obtaining stability of the aqueous dispersion, and M is preferably H or $NH_4$ in terms of hardly remaining as impurities and improving heat resistance of the obtained molded body.

Examples of the monomer represented by the formula (6a) include $CF_2=CF-O-CF_2COOM$, $CF_2=CF(OCF_2CF_2COOM)$, and $CF_2=CF(OCF_2CF_2CF)2COOM)$ (wherein M is as defined above).

In the formula (6b), n2 is preferably an integer of 3 or less in terms of stability of the resulting aqueous dispersion, $Y^3$ is preferably —COOM in terms of moderate water solubility and obtaining stability of the aqueous dispersion, and M is preferably H or $NH_4$ in terms of hardly remaining as impurities and improving heat resistance of the obtained molded body.

In the general formula (6c), n3 is preferably an integer of 5 or less in terms of water solubility, $Y^3$ is preferably —COOM in terms of obtaining moderate water solubility and stability of the aqueous dispersion, and M is preferably H or $NH_4$ in terms of improving dispersion stability.

In the general formula (6d), $X^1$ is preferably —$CF_3$ in terms of stability of the aqueous dispersion, n4 is preferably an integer of 5 or less in terms of water solubility, $Y^3$ is preferably —COOM in terms of obtaining moderate water solubility and stability of the aqueous dispersion, and M is preferably H or $NH_4$.

Examples of the monomer represented by the formula (6d) include $CF_2=CFOCF_2CF(CF_3)OCF_2CF_2COOM$, $CF_2=CFOCF_2CF(CF_3)OCF_2COOM$, and $CF_2=CFOCF_2CF(CF_3)OCF_2CF_2CF_2OOM$ (wherein M represents H, $NH_4$ or an alkali metal).

In the general formula (6e), n5 is preferably an integer of 5 or less in terms of water solubility, $Y^3$ is preferably —COOM in terms of obtaining moderate water solubility and excellent sedimentation stability of the composition, and M is preferably H or $NH_4$.

Examples of the monomer represented by the general formula (6e) include $CF_2=CFOCF_2CF_2CF_2COOM$ (wherein M represents H, $NH_4$, or an alkali metal).

In the general formula (7), $R_f$ is preferably a fluorine-containing alkylene group having 1 to 40 carbon atoms. In the general formula (7), at least one of X and Y preferably contains a fluorine atom.

The monomer represented by the general formula (7) is preferably at least one selected from the group consisting of a monomer represented by the following general formula (7a):

$$CF_2=CF-(CF_2)_{n1}-Y^3 \quad (7a)$$

wherein n1 represents an integer of 1 to 10, and $Y^3$ is as defined above; and a monomer represented by the following general formula (7b):

$$CF_2=CF-(CF_2C(CF_3)F)_{n2}-Y^3 \quad (7b)$$

wherein, n2 represents an integer of 1 to 5, and $Y^3$ is as defined above.

$Y^3$ is preferably —$SO_3M$ or —COOM, wherein M is H, a metal atom, $NR^7_4$, imidazolium optionally having a substituent, pyridinium optionally having a substituent, or phosphonium optionally having a substituent. $R^7$ represents H or an organic group.

In the formula (7a), n1 is preferably an integer of 5 or less, and more preferably an integer of 2 or less. $Y^3$ is preferably —COOM in terms of moderate water solubility and obtaining stability of the aqueous dispersion, and M is preferably H or $NH_4$ in terms of hardly remaining as impurities and improving heat resistance of the obtained molded body.

Examples of the perfluorovinylalkyl compound represented by the formula (7a) include $CF_2=CFCF_2COOM$, wherein $M^1$ is as defined above.

In the formula (7b), n2 is preferably an integer of 3 or less in terms of stability of the resulting aqueous dispersion, $Y^3$ is preferably —COOM in terms of moderate water solubility and obtaining stability of the aqueous dispersion, and M is preferably H or $NH_4$ in terms of hardly remaining as impurities and improving heat resistance of the obtained molded body.

The modified monomer preferably contains a modifying monomer (A), and preferably contains at least one selected from the group consisting of compounds represented by the general formula (5a), the general formula (5b), the general formula (6a), the general formula (6b), the general formula (6c), and the general formula (6d), and more preferably contains a compound represented by the general formula (5a) or the general formula (5b).

When the modifying monomer contains the modifying monomer (A), the content of the polymerization unit based on the modifying monomer (A) is preferably in the range of 0.00001 to 1.0% by mass based on PTFE. The lower limit thereof is more preferably 0.0001% by mass, still more preferably 0.001% by mass, and further preferably 0.005% by mass. The upper limit thereof is 0.90% by mass, 0.50% by mass, 0.40% by mass, 0.30% by mass, 0.20% by mass, 0.15% by mass, 0.10% by mass, 0.08% by mass, 0.05% by mass, and 0.01% by mass in the order of preference.

The PTFE may have a core-shell structure. The core-shell structure is a conventionally known structure, and is a structure of primary particles in an aqueous dispersion that can be produced by the method or the like described in U.S. Pat. No. 6,841,594.

Examples of the polytetrafluoroethylene having a core-shell structure include a core-shell structure including a core portion of a TFE homopolymer and a shell portion of a modified PTFE, a core-shell structure including a core portion of a modified PTFE and a shell portion of a TFE homopolymer, and a core-shell structure including a core portion of a modified PTFE and a shell portion of a modified PTFE having a monomer compositional feature different from that of the modified PTFE constituting the core portion.

The PTFE having a core-shell structure can be obtained, for example, by first polymerizing TFE and optionally a modifying monomer to produce a core portion (TFE homopolymer or modified PTFE), and then polymerizing TFE and optionally a modifying monomer to produce a shell portion (TFE homopolymer or modified PTFE).

The shell portion means a portion constituting a predetermined thickness from the surface of the PTFE primary particle to the inside of the particle, and the core portion means a portion constituting the inside of the shell portion.

In the present specification, the core-shell structure includes all of (1) a core-shell structure including a core portion and a shell portion having different monomer compositional features, (2) a core-shell structure including a core portion and a shell portion having the same monomer compositional feature with different number-average molecular weights in both portions, and (3) a core-shell structure including a core portion and a shell portion having different monomer compositional features with different number-average molecular weights in both portions.

When the shell portion is modified PTFE, the content of the modifying monomer in the shell portion is preferably 0.00001 to 1.0% by mass. The content thereof is more preferably 0.0001% by mass or more, still more preferably 0.001% by mass or more, and further preferably 0.01% by mass or more. Further, the content thereof is more preferably 0.50% by mass or less, and still more preferably 0.30% by mass or less.

When the core portion is modified PTFE, the content of the modifying monomer in the core portion is preferably 0.00001 to 1.0% by mass. The content thereof is more preferably 0.0001% by mass or more, and still more preferably 0.001% by mass or less. Further, the content thereof is more preferably 0.50% by mass or less, and still more preferably 0.30% by mass or less.

The average primary particle size of the PTFE is preferably 500 nm or less, more preferably 400 nm or less, and still more preferably 350 nm or less. By the production method of the present disclosure, PTFE having a small average primary particle size can be obtained. The lower limit of the average primary particle size may be, for example, but not limited to, 50 nm or 100 nm. From the viewpoint of molecular weight, for example, in the case of high-molecular-weight PTFE, it is preferably 100 nm or more, and more preferably 150 nm or more.

The average primary particle size can be measured by dynamic light scattering. The average primary particle size may be measured by preparing a PTFE aqueous dispersion with a solid concentration adjusted to about 1.0% by mass and using a dynamic light scattering method at 25° C. with 70 measurement processes, wherein the solvent (water) has a refractive index of 1.3328 and the solvent (water) has a viscosity of 0.8878 mPa·s. The dynamic light scattering may be performed by, for example, ELSZ-1000S (manufactured by Otsuka Electronics Co., Ltd.).

In the PTFE, the aspect ratio of the primary particles is preferably 1.45 or less. The aspect ratio is more preferably 1.40 or less, still more preferably 1.35 or less, further preferably 1.30 or less, still further preferably 1.25 or less, particularly preferably 1.20 or less, and very particularly preferably 1.15 or less.

When measuring in an aqueous dispersion, the aspect ratio is determined by observing the PTFE aqueous dispersion diluted to have a solid concentration of about 1% by mass with a scanning electron microscope (SEM), performing image processing on 400 or more particles selected at random, and averaging the ratios of the major axis to the minor axis. When measuring powder, the aspect ratio is obtained by irradiating modified PTFE powder with an electron beam, adding the PTFE powder to a fluorosurfactant aqueous solution, and redispersing the PTFE powder with ultrasonic waves to obtain a modified PTFE aqueous dispersion. The aspect ratio is determined from the modified PTFE aqueous dispersion by the same method as the method for measuring the PTFE aqueous dispersion.

In the PTFE, the standard specific gravity (SSG) and the melt viscosity (MV) used as indices of the molecular weight are not limited.

The PTFE powder obtained by the production method of the present disclosure preferably has an average particle size (average secondary particle size) of 100 to 2,000 μm. The lower limit of the average secondary particle size is more preferably 200 μm or more, and still more preferably 300 μm or more. The upper limit of the average secondary particle size is preferably 1,000 μm or less, more preferably 800 μm or less, and particularly preferably 700 μm or less. The average particle size is a value measured in conformity with JIS K 6891.

The PTFE preferably has a standard specific gravity (SSG) of 2.280 or less, more preferably 2.200 or less, still more preferably 2.190 or less, and further preferably 2.180 or less. The SSG is preferably 2.130 or more. The SSG is determined by the water replacement method in conformity with ASTM D-792 using a sample molded in conformity with ASTM D 4895-89.

The peak temperature of the PTFE is preferably 348° C. or lower, more preferably 346° C. or lower, still more preferably 344° C. or lower, further preferably 342° C. or lower, and particularly preferably 340° C. or lower. The peak temperature is a value measured by the following method.

Approximately 10 mg of powder, which has no history of heating to a temperature of 300° C. or more, is precisely weighed and stored in a dedicated aluminum pan, and the peak temperature is measured using TG/DTA (thermogravimetric-differential thermal analyzer). The peak temperature is the temperature corresponding to the maximum value of the differential thermal (DTA) curve obtained by heating the aluminum pan under the condition of 10° C./min in the temperature range from 25° C. to 600° C. in the air atmosphere.

The extrusion pressure of the PTFE is preferably 50.0 MPaG or lower, more preferably 40.0 MPaG or lower, preferably 5.0 MPaG or higher, more preferably 10.0. MPaG or higher, and still more preferably 15.0 MPaG or higher. The extrusion pressure is a value determined by the following method.

To 100 g of PTFE powder, 21.7 g of a lubricant (trade name: Isopar H®, manufactured by Exxon Mobil Corporation) is added and mixed for 3 minutes in a glass bottle at room temperature. Then, the glass bottle is left to stand at room temperature (25° C.) for at least 1 hour before extrusion to obtain a lubricated resin. The lubricated resin is paste extruded at a reduction ratio of 100:1 at room temperature through an orifice (diameter 2.5 mm, land length 11 mm, entrance angle) 30° into a uniform beading (beading:extruded body). The extrusion speed, i.e. ram speed, is 20 inch/min (51 cm/min). The extrusion pressure is a value obtained by measuring the load when the extrusion load becomes balanced in the paste extrusion and dividing the measured load by the cross-sectional area of the cylinder used in the paste extrusion.

The PTFE is usually stretchable, fibrillatable and non-molten secondary processible.

The non-molten secondary processible means a property that the melt flow rate cannot be measured at a temperature higher than the crystal melting point, that is, a property that does not easily flow even in the melting temperature region, in conformity with ASTM D-1238 and D-2116.

In production of the PTFE, the carboxylic acid type hydrocarbon surfactant can be used within the use range described for the production method of the present disclosure. The concentration of the surfactant is not limited as long as it is within the above ranges, and is usually added at a critical micelle concentration (CMC) or less at the initiation of polymerization. When the amount added is large, needle-like particles having a large aspect ratio are generated, and the aqueous dispersion becomes gel-like and the stability is impaired.

The lower limit of the amount of the carboxylic acid type hydrocarbon surfactant used is preferably 0.0001% by mass, more preferably 0.001% by mass, still more preferably 0.01% by mass, and particularly preferably 0.1% by mass, based on the aqueous medium. The upper limit of the amount of the surfactant used is preferably 10% by mass, more preferably 5% by mass, still more preferably 3% by mass, and particularly preferably 2% by mass, based on the aqueous medium.

The carboxylic acid type hydrocarbon surfactant may be added to the reaction vessel at once before initiation of the polymerization, may be added at once after initiation of the polymerization, may be added in multiple portions during the polymerization, or may be added continuously during the polymerization.

In production of the PTFE, the radical polymerization initiator used may be a persulfate, an organic peroxide, or a mixture thereof. Examples of the persulfate include ammonium persulfate and potassium persulfate. Examples of the organic peroxide include disuccinic acid peroxide and diglutaric acid peroxide.

The redox-based polymerization initiator used is preferably a redox initiator in which an oxidizing agent and a reducing agent are combined. Examples of the oxidizing agent include persulfates, organic peroxides, potassium permanganate, manganese triacetate, and ammonium cerium nitrate. Examples of the reducing agent include bromate, diimine, and oxalic acid. Examples of the persulfates include ammonium persulfate and potassium persulfate. In order to increase the decomposition rate of the initiator, the combination of the redox initiator may preferably contain a copper salt or an iron salt. An example of the copper salt is copper (II) sulfate and an example of the iron salt is iron (II) sulfate.

Examples of the redox initiator include potassium permanganate/oxalic acid, potassium permanganate/ammonium oxalate, manganese triacetate/oxalic acid, manganese triacetate/ammonium oxalate, ammonium cerium nitrate/oxalic acid, and ammonium cerium nitrate/ammonium oxalate, and potassium permanganate/oxalic acid is preferred. In the case of using a redox initiator, either an oxidizing agent or a reducing agent may be charged into a polymerization tank in advance, followed by adding the other continuously or intermittently thereto to initiate the polymerization. For example, in the case of using potassium permanganate/oxalic acid, preferably, oxalic acid is charged into a polymerization tank and potassium permanganate is continuously added thereto.

In the production of the TFE polymer, a known chain transfer agent can be used, and examples thereof include saturated hydrocarbons such as methane, ethane, propane, and butane; halogenated hydrocarbons such as chloromethane, dichloromethane, and difluoroethane; alcohols such as methanol and ethanol; and hydrogen, and those in a gaseous state at normal temperature and normal pressure are preferred.

The amount of the chain transfer agent used is usually 1 to 10,000 ppm, preferably 1 to 5,000 ppm, based on the total amount of TFE fed. The amount used may be 1 to 1,000 ppm or 1 to 500 ppm.

In the production of PTFE, a saturated hydrocarbon having 12 or more carbon atoms, which is substantially inert to the reaction and becomes liquid under the reaction conditions, may be used as a dispersion stabilizer for the reaction system in an amount of 2 to 10 parts by mass based on 100 parts by mass of the aqueous medium. Further, ammonium carbonate, ammonium phosphate or the like may be added as a buffer for adjusting the pH during the reaction.

When the polymerization of PTFE is completed, an aqueous dispersion having a solid concentration of 1.0 to 70% by mass and an average primary particle size of 50 to 500 nm can be obtained. The aqueous dispersion contains the surfactant and the fluoropolymer. Further, by using the surfactant, an aqueous dispersion liquid having particles made of a TFE polymer having a fine particle size of 0.5 μm or less can be obtained.

The polymerization step in the production of PTFE also preferably includes a step (I) of obtaining particles containing a polymerization unit based on TFE, and a step (II) of polymerizing TFE in an aqueous medium containing the particles obtained in the step (I) to obtain PTFE.

Obtaining the particles in the step (I) as described above and then polymerizing the TFE in an aqueous medium containing the particles obtained in the step (I) can increase the number of particles of the PTFE, thereby increasing the yield thereof.

When the polymerization step includes the step (II), the step (II) may be performed using the aqueous dispersion containing the particles obtained in the step (I) as it is.

Further, the step (II) may be performed after diluting or concentrating the aqueous dispersion containing the particles obtained in the step (I). The dilution or concentration may be performed as it is in the reactor, or may be performed after collecting the aqueous dispersion containing the particles obtained in the step (I) from the reactor. Therefore, the polymerization step may further include a step of: collecting the aqueous dispersion containing the particles obtained in the step (I), after the step (I) and before the step (II).

Further, the polymerization step may further include a step of bringing the aqueous dispersion containing the particles obtained in the step (I) to less than 50° C., less than 30° C. or less than 10° C., after the step (I) and before the step (II).

When the step (I) and the step (II) are continuously performed, the stirring may be once stopped after the step (I), and then the stirring may be restarted to continue the step (II).

Further, when the step (I) and the step (II) are continuously performed, the stirring may be optionally stopped after the step (I), and then the stirring may be restarted after changing the pressure in the reactor to continue the step (II).

Further, in order to change the monomer composition ratio of the reactor, the pressure of the reactor may be released to the atmospheric pressure after the step (I), and the step (II) may be continued after charging each monomer into the reactor. After the step (I), the step (II) may be continued after changing the polymerization temperature.

When the polymerization step includes the step (II), it is particularly preferable to use a redox initiator in the step (I). The use of a redox initiator allows for increasing the number of particles of the particles.

When the step (I) and the step (II) are continuously performed, the fluoropolymer can be continuously produced by stopping the charge of the redox initiator in the step (I), and then charging the polymerization initiator in the step (II). Examples of the redox initiator include those described above.

When the polymerization step includes the step (II), a radical polymerization initiator may be used in the step (I). The use of a radical polymerization initiator allows for increasing the number of particles of the particles.

When the step (I) and the step (II) are continuously performed, the fluoropolymer can be continuously produced by stopping the charge of the radical polymerization initiator in the step (I), and then charging the polymerization initiator in the step (II). Examples of the radical polymerization initiator include those described later, and preferred in the step (I) is ammonium persulfate. Preferred in the step (II) is disuccinic acid peroxide. Further, in the step (II), the radical polymerization initiator is preferably charged continuously or intermittently.

When the polymerization step includes the step (II), the step (I) is preferably a step of obtaining an aqueous dispersion having a particle concentration of 20.0% by mass or less. The solid concentration is more preferably 15.0% by mass or less, still more preferably 10.0% by mass or less, further preferably 8.0% by mass or less, and particularly preferably 5.0% by mass or less. The solid concentration is preferably 0.1% by mass or more, more preferably 0.3% by mass or more, still more preferably 0.5% by mass or more, further preferably 0.8% by mass or more, still further preferably 1.0% by mass or more, and particularly preferably 1.5% by mass or more.

The particles may be a TFE homopolymer consisting of only TFE-based polymerization units, or may be a modified PTFE containing 99.0% by mass or more of a polymerization unit based on TFE and 1.0% by mass or less of a polymerization unit of modifying monomer based on modifying monomer.

The modified PTFE preferably has a polymerization unit based on the modifying monomer (hereinafter, also referred to as "modifying monomer unit") in the range of 0.00001 to 1.0% by mass. The lower limit of the modifying monomer unit is more preferably 0.0001% by mass, still more preferably 0.001% by mass, further preferably 0.005% by mass, and particularly preferably 0.009% by mass. The upper limit of the modifying monomer is preferably 0.90% by mass, more preferably 0.50% by mass, still more preferably 0.40% by mass, further preferably 0.30% by mass, still further preferably 0.10% by mass, and particularly preferably 0.05% by mass.

The particles obtained in the step (I) preferably have an average primary particle size of 300 nm or less, more preferably 200 nm or less, and still more preferably 150 nm or less. Further, the average primary particle size is preferably 0.1 nm or more, more preferably 1.0 nm or more, and still more preferably 3.0 nm or more.

The average primary particle size can be measured by dynamic light scattering. The average primary particle size may be measured by preparing a PTFE aqueous dispersion with a solid concentration adjusted to about 1.0% by mass and using a dynamic light scattering method at 25° C. with 70 measurement processes, wherein the solvent (water) has a refractive index of 1.3328 and the solvent (water) has a viscosity of 0.8878 mPa·s. The dynamic light scattering may be performed by, for example, ELSZ-1000S (manufactured by Otsuka Electronics Co., Ltd.).

The aqueous medium is a reaction medium in which the polymerization is performed, and means a liquid containing water. The aqueous medium may be any medium containing water, and it may be one containing water and, for example, any of fluorine-free organic solvents such as alcohols, ethers, and ketones, and/or fluorine-containing organic solvents having a boiling point of 40° C. or lower.

The aqueous medium in the step (II) preferably contains the aqueous medium contained in the aqueous dispersion containing the particles obtained in the step (I). In addition to the aqueous medium contained in the aqueous dispersion containing the particles, another aqueous medium may also be added.

The polymerization temperature and the polymerization pressure in the step (II) are determined as appropriate in accordance with the types of the monomers used, the molecular weight of the target PTFE, and the reaction rate.

For example, the polymerization temperature is preferably 10 to 150° C. The polymerization temperature is more preferably 30° C. or higher, and still more preferably 50° C. or higher. Further, the polymerization temperature is more preferably 120° C. or lower, and still more preferably 100° C. or lower.

Further, the polymerization pressure is preferably 0.05 to 10 MPaG. Further, the polymerization pressure is more preferably 0.3 MPaG or higher, still more preferably 0.5 MPaG or higher, and more preferably 5.0 MPaG or lower, still more preferably 3.0 MPaG or lower.

In particular, from the viewpoint of improving the yield of fluoropolymer, the polymerization pressure is preferably 1.0 MPaG or higher, and more preferably 2.0 MPaG or higher.

The step (II) may be performed in the presence of a carboxylic acid type hydrocarbon surfactant or may be performed in the absence of a carboxylic acid type hydrocarbon surfactant.

The step (II) is preferably a step of polymerizing TFE in an aqueous medium containing the particles in the presence of a carboxylic acid type hydrocarbon surfactant.

In the step (II), the amount of the carboxylic acid type hydrocarbon surfactant is preferably 0.0001 to 15% by mass based on the aqueous medium. The lower limit thereof is more preferably 0.001% by mass, while the upper limit thereof is more preferably 1% by mass. Less than 0.0001% by mass of the surfactant may cause insufficient dispersibility. More than 15% by mass of the surfactant may fail to give the effects corresponding to its amount. The amount of the carboxylic acid type hydrocarbon surfactant added is appropriately determined depending on the type of monomer used, the molecular weight of the target PTFE, and the like.

The carboxylic acid type hydrocarbon surfactant may be added to the reaction vessel at once before initiation of the polymerization, may be added at once after initiation of the polymerization, may be added in multiple portions during the polymerization, or may be added continuously during the polymerization.

The step (II) preferably includes a step of continuously adding the carboxylic acid type hydrocarbon surfactant. Adding the carboxylic acid type hydrocarbon surfactant continuously means, for example, adding the carboxylic acid type hydrocarbon surfactant not all at once, but adding over time and without interruption or adding in portions. The step of continuously adding allows for obtaining an aqueous dispersion having a smaller average primary particle size and superior stability.

In the step (II), the amount of the carboxylic acid type hydrocarbon surfactant at the initiation of polymerization is preferably 1 ppb or more based on the aqueous medium. The amount of the carboxylic acid type hydrocarbon surfactant at the initiation of polymerization is preferably 10 ppb or more, more preferably 50 ppb or more, still more preferably 100 ppb or more, and further preferably 200 ppb or more. The upper limit thereof is preferably, but not limited to, 100,000 ppm, and more preferably 50,000 ppm, for example. When the amount of the carboxylic acid type hydrocarbon surfactant at the initiation of polymerization is in the above range, it is possible to obtain an aqueous dispersion having a smaller average primary particle size and superior stability. Also, the aspect ratio of the primary particles can be made smaller.

In the step (II), the step of continuously adding the carboxylic acid type hydrocarbon surfactant is preferably a step in which the carboxylic acid type hydrocarbon surfactant is started to be added to the aqueous medium when the concentration of PTFE formed in the aqueous medium is 10% by mass or less. The carboxylic acid type hydrocarbon surfactant is more preferably started to be added when the concentration is 8.0% by mass or less, still more preferably started to be added when the concentration is 5.0% by mass or less, further preferably started to be added when the concentration is 4.0% by mass or less, still further preferably started to be added when the concentration is 3.0% by mass or less, particularly preferably started to be added when the concentration is 2.0% by mass or less, particularly more preferably started to be added when the concentration is 1.5% by mass or less, and very particularly preferably started to be added when the concentration is 1.0% by mass or less. Further, the carboxylic acid type hydrocarbon-containing surfactant is preferably started to be added when the concentration thereof is less than 0.60% by mass, more preferably started to be added when the concentration is 0.50% by mass or less, still more preferably started to be added when the concentration is 0.36% by mass or less, further preferably started to be added when the concentration is 0.30% by mass or less, still further preferably started to be added when the concentration is 0.20% by mass or less, and particularly preferably started to be added when the concentration is 0.10% by mass or less. Further, the carboxylic acid type hydrocarbon-containing surfactant is preferably started to be added when the polymerization is initiated in the step (II). The concentrations are based on the total amount of the aqueous medium and the PTFE.

By including the above steps, it is possible to obtain an aqueous dispersion having a smaller average primary particle size and superior stability.

In the step of continuously adding the carboxylic acid type hydrocarbon surfactant, the amount of the carboxylic acid type hydrocarbon surfactant added is preferably 0.01 to 10% by mass based on 100% by mass of the aqueous medium. The lower limit thereof is more preferably 0.05% by mass, still more preferably 0.1% by mass while the upper limit thereof is more preferably 5% by mass, still more preferably 1% by mass.

The carboxylic acid type hydrocarbon surfactant is preferably at least one selected from the group consisting of a surfactant (1-0) represented by the general formula (1-0), a surfactant (a) represented by the formula (a), a surfactant (b) represented by the formula (b), a surfactant represented by the formula ($\alpha$), and a surfactant obtained by subjecting any of these to a radical treatment or oxidation treatment.

When the carboxylic acid type hydrocarbon surfactant is an aliphatic carboxylic acid type hydrocarbon surfactant, the aliphatic carboxylic acid type hydrocarbon surfactant is preferably at least one selected from the group consisting of a surfactant represented by the formula ($\alpha$), a surfactant represented by the general formula (1-0A), and a surfactant obtained by subjecting any of these surfactants to a radical treatment or oxidation treatment.

When the polymerization step includes the step (II), the polymerization step preferably includes a step of subjecting the carboxylic acid type hydrocarbon surfactant to a radical treatment or an oxidation treatment.

The step (II) may be performed by charging a polymerization reactor with an aqueous dispersion containing the particles, TFE, and optionally an aqueous medium, a modifying monomer, a hydrocarbon surfactant, other additives, stirring the contents of the reactor, maintaining the reactor at a predetermined polymerization temperature, and adding a predetermined amount of a polymerization initiator to thereby initiate the polymerization reaction. After the initiation of the polymerization reaction, the components such as the monomers, the polymerization initiator, a chain transfer agent, and the hydrocarbon surfactant may additionally be added depending on the purpose. The hydrocarbon surfactant may be added after the polymerization reaction is initiated.

The polymerization initiator may be any polymerization initiator capable of generating radicals within the polymerization temperature range, and known oil-soluble and/or water-soluble polymerization initiators may be used. The polymerization initiator may be combined with a reducing agent, for example, to form a redox agent, which initiates the polymerization. The concentration of the polymerization initiator is appropriately determined depending on the types of the monomers, the molecular weight of the target PTFE, and the reaction rate.

The polymerization initiator to be used is preferably an oil-soluble radical polymerization initiator or a water-soluble radical polymerization initiator. The step (II) is preferably a step performed in the presence of an oil-soluble radical polymerization initiator or a water-soluble radical polymerization initiator. In particular, it is preferable to use the oil-soluble peroxide or water-soluble peroxide to be described later as the polymerization initiator.

The step (II) is preferably a step of polymerizing TFE and optionally a modifying monomer substantially in the absence of a fluorine-containing surfactant. The expression "substantially in the absence of a fluorine-containing surfactant" means that the fluorine-containing surfactant is 1 ppm or less based on PTFE obtained by the polymerization, preferably 100 ppb or less, more preferably 10 ppb or less, and still more preferably 1 ppb or less.

The PTFE powder (for example, PTFE fine powder) obtained by the production method of the present disclosure may be used in the form of a powder, or the powder may be added to water and used in the form of an aqueous dispersion.

The obtained PTFE fine powder is preferable for molding, and suitable applications include hydraulic systems such as aircraft and automobiles, fuel system tubes and the like, flexible hoses such as chemicals and steam, and electric wire coating applications.

Further, a nonionic surfactant is preferably added to the obtained PTFE aqueous dispersion to stabilize and further concentrate the aqueous dispersion, and then an organic or inorganic filler is further added, depending on its purpose, to form a composition and used in a variety of applications. The composition, when applied to a metal or ceramic substrate, can provide a coating surface having non-stickiness, a low coefficient of friction, and excellent gloss, smoothness, abrasion resistance, weather resistance, and heat resistance, which is suitable for coating of rolls and cooking utensils and impregnation of glass cloth.

The PTFE aqueous dispersion may also be used to prepare an organosol of PTFE. The organosol may contain the PTFE and an organic solvent, and examples of the organic solvent include ether-based solvents, ketone-based solvents, alcohol-based solvents, amide-based solvents, ester-based solvents, aliphatic hydrocarbon-based solvents, aromatic hydrocarbon-based solvents, and halogenated hydrocarbon-based solvents. Preferably used are N-methyl-2-pyrrolidone and dimethylacetamide. The organosol may be prepared by the method disclosed in International Publication No. WO2012/002038, for example.

The aqueous dispersion of PTFE or the PTFE fine powder is also preferably used as a processing aid. When used as a processing aid, the aqueous dispersion or the fine powder is mixed with a host polymer, for example, to improve the melt strength of the host polymer in melt fabrication and to improve the mechanical strength, electric properties, incombustibility, anti-drop performance during combustion, and slidability of the resulting polymer.

The aqueous dispersion of PTFE or the PTFE fine powder is also preferably used as a binder for batteries or used for dustproof applications.

The aqueous dispersion of PTFE or the PTFE fine powder is also preferably combined with a resin other than PTFE and used a processing aid before use. The aqueous dispersion or the fine powder is suitable as a material of the PTFEs disclosed in, for example, Japanese Patent Laid-Open No. 11-49912, U.S. Pat. No. 5,804,654, Japanese Patent Laid-Open No. 11-29679, and Japanese Patent Laid-Open No. 2003-2980. Processing aids containing the aqueous dispersion or the fine powder are not inferior in any way to the processing aids disclosed in the publications.

The aqueous dispersion of PTFE is also preferably mixed with an aqueous dispersion of a melt-fabricable fluororesin so that the components coagulate to form co-coagulated powder. The co-coagulated powder is suitable as a processing aid.

Examples of the melt-fabricable fluororesin include FEP, PFA, TFE/perfluoroallyl ether copolymers, ETFE, and ethylene/TFE/HFP copolymers (EFEPs), of which FEP is preferred.

The aqueous dispersion preferably contains the melt-fabricable fluororesin. Examples of the melt-fabricable fluororesin include FEP, PFA, TFE/perfluoroallyl ether copolymer, ETFE, and EFEP. The aqueous dispersion containing the melt-fabricable fluororesin may be used as a coating material. The melt-fabricable fluororesin enables sufficient fusion of the TFE polymer particles, improving the film-formability and providing the resulting film with gloss.

The fluorine-free resin to which the co-coagulated powder is added may be in the form of powder, pellets, or emulsion. In order to achieve sufficient mixing of the resins, the addition is preferably performed by a known method such as extrusion kneading or roll kneading under a shearing force.

Examples of the applications of the aqueous dispersion include, but are not limited to, those in which the aqueous dispersion is directly used, such as coating achieved by applying the aqueous dispersion to a substrate, drying the dispersion, and optionally sintering the workpiece; impregnation achieved by impregnating a porous support such as nonwoven fabric or a resin molded article into the aqueous dispersion, drying the dispersion, and preferably sintering the workpiece; and casting achieved by applying the aqueous dispersion to a substrate such as glass, drying the dispersion, optionally immersing the workpiece into water to remove the substrate and to thereby provide a thin film. Examples of such applications include aqueous dispersion-type coating materials, tent membranes, conveyor belts, printed circuit boards (CCL), binders for electrodes, and water repellents for electrodes.

The aqueous dispersion may be used in the form of an aqueous coating material for coating by mixing with a known compounding agent such as a pigment, a thickener, a dispersant, a defoaming agent, an antifreezing agent, a film-forming aid, or by compounding another polymer compound.

In addition, the aqueous dispersion may be used for additive applications, for example, for a binder application for preventing the active material of an electrode from falling off, for a compound application such as a drip inhibitor, or for a dust suppression treatment application for preventing floating of sand, dust, and the like.

For the purpose of adjusting the viscosity of the aqueous dispersion or improving the miscibility with a pigment or filler, the aqueous dispersion may preferably contain an anionic surfactant. The anionic surfactant may be appropriately added to an extent that causes no problems from the economic and environmental viewpoints.

Examples of the anionic surfactant include non-fluorinated anionic surfactants and fluorine-containing anionic surfactants. Preferred are fluorine-free, non-fluorinated anionic surfactants, i.e., hydrocarbon anionic surfactants.

For the purpose of adjusting the viscosity, any known anionic surfactants may be used, for example, anionic surfactants disclosed in International Publication No. WO2013/146950 and International Publication No. WO2013/146947. Examples thereof include those having a saturated or unsaturated aliphatic chain having 6 to 40 carbon atoms, preferably 8 to 20 carbon atoms, and more preferably 9 to 13 carbon atoms. The saturated or unsaturated aliphatic chain may be either linear or branched, or may have a cyclic structure. The hydrocarbon may have aromaticity, or may have an aromatic group. The hydrocarbon may contain a hetero atom such as oxygen, nitrogen, or sulfur.

Examples of the anionic surfactants include alkyl sulfonates, alkyl sulfates, and alkyl aryl sulfates, and salts thereof; aliphatic (carboxylic) acids and salts thereof; and phosphoric acid alkyl esters and phosphoric acid alkyl aryl esters, and salts thereof. Of these, preferred are alkyl sulfonates, alkyl sulfates, and aliphatic carboxylic acids, and salts thereof.

Preferred examples of the alkyl sulfates and salts thereof include ammonium lauryl sulfate and sodium lauryl sulfate.

Preferred examples of the aliphatic carboxylic acids or salts thereof include succinic acid, decanoic acid, undecanoic acid, undecenoic acid, lauric acid, hydrododecanoic acid, or salts thereof.

The amount of the anionic surfactant added depends on the types of the anionic surfactant and other compounding agents, and is preferably 10 ppm to 5,000 ppm based on the mass of the solid content of the fluoropolymer.

The lower limit of the amount of the anionic surfactant added is more preferably 50 ppm or more, still more preferably 100 ppm or more. Too small amount of the anionic surfactant may result in a poor viscosity adjusting effect.

The upper limit of the amount of the anionic surfactant added is more preferably 3,000 ppm or less, still more preferably 2,000 ppm or less. Too large an amount of the anionic surfactant may impair mechanical stability and storage stability of the aqueous dispersion.

For the purpose of adjusting the viscosity of the aqueous dispersion, components other than the anionic surfactants, such as methyl cellulose, alumina sol, polyvinyl alcohol, and carboxylated vinyl polymers may also be added.

For the purpose of adjusting the pH of the aqueous dispersion, a pH adjuster such as aqueous ammonia may also be added.

The aqueous dispersion may optionally contain other water soluble polymer compounds to an extent that does not impair the characteristics of the aqueous dispersion.

Examples of the other water soluble polymer compound include, but are not limited to, polyethylene oxide (dispersion stabilizer), polyethylene glycol (dispersion stabilizer), polyvinylpyrrolidone (dispersion stabilizer), phenol resin, urea resin, epoxy resin, melamine resin, polyester resin, polyether resin, silicone acrylic resin, silicone resin, silicone polyester resin, and polyurethane resin. The aqueous dispersion may further contain a preservative, such as isothiazolone-based, azole-based, pronopol, chlorothalonil, methylsulfonyltetrachloropyridine, carbendazim, fluorfolpet, sodium diacetate, and diiodomethylparatolylsulfone.

The aqueous dispersion of PTFE is also preferably used as a dust suppression treatment agent. The dust suppression treatment agent can be used in a method for suppressing dust of a dust-generating substance by fibrillating TFE polymer by mixing the mixture with the dust-generating substance and applying a compression-shearing action to the mixture at a temperature of 20 to 200° C., for example, methods disclosed in Japanese Patent No. 2827152 and Japanese Patent No. 2538783.

The aqueous dispersion of PTFE can be suitably used for, for example, the dust suppression treatment agent composition described in International Publication No. WO2007/004250, and can be suitably used for the dust suppression treatment method described in International Publication No. WO2007/000812.

The dust suppression treatment agent is suitably used for dust suppression treatment in the fields of building-products, soil stabilizers, solidifying materials, fertilizers, landfill of incineration ash and harmful substance, explosion proof equipment, cosmetics, sands for pet excretion represented by cat sand, and the like.

The aqueous dispersion of the PTFE is also preferably used as a material for producing TFE polymer fibers by a dispersion spinning method. The dispersion spinning method is a method in which the aqueous dispersion of the TFE polymer and an aqueous dispersion of a matrix polymer are mixed and the mixture is extruded to form an intermediate fiber structure, and then the intermediate fiber structure is sintered to decompose the matrix polymer and sinter the TFE polymer particles, thereby providing TFE polymer fibers.

High-molecular-weight PTFE can also be produced by the production method of the present disclosure. In other words, even without using a conventional fluorine-containing surfactant, the production method of the present disclosure can produce PTFE having a molecular weight equivalent to that of PTFE obtained by a production method using such a conventional fluorine-containing surfactant.

When producing a high-molecular-weight PTFE, the polymerization temperature is preferably 30° C. or higher, . . . more preferably 40° C. or higher, and still more preferably 50° C. or higher. Further, the polymerization temperature is preferably 100° C. or lower, and more preferably 95° C. or lower. The polymerization pressure is preferably 0.5 MPaG or higher, preferably 0.7 MPaG or higher, preferably 1.0 MPaG or higher, preferably 5.0 MPaG or lower, more preferably 4.0 MPaG or lower, still more preferably 3.0 MPaG or lower.

The high-molecular-weight PTFE powder obtained by polymerization has stretchability and non melt-processability, and is also useful as a material for a stretched body (porous body). When this stretched body is a film (PTFE stretched film or PTFE porous film), the stretched body can be formed by stretching by a known PTFE stretching method. Stretching allows easy formation of fibrils of high-molecular-weight PTFE, resulting in a PTFE porous body (film) including nodes and fibers.

Preferably, roll-stretching a sheet-shaped or rod-shaped paste extrudate in an extruding direction can provide a uniaxially stretched film.

Further stretching in a transverse direction using a tenter, for example, can provide a biaxially stretched film.

Semi-sintering treatment is also preferably performed before stretching.

This PTFE stretched body is a porous body having a high porosity, and
  can suitably be used as a filter material for a variety of microfiltration filters such as air filters and chemical filters and a support member for polymer electrolyte films.

The PTFE stretched body is also useful as a material of products used in the fields of textiles, of medical treatment, of electrochemistry, of sealants, of air filters, of ventilation/internal pressure adjustment, of liquid filters, and of consumer goods.

The following provides examples of specific applications.

Electrochemical Field

Examples of the applications in this field include prepregs for dielectric materials, EMI-shielding materials, and heat conductive materials. More specifically, examples thereof include printed circuit boards, electromagnetic interference shielding materials, insulating heat conductive materials, and insulating materials.

Sealant Field

Examples of the applications in this field include gaskets, packings, pump diaphragms, pump tubes, and sealants for aircraft.

Air Filter Field

Examples of the applications in this field include ULPA filters (for production of semiconductors), HEPA filters (for hospitals and for production of semiconductors), cylindrical cartridge filters (for industries), bag filters (for industries), heat-resistant bag filters (for exhaust gas treatment), heat-resistant pleated filters (for exhaust gas treatment), SINBRAN filters (for industries), catalyst filters (for exhaust gas treatment), adsorbent-attached filters (for HDD embedment), adsorbent-attached vent filters (for HDD embedment); vent filters (for HDD embedment, for example), filters for cleaners (for cleaners), general-purpose multilayer felt materials, cartridge filters for GT (for interchangeable items for GT), and cooling filters (for housings of electronic devices).

Ventilation/Internal Pressure Adjustment Field

Examples of the applications in this field include materials for freeze drying such as vessels for freeze drying, ventilation materials for automobiles for electronic circuits and lamps, applications relating to vessels such as vessel caps, protective ventilation for electronic devices, including small devices such as tablet terminals and mobile phone terminals, and ventilation for medical treatment.

Liquid Filter Field

Examples of the applications in this field include liquid filters for semiconductors (for production of semiconductors), hydrophilic PTFE filters (for production of semiconductors), filters for chemicals (for liquid chemical treatment), filters for pure water production lines (for production of pure water), and back-washing liquid filters (for treatment of industrial discharge water).

Consumer Goods Field:

Examples of the applications in this field include clothes, cable guides (movable wires for motorcycles), clothes for motor cyclists, cast liners (medical supporters), filters for cleaners, bagpipes (musical instrument), cables (signal cables for guitars, etc.), and strings (for string instrument).

Textile Field

Examples of the applications in this field include PTFE fibers (fiber materials), machine threads (textiles), weaving yarns (textiles), and ropes.

Medical Treatment Field

Examples of the applications in this field include implants (stretched articles), artificial blood vessels, catheters, general surgical operations (tissue reinforcing materials), products for head and neck (dura mater alternatives), oral health (tissue regenerative medicine), and orthopedics (bandages).

Low-molecular-weight PTFE can also be produced by the production method of the present disclosure.

The low-molecular-weight PTFE may be produced by polymerization, or may be produced by reducing the molecular weight of a high-molecular-weight PTFE obtained by polymerization by a known method (e.g., thermolysis, radiolysis).

When producing a low-molecular-weight PTFE, the polymerization temperature is preferably 30° C. or higher, more preferably 40° C. or higher, and still more preferably 50° C. or higher. Further, the polymerization temperature is preferably 100° C. or lower, more preferably 90° C. or lower, and still more preferably 80° C. or lower. The polymerization pressure is preferably 0.3 MPaG or higher, preferably 0.4 MPaG or higher, preferably 0.5 MPaG or higher, preferably 5.0 MPaG or lower, more preferably 4.0 MPaG or lower, still more preferably 3.0 MPaG or lower.

A low-molecular-weight PTFE having a molecular weight of 600,000 or less (also referred to as PTFE micropowder) has excellent chemical stability and a very low surface energy, and is less likely to generate fibrils, and is therefore suitably used as an additive for improving the lubricity and the texture of the coating surface in production of plastics, inks, cosmetics, coating materials, greases, parts of office automation equipment, and toners (e.g., see Japanese Patent Laid-Open No. 10-147617).

A low-molecular-weight PTFE may be obtained by dispersing a polymerization initiator and the surfactant in an aqueous medium in the presence of a chain transfer agent, and then polymerizing TFE alone or TFE and a monomer copolymerizable with TFE.

In the present disclosure, the high-molecular-weight PTFE means PTFE which is non melt-processible and fibrillatable. On the other hand, the low-molecular-weight PTFE means PTFE which is melt-processible and non-fibrillatable.

The non-melt processability means a property that the melt flow rate cannot be measured at a temperature higher than the crystal melting point in conformity with ASTM D 1238.

The high-molecular-weight PTFE preferably has a standard specific gravity (SSG) of 2.130 to 2.280. The standard specific gravity is determined by the water replacement method in conformity with ASTM D 792 using a sample molded in conformity with ASTM D 4895-89. The term "high-molecular-weight" in the present disclosure means that the standard specific gravity is within the above range.

The low-molecular-weight PTFE has a melt viscosity at 380° C. of $1 \times 10^2$ to $7 \times 10^5$ Pa·s. The "low-molecular-weight" in the present disclosure means that the melt viscosity is within the above range.

The high-molecular-weight PTFE has a melt viscosity significantly higher than that of the low-molecular-weight PTFE, and the melt viscosity thereof is difficult to measure accurately. The melt viscosity of the low-molecular-weight PTFE is measurable, but the low-molecular-weight PTFE has difficulty in providing a molded article to be used in measurement of the standard specific gravity. Thus, it is difficult to measure its accurate standard specific gravity. Accordingly, in the present disclosure, the standard specific gravity is used as an index of the molecular weight of the high-molecular-weight PTFE, while the melt viscosity is used as an index of the molecular weight of the low-molecular-weight PTFE. There is no known measurement method capable of directly specifying the molecular weight for both of the high-molecular-weight PTFE or the low-molecular-weight PTFE.

The high-molecular-weight PTFE preferably has a peak temperature of 333 to 347° C., and more preferably 335 to 345° C. The low-molecular-weight PTFE preferably has a peak temperature of 322 to 333° C., and more preferably 324 to 332° C. The peak temperature is a temperature corresponding to the maximum value in the heat-of-fusion curve when PTFE, which has no history of heating to a temperature of 300° C. or higher, is heated at a rate of 10° C./min using a differential scanning calorimeter (DSC).

The high-molecular-weight PTFE preferably exhibits at least one endothermic peak in the range of 333 to 347° C. in the heat-of-fusion curve when PTFE which has no history of being heated to a temperature of 300° C. or higher is heated at a rate of 10° C./min using a differential scanning calorimeter (DSC), and has a quantity of heat of fusion of 62 mJ/mg or more at 290 to 350° C. calculated from the heat-of-fusion curve.

A non-sintered tape (raw tape) can also be obtained from the PTFE fine powder obtained by using the surfactant described above.

The surfactant, decomposition products and by-products of the surfactant by-produced by the surfactant, and residual monomers may be collected from discharge water generated in the coagulation or the washing and/or from off gas generated in the drying, and then purified to reuse the surfactant, the decomposition products and by-products of the surfactant, and the residual monomers by-produced by the surfactant. The collection and the purification may be performed by known methods, although not limited thereto. For example, they may be performed by the methods disclosed in National Publication of International Patent Application No. 2011-520020.

(II) Melt-Fabricable Fluororesin (1) In the production method of the present disclosure, the polymerization for FEP is preferably performed at a polymerization temperature of 10 to 150° C. and a polymerization pressure of 0.2 to 8.0 MPaG. When producing FEP, the polymerization temperature is more preferably 30° C. or higher, still more preferably 40° C. or higher, and further preferably 50° C. or higher. Further, the polymerization temperature is more preferably 130° C. or lower, still more preferably 120° C. or lower, particularly preferably 110° C. or lower, and further preferably 100° C. or lower. The polymerization pressure is preferably 0.5 MPaG or higher, preferably 1.0 MPaG or higher, preferably 1.2 MPaG or higher, and preferably 6.0 MPaG or lower, still more preferably 5.0 MPaG or lower.

FEP preferably has a monomer composition ratio (% by mass) of TFE:HFP=(60 to 95):(5 to 40), more preferably (85 to 92):(8 to 15). The FEP may be modified with a perfluoro(alkyl vinyl ether) as a third component within a range of 0.1 to 2% by mass of all monomers.

In the polymerization for FEP, the surfactant may be used within the use range of the production method of the present disclosure, and is usually added in an amount of 0.0001 to 10% by mass based on 100% by mass of the aqueous medium.

In the polymerization for FEP, the chain transfer agent used is preferably cyclohexane, methanol, ethanol, propanol, ethane, propane, butane, pentane, hexane, carbon tetrachloride, chloroform, methylene chloride, methyl chloride, or the like, and the pH buffer used is preferably ammonium carbonate, disodium hydrogen phosphate, or the like.

The FEP powder obtained by the production method of the present disclosure may be melt-extruded into pellets. The melt extrusion may be performed under any appropriately set extrusion conditions usually capable of providing pellets.

In the production method of the present disclosure, although the resulting FEP may contain an terminal group such as $—CF_3$ or $—CF_2H$ on at least one of the polymer main chain and a polymer side chain, it is preferred that the content of thermally unstable groups such as —COOH, $—CH_2OH$, —COF, —CF=CF—, $—CONH_2$, or $—COOCH_3$ (hereinafter, referred to as an "unstable terminal group") is low or absent.

The unstable terminal group is chemically unstable, and thus not only reduces the heat resistance of the resin but also causes increase in the attenuation of the resulting electric wire.

The production method of the present disclosure is preferably performed in such a way that a polymer in which the total number of unstable terminal groups and $—CF_2H$ terminal groups at the completion of the polymerization is 50 or less per $1 \times 10^6$ carbon atoms is produced. The number of such groups is more preferably less than 20, still more preferably 5 or less, per $1 \times 10^6$ carbon atoms. There may also be neither unstable terminal groups nor $—CF_2H$ terminal groups, i.e. all terminal groups may be $—CF_3$ terminal groups.

The unstable terminal groups and the $—CF_2H$ terminal groups may be fluorinated and converted into the $—CF_3$ terminal groups and thereby stabilized. Examples of the fluorination treatment method include, but not limited to, methods of exposing the polymer to a fluorine radical source that generates fluorine radicals under fluorination conditions. Examples of the fluorine radical source include fluorine gas, $CoF_3$, $AgF_2$, $UF_6$, $OF_2$, $N^2F_2$, $CF_3OF$, and halogen fluorides such as $IF_5$ and $ClF_3$. Of these, preferred is a method of bringing a fluorination gas and the FEP obtained by the production method of the present disclosure into direct contact with each other. In order to control the reaction, the contact is preferably performed using a diluted fluorine gas having a fluorine gas concentration of 10 to 50% by mass. The diluted fluorine gas is obtainable by diluting fluorine gas with an inert gas such as nitrogen gas or argon gas. The fluorine gas treatment may be performed at a temperature of 100 to 250° C. The treatment temperature is not limited to this range and may be appropriately set in accordance with the situation. The fluorine gas treatment is preferably performed by feeding a diluted fluorine gas into the reactor continuously or intermittently. This fluorination treatment may be performed on dry powder after the polymerization or on melt-extruded pellets.

The FEP obtained by the production method of the present disclosure has good moldability and is less likely to cause molding defects, as well as has properties such as heat resistance, chemical resistance, solvent resistance, insulation, and electric properties.

The FEP powder obtained by the production method of the present disclosure may be fluorinated. The fluorinated powder may be produced by a method of feeding a fluorine gas to the powder obtained by the production method of a powder described above to fluorinate the powder to obtain a fluorinated powder.

The FEP pellets may be produced by a method of pelletizing the FEP obtained by the production method of the present disclosure described above.

The pellet may be fluorinated. The fluorinated pellet may be produced by a method of feeding a fluorine gas to the pellet obtained by the production method of a pellet described above to fluorinate the pellet to obtain a fluorinated pellet.

Thus, this FEP may be used in production of a variety of molded articles such as coating materials for electric wires, foamed electric wires, cables, and wires, tubes, films, sheets, and filaments.

(2) In the production method of the present disclosure, the polymerization for a TFE/perfluoro(alkyl vinyl ether) copolymer such as PFA or MFA and TFE/perfluoroallyl ether copolymer is usually preferably performed at a polymerization temperature of 10 to 130° C. and a polymerization pressure of 0.3 to 6.0 MPaG. When producing a TFE/perfluoro(alkyl vinyl ether) copolymer, the polymerization temperature is more preferably 30° C. or higher, still more preferably 40° C. or higher, and further preferably 50° C. or higher. Further, the polymerization temperature is more preferably 120° C. or lower, still more preferably 110° C. or lower, and further preferably 100° C. or lower. The polymerization pressure is preferably 0.5 MPaG or higher, preferably 1.0 MPaG or higher, and more preferably 5.0 MPaG or lower, still more preferably 4.0 MPaG or lower, particularly preferably 3.0 MPaG or lower.

The TFE/perfluoro(alkyl vinyl ether) copolymer preferably has a monomer composition ratio (mol %) of TFE:perfluoro(alkyl vinyl ether)=(90 to 99.7):(0.3 to 10), more preferably (97 to 99):(1 to 3). The perfluoro(alkyl vinyl ether) used is preferably one represented by the formula: $CF_2=CFORf^4$, wherein $Rf^4$ is a perfluoroalkyl group having 1 to 6 carbon atoms.

The TFE/perfluoroallyl ether copolymer preferably has a monomer composition ratio (mol %) of TFE:perfluoroallyl ether=(90 to 99.7):(0.3 to 10), more preferably (97 to 99):(1 to 3). The perfluoroallyl ether used is preferably one represented by the formula: $CF_2=CFCF_2ORf^4$, wherein $Rf^4$ is a perfluoroalkyl group having 1 to 6 carbon atoms.

In the polymerization for the TFE/perfluoro(alkyl vinyl ether) copolymer and the TFE/perfluoroallyl ether copolymer, the surfactant may be used within the use range of the production method of the present disclosure, and is usually preferably added in an amount of 0.0001 to 10% by mass based on 100% by mass of the aqueous medium.

In the polymerization for the TFE/perfluoro(alkyl vinyl ether) copolymer and the TFE/perfluoroallyl ether copolymer, the chain transfer agent used is preferably cyclohexane, methanol, ethanol, propanol, propane, butane, pentane, hexane, carbon tetrachloride, chloroform, methylene chloride, methyl chloride, methane, ethane, or the like, and the pH buffer used is preferably ammonium carbonate, disodium hydrogen phosphate, or the like.

The powder of the TFE/perfluoro(alkyl vinyl ether) copolymer and the TFE/perfluoroallyl ether copolymer such as PFA or MFA obtained by the production method of the present disclosure may be melt-extruded into pellets. The melt extrusion may be performed under any appropriately set extrusion conditions usually capable of providing pellets.

In order to improve the heat resistance of the copolymer and to reinforce a chemical permeation suppression effect of a molded article, the copolymer is preferably subjected to a fluorine gas treatment.

The fluorine gas treatment is performed by bringing fluorine gas into contact with a chemical permeation suppressant. However, since the reaction with fluorine is extremely exothermic, it is preferable to dilute fluorine with an inert gas such as nitrogen. The amount of fluorine in the fluorine gas/inert gas mixture is 1 to 100% by mass, preferably 10 to 25% by mass. The treatment temperature is 150 to 250° C., preferably 200 to 250° C., and the fluorine gas treatment time is 3 to 16 hours, preferably 4 to 12 hours. The fluorine gas treatment is performed at a gas pressure in the range of 1 to 10 atm, preferably atmospheric pressure. In the case of using a reactor at atmospheric pressure, the fluorine gas/inert gas mixture may be continuously passed through the reactor. This results in conversion of unstable ends of the copolymer into —$CF_3$ ends, thermally stabilizing the copolymer.

The copolymer and the composition thereof may be molded by compression molding, transfer molding, extrusion molding, injection molding, blow molding, or the like as in the case of conventional PFA.

Such a molding technique can provide a desired molded article. Examples of the molded article include sheets, films, packings, round bars, square bars, pipes, tubes, round tanks, square tanks, tanks, wafer carriers, wafer boxes, beakers, filter housings, flowmeters, pumps, valves, cocks, connectors, nuts, electric wires, and heat-resistant electric wires.

Preferred among these are tubes, pipes, tanks, connectors, and the like to be used for a variety of chemical reaction devices, semiconductor manufacturing devices, and acidic or alkaline chemical feeding devices each requiring chemical impermeability.

To the aqueous dispersion of the TFE/perfluoro(alkyl vinyl ether) copolymer and the TFE/perfluoroallyl ether copolymer such as PFA or MFA, a nonionic surfactant is appropriately added, and optionally polyethersulfone, polyamide-imide, and/or polyimide and metal powder are dissolved or dispersed in an organic solvent. Thereby, a primer composition can be obtained. This primer composition may be used for a method of applying a fluororesin to a metal surface. The method includes applying the primer composition to a metal surface, applying a melt-fabricable fluororesin composition to the resulting primer layer, and sintering the melt-fabricable fluororesin composition layer together with the primer layer.

(3) In the production method of the present disclosure, the polymerization for ETFE is preferably performed at a polymerization temperature of 0 to 100° C. and a polymerization pressure of 0.1 to 20 MPaG. When producing ETFE, the polymerization temperature is preferably 20° C. or higher, more preferably 30° C. or higher, and still more preferably 40° C. or higher. Further, the polymerization temperature is preferably 95° C. or lower, more preferably 90° C. or lower, and still more preferably 80° C. or lower. The polymerization pressure is preferably 0.5 MPaG or higher, preferably 0.8 MPaG or higher, still more preferably 1.0 MPaG or higher, and preferably 20 MPaG or lower, more preferably 10 MPaG or lower, still more preferably 5 or lower.

ETFE preferably has a monomer composition ratio (mol %) of TFE:ethylene=(50 to 99):(50 to 1). The ETFE may be modified with a third monomer within a range of 0 to 20% by mass of all monomers. The composition ratio thereof is preferably TFE:ethylene:third monomer=(63 to 94):(27 to 2):(1 to 10). The third monomer is preferably perfluorobutyl ethylene, 3,3,4,4,5,5,6,6,7,7,8,8,8-tridecafluorooct-1-ene, 2,3,3,4,4,5,5-heptafluoro-1-pentene ($CH_2=CFCF_2CF_2CF_2H$), or 2-trifluoromethyl-3,3,3-trifluoropropene (($CF_3$) $2C=CH_2$).

In the polymerization for ETFE, the surfactant described above may be used within the use range of the production method of the present disclosure, and is usually added in an amount of 0.0001 to 10% by mass based on 100% by mass of the aqueous medium.

In the polymerization for ETFE, the chain transfer agent used is preferably cyclohexane, methanol, ethanol, propanol, ethane, propane, butane, pentane, hexane, carbon tetrachloride, chloroform, methylene chloride, methyl chloride, or the like.

The ETFE powder obtained by the production method of the present disclosure may be melt-extruded into pellets. The melt extrusion may be performed under any appropriately set extrusion conditions usually capable of providing pellets.

The ETFE may be extrusion-molded into a sheet. In other words, powder or pellets of ETFE in a molten state may be continuously extruded through a die and then cooled to provide a sheet-shaped molded article. The ETFE may be mixed with an additive.

Known additives may be incorporated as appropriate. Specific examples thereof include ultraviolet absorbers, photostabilizers, antioxidants, infrared absorbers, flame retarders, flame-retardant fillers, organic pigments, inorganic pigments, and dyes. From the viewpoint of excellent weather resistance, inorganic additives are preferred.

The content of the additive in the ETFE sheet is preferably 20% by mass or less, and particularly preferably 10% by mass or less, based on the total mass of the ETFE sheet.

The ETFE sheet has excellent mechanical strength and appearance, and thus can suitably be used for film materials (e.g., roof materials, ceiling materials, outer wall materials, inner wall materials, and coating materials) of film-structured buildings (e.g., sports facilities, gardening facilities, and atriums).

In addition to the film materials of film-structured buildings, the ETFE sheet is also useful for, for example, outdoor boards (e.g., noise-blocking walls, windbreak fences, breakwater fences, roof panels of carports, shopping arcades, footpath walls, and roof materials), shatter-resistant window films, heat-resistant waterproof sheets, building materials (e.g., tent materials of warehouse tents, film materials for shading, partial roof materials for skylights, window materials alternative to glass, film materials for flame-retardant partitions, curtains, outer wall reinforcement, waterproof films, anti-smoke films, non-flammable transparent partitions, road reinforcement, interiors (e.g., lighting, wall surfaces, and blinds), exteriors (e.g., tents and signboards)), living and leisure goods (e.g., fishing rods, rackets, golf clubs, and screens), automobile materials (e.g., hoods, damping materials, and bodies), aircraft materials, shipment materials, exteriors of home appliances, tanks, vessel inner walls, filters, film materials for construction works, electronic materials (e.g., printed circuit boards, circuit boards, insulating films, and release films), surface materials for solar cell modules, mirror protection materials for solar thermal energy, and surface materials for solar water heaters.

(4) The production method of the present disclosure may be used to produce an electrolyte polymer precursor. In the production method of the present disclosure, the polymerization for the electrolyte polymer precursor is preferably performed at a polymerization temperature of 0 to 100° C. and a polymerization pressure of −0.05 to 5.0 MPaG. The electrolyte polymer precursor contains a vinyl ether monomer as described below and can be converted into an ion-exchangeable polymer through a hydrolysis treatment. When producing the electrolyte polymer precursor, the polymerization temperature is more preferably 5° C. or higher, and still more preferably 10° C. or higher. Further, the polymerization temperature is more preferably 80° C. or lower, and still more preferably 60° C. or lower. The polymerization pressure is preferably 0 MPaG or higher, preferably 0.02 MPaG or higher, more preferably 2.0 MPaG or lower, and still more preferably 1.0 MPaG or lower.

An example of the vinyl ether monomer to be used for the electrolyte polymer precursor is a fluoromonomer represented by the general formula (150):

wherein $Y^{151}$ represents a fluorine atom, a chlorine atom, —SO$_2$F group, or a perfluoroalkyl group; the perfluoroalkyl group may contain an etheric oxygen and —SO$_2$F group; n represents an integer of 0 to 3; $nY^{151}$ may be the same or different; $Y^{152}$ represents a fluorine atom, a chlorine atom, or a —SO$_2$F group; m represents an integer of 1 to 5; $mY^{152}$ may be the same or different; $A^{151}$ represents —SO$_2X^{151}$, —COZ$^{151}$ or —POZ$^{152}$Z$^{153}$; $X^{151}$ represents F, Cl, Br, I, —OR$^{151}$ or —NR$^{152}$R$^{153}$; $Z^{151}$, $Z^{152}$, and $Z^{153}$ are the same or different and represent —NR$^{154}$R$^{155}$ or —OR$^{156}$; and $R^{151}$, $R^{152}$, $R^{153}$, $R^{154}$, $R^{155}$, and $R^{156}$ are the same or different and represent H, ammonium, an alkali metal, an alkyl group optionally containing a fluorine atom, an aryl group, or a sulfonyl-containing group. The electrolyte polymer precursor preferably has a monomer composition ratio (mol %) of TFE:vinyl ether=(50 to 99):(50 to 1), more preferably TFE:vinyl ether=(50 to 93):(50 to 7).

The electrolyte polymer precursor may be modified with a third monomer within a range of 0 to 20% by mass of all monomers. Examples of the third monomer include multifunctional monomers such as CTFE, vinylidene, perfluoroalkyl vinyl ether, and divinylbenzene.

The electrolyte polymer precursor thereby obtained may be molded into a film, followed by hydrolysis using an alkali solution and a treatment using a mineral acid, and thereby used as a polymer electrolyte film for fuel cells, electrolysis devices, redox flow batteries, and the like.

The electrolyte polymer precursor may be hydrolyzed using an alkali solution while the dispersed state thereof is maintained, thereby providing an electrolyte polymer dispersion.

This dispersion may be then heated up to 120° C. or higher in a pressurized vessel and thereby dissolved in, for example, a solvent mixture of water and an alcohol, i.e., converted into a solution state.

The solution thereby obtained may be used as a binder for electrodes. Also, the solution may be combined with a variety of additives and cast to form a film, and the film may be used for antifouling films, organic actuators, or the like.

The powder of the melt-fabricable fluororesin is suitably used as a powdery coating material. When applied to a substrate, the powdery coating material made of the melt-fabricable fluororesin powder can provide a film having a smooth surface. The melt-fabricable fluororesin powder having an average particle size of 1 μm or greater and smaller than 100 μm is particularly suitable as a powdery coating material used for electrostatic coating. The melt-fabricable fluororesin powder having an average particle size of 100 μm or greater and 1,000 μm or smaller is particularly suitable as a powdery coating material used for rotational coating or rotational molding.

The melt-fabricable fluororesin powder can be produced by a method of drying the melt-fabricable fluororesin obtained by the production method of the present disclosure described above to powder the melt-fabricable fluororesin. The production method for producing the melt-fabricable fluororesin powder is also one aspect of the present disclosure.

In the production method of the present disclosure, the surfactant, decomposition products and by-products of the surfactant by-produced by the surfactant, and residual monomers may be collected from discharge water generated in the coagulation or the washing and/or from off gas generated in the drying, and then purified to reuse the surfactant, the decomposition products and by-products of the surfactant, and the residual monomers by-produced by the surfactant. The collection and the purification may be performed by known methods, although not limited thereto. For example, they may be performed by the methods disclosed in National Publication of International Patent Application No. 2011-520020.

The collection of the surfactant, the decomposition products and by-products of the surfactant by-produced by the surfactant, the residual monomers, and the like from discharge water generated in the coagulation, discharge water generated in the washing, and off gas generated in the drying and the purification thereof may be performed by any known methods, although not limited thereto, such as the methods disclosed in U.S. Patent Application Publication No. 2007/15937, U.S. Patent Application Publication No. 2007/25902, and U.S. Patent Application Publication No. 2007/27251. Specific examples of the methods are as follows.

An example of the method of collecting the surfactant, the decomposition products and by-products of the surfactant by-produced by the surfactant, the residual monomers, and the like from discharge water is a method in which the discharge water is brought into contact with adsorbent particles formed of ion exchange resin, activated carbon, silica gel, clay, zeolite, or the like, so that the particles are allowed to adsorb the surfactant and the others, and then the discharge water and the adsorbent particles are separated. Incinerating the adsorbent particles having adsorbed the surfactant and the others can prevent emission of the surfactant and the others into the environment.

Alternatively, the surfactant and the others may be removed and eliminated by a known method from the ion exchange resin particles having adsorbed the surfactant and the others, and collected. For example, in the case of using anion exchange resin particles as the ion exchange resin particles, the surfactant and the others can be eluted by bringing a mineral acid into contact with an anion exchange resin. When a water-soluble organic solvent is added to the resulting eluate, the mixture is usually separated into two phases. Since the lower phase contains the surfactant and the others, it is possible to collect the surfactant and the others by collecting and neutralizing the lower phase. Examples of the water-soluble organic solvent include polar solvents such as alcohols, ketones, and ethers.

Other methods of collecting the surfactant and the others from ion exchange resin particles include a method of using an ammonium salt and a water-soluble organic solvent and a method of using an alcohol and, if necessary, an acid. In the latter method, ester derivatives of the surfactant and the others are generated, and they can easily be separated from the alcohol by distillation.

When the discharge water contains fluoropolymer particles and other solids, they are preferably removed before the discharge water and the adsorbent particles are brought into contact with each other. Examples of methods of removing the fluoropolymer particles and other solids include a method of adding an aluminum salt, for example, to deposit these components, and then separating the discharge water and the deposits, and an electrocoagulation method. The components may also be removed by a mechanical method, and examples thereof include a cross-flow filtration method, a depth filtration method, and a precoat filtration method.

From the viewpoint of productivity, the discharge water preferably contains the fluoropolymer in a non-agglomerated form in a low concentration, more preferably less than 0.4% by mass, and particularly preferably less than 0.3% by mass.

An example of the method of collecting the surfactant and the others from the off gas is a method in which a scrubber is brought into contact with deionized water, an alkaline aqueous solution, an organic solvent such as a glycol ether solvent, or the like to provide a scrubber solution containing the surfactant and the others. When the alkaline aqueous solution used is a highly concentrated alkaline aqueous solution, the scrubber solution can be collected in a state where the surfactant and the others are phase-separated, and thus the surfactant and the others can be easily collected and reused. Examples of the alkali compound include alkali metal hydroxides and quaternary ammonium salts.

The scrubber solution containing the surfactant and the others may be concentrated using a reverse osmosis membrane, for example. The concentrated scrubber solution usually contains fluoride ions. Still, the fluoride ions may be removed by adding alumina after the concentration so that the surfactant and the others can easily be reused. Alternatively, the scrubber solution may be brought into contact with adsorbent particles so that the adsorbent particles can adsorb the surfactant and the others, and thereby the surfactant and the others may be collected by the aforementioned method.

The surfactant and the others collected by any of the methods may be reused in the production of fluoropolymer.

The present disclosure further provides a method for producing an aqueous dispersion (hereinafter, also referred to as "third production method of the present disclosure") including a step of removing or reducing the fluorine-containing compound represented by the general formula (1A) by subjecting a fluoropolymer aqueous dispersion containing the fluorine-containing compound represented by the general formula (1A) to a heating treatment.

$$\text{H—(CF}_2\text{)}_m\text{—COOH} \qquad \text{General Formula (1A):}$$

wherein m is 3 to 19.

By converting the fluorine-containing compound represented by the general formula (1) into the fluorine-containing compound represented by the general formula (1A) and then performing the heating treatment, it is possible to remove or reduce the fluorine-containing compound represented by the general formula (1A) from the fluoropolymer aqueous dispersion. Further, the aqueous dispersion containing the fluorine-containing compound represented by the general formula (1A) and water can also be obtained by recovering a gas containing the fluorine-containing compound represented by the general formula (1A) and water generated by the heating treatment and cooling the recovered gas as necessary.

The production method of the aqueous dispersion preferably includes a step of recovering a gas containing the compound represented by the general formula (1A) and water generated by the heating treatment.

The fluoropolymer aqueous dispersion containing the fluorine-containing compound represented by the general formula (1A) and the fluoropolymer can be obtained, for example, by adjusting the fluoropolymer aqueous dispersion obtained by polymerization of a fluoromonomer using the carboxylic acid type hydrocarbon surfactant described above to acidic. Examples of the method for adjusting the acidity include a method of adding an acid and a method of blowing an acidic gas such as carbon dioxide, sulfur dioxide, sulfur trioxide, or nitrogen dioxide. The method of adding an acid, the type of acid, and the like may be the same as those in the first and second production methods of the present disclosure.

When the fluoropolymer aqueous dispersion as polymerized obtained by polymerization is acidic, the operation of adjusting the dispersion to acidic may not be performed.

The temperature of the heating treatment is preferably higher than 150° C. The temperature of the heating treatment (drying) is preferably 155° C. or higher, more preferably 160° C. or higher, still more preferably 165° C. or higher, further preferably 170° C. or higher, still further preferably 175° C. or higher, and particularly preferably 180° C. or higher in view of more efficiently reducing the specific fluorine-containing compound.

The heating treatment is preferably performed in the presence of water vapor. For example, the fluoropolymer aqueous dispersion may be placed in a reaction vessel and the heating treatment is performed in the presence of water vapor under conditions where water is vaporized. The reaction vessel is preferably sealed.

The content of the fluorine-containing compound represented by the general formula (1A) contained in the fluoropolymer aqueous dispersion is not limited, and is, for example, about 1 ppb to 10,000 ppm, preferably 100 ppb or more, more preferably 1 ppm or more, still more preferably 10 ppm or more, and particularly preferably 100 ppm or more, based on the fluoropolymer.

The aqueous dispersion to be subjected to the heating treatment may contain one fluorine-containing compound represented by the general formula (1A) or may contain two or more fluorine-containing compounds, and the third production method of the present disclosure is particularly effective when the aqueous dispersion contains two or more fluorine-containing compounds.

Examples thereof include an embodiment containing a fluorine-containing compound of the general formula (1A) wherein m is 7 and a fluorine-containing compound of the general formula (1A) wherein m is 13. Further, the aqueous dispersion may contain three or more, four or more, or all fluorine-containing compounds encompassed in the general formula (1A), as long as the aqueous dispersion contains two or more of them.

The aqueous dispersion to be subjected to the heating treatment may be an aqueous dispersion containing, as the fluorine-containing compound, a fluorine-containing compound of the general formula (1A) wherein m is 7 or less and a fluorine-containing compound of the general formula (1A) wherein m is 8 or more, or may be an aqueous dispersion containing a fluorine-containing compound of the general formula (1A) wherein m is 8 or less and a fluorine-containing compound of the general formula (1A) wherein m is 9 or more.

The fluoropolymer aqueous dispersion may be an embodiment containing fluorine-containing compounds wherein m is 3, 5, 7, 9, 11, 13, 15, 17, and 19 and not containing fluorine-containing compounds wherein m is 4, 6, 8, 10, 12, 14, 16, and 18, or may be an embodiment containing fluorine-containing compounds wherein m is 4, 6, 8, 10, 12, 14, 16, 18, and 20 and not containing fluorine-containing compounds wherein m is 3, 5, 7, 9, 11, 13, 15, 17, and 19, or may be an embodiment containing all fluorine-containing compounds wherein m is 3 to 19, among the fluorine-containing compounds encompassed in the general formula (1A).

In the third production method of the present disclosure, the concentration of the fluorine-containing compound represented by the general formula (1A) in the fluoropolymer aqueous dispersion is not limited, and the aqueous dispersion of fluoropolymer can be treated at any concentration. In the fluoropolymer aqueous dispersion to be subjected to the treatment, the total amount of the fluorine-containing compound represented by the general formula (1A) may be 0.01 ppm or more, 0.1 ppm or more, or 0.5 ppm or more, based on the fluoropolymer. The total amount may also be 1 ppm or more, 5 ppm or more, 10 ppm or more, or 100 ppm or more based on the total amount of water. When the concentration of the fluorine-containing compound represented by the general formula (1A) in the fluoropolymer aqueous dispersion is a certain level or more as described above, the third production method of the present disclosure exhibits higher removal efficiency.

Further, in the fluoropolymer aqueous dispersion to be subjected to the treatment, the fluorine-containing compound represented by the general formula (1A) may be 10,000 ppm or less, 5,000 ppm or less, and 2,000 ppm or less, 1,000 ppm or less, 500 ppm or less, and 200 ppm or less based on the fluoropolymer. When the total amount of the fluorine-containing compounds in the fluoropolymer aqueous dispersion is within the above range, the removal efficiency can be further improved.

As used herein, ppm and ppb mean values obtained in terms of mass unless otherwise specified.

The amount of at least one of the fluorine-containing compounds represented by the general formula (1A) wherein m is 3, 4, 5, 6, 7, 8, 9, 10, 11, 12, 13, 14, 15, 16, 17, 18 or 19 may be 0.01 ppm or more, 0.1 ppm or more, 0.5 ppm or more, 1 ppm or more, 5 ppm or more, 10 ppm or more, or 100 ppm or more based on the total amount of water.

When the concentration of the fluorine-containing compound represented by the general formula (1A) in the fluoropolymer aqueous dispersion is a certain level or more as described above, the third production method of the present disclosure exhibits higher removal efficiency.

Further, the amount of at least one of the fluorine-containing compounds represented by the general formula (1A) wherein m is 3, 4, 5, 6, 7, 8, 9, 10, 11, 12, 13, 14, 15, 16, 17, 18 or 19 may be 10,000 ppm or less, 5,000 ppm or less, 2,000 ppm or less, 1,000 ppm or less, 500 ppm or less, or 200 ppm or less based on the total amount of water. When the amount of the fluorine-containing compounds in the fluoropolymer aqueous dispersion is within the above range, the removal efficiency can be further improved.

The amount of the fluorine-containing compound of the general formula (1A) wherein m is 3 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1A) in the fluoropolymer aqueous dispersion is a certain level or more as described above, the third production method of the present disclosure exhibits higher removal efficiency.

Further, the amount of the fluorine-containing compound of the general formula (1A) wherein m is 3 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the fluoropolymer aqueous dispersion is within the above range, the removal efficiency can be further improved.

The amount of the fluorine-containing compound of the general formula (1A) wherein m is 4 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1A) in the fluoropolymer aqueous dispersion is a certain level or more as described above, the third production method of the present disclosure exhibits higher removal efficiency.

Further, the amount of the fluorine-containing compound of the general formula (1A) wherein m is 4 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the fluoropolymer aqueous dispersion is within the above range, the removal efficiency can be further improved.

The amount of the fluorine-containing compound of the general formula (1A) wherein m is 5 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1A) in the fluoropolymer aqueous dispersion is a certain level or more as described above, the third production method of the present disclosure exhibits higher removal efficiency.

Further, the amount of the fluorine-containing compound of the general formula (1A) wherein m is 5 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the fluoropolymer aqueous dispersion is within the above range, the removal efficiency can be further improved.

The amount of the fluorine-containing compound of the general formula (1A) wherein m is 6 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1A) in the fluoropolymer aqueous dispersion is a certain level or more as described above, the third production method of the present disclosure exhibits higher removal efficiency.

Further, the amount of the fluorine-containing compound of the general formula (1A) wherein m is 6 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the fluoropolymer aqueous dispersion is within the above range, the removal efficiency can be further improved.

The amount of the fluorine-containing compound of the general formula (1A) wherein m is 7 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1A) in the fluoropolymer aqueous dispersion is a certain level or more as described above, the third production method of the present disclosure exhibits higher removal efficiency.

Further, the amount of the fluorine-containing compound of the general formula (1A) wherein m is 7 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the fluoropolymer aqueous dispersion is within the above range, the removal efficiency can be further improved.

The amount of the fluorine-containing compound of the general formula (1A) wherein m is 8 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1A) in the fluoropolymer aqueous dispersion is a certain level or more as described above, the third production method of the present disclosure exhibits higher removal efficiency.

Further, the amount of the fluorine-containing compound of the general formula (1A) wherein m is 8 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the fluoropolymer aqueous dispersion is within the above range, the removal efficiency can be further improved.

The amount of the fluorine-containing compound of the general formula (1A) wherein m is 9 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1A) in the fluoropolymer aqueous dispersion is a certain level or more as described above, the third production method of the present disclosure exhibits higher removal efficiency.

Further, the amount of the fluorine-containing compound of the general formula (1A) wherein m is 9 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the fluoropolymer aqueous dispersion is within the above range, the removal efficiency can be further improved.

The amount of the fluorine-containing compound of the general formula (1A) wherein m is 10 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1A) in the fluoropolymer aqueous dispersion is a certain level or more as described above, the third production method of the present disclosure exhibits higher removal efficiency.

Further, the amount of the fluorine-containing compound of the general formula (1A) wherein m is 10 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the fluoropolymer aqueous dispersion is within the above range, the removal efficiency can be further improved.

The amount of the fluorine-containing compound of the general formula (1A) wherein m is 11 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1A) in the fluoropolymer aqueous dispersion is a certain level or more as described above, the third production method of the present disclosure exhibits higher removal efficiency.

Further, the amount of the fluorine-containing compound of the general formula (1A) wherein m is 11 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the fluoropolymer aqueous dispersion is within the above range, the removal efficiency can be further improved.

The amount of the fluorine-containing compound of the general formula (1A) wherein m is 12 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1A) in the fluoropolymer aqueous dispersion is a certain level or more as described above, the third production method of the present disclosure exhibits higher removal efficiency.

Further, the amount of the fluorine-containing compound of the general formula (1A) wherein m is 12 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the fluoropolymer aqueous dispersion is within the above range, the removal efficiency can be further improved.

The amount of the fluorine-containing compound of the general formula (1A) wherein m is 13 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1A) in the fluoropolymer aqueous dispersion is a certain level or more as described above, the third production method of the present disclosure exhibits higher removal efficiency.

Further, the amount of the fluorine-containing compound of the general formula (1A) wherein m is 13 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the fluoropolymer aqueous dispersion is within the above range, the removal efficiency can be further improved.

The amount of the fluorine-containing compound of the general formula (1A) wherein m is 14 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1A) in the fluoropolymer aqueous dispersion is a certain level or more as described above, the third production method of the present disclosure exhibits higher removal efficiency.

Further, the amount of the fluorine-containing compound of the general formula (1A) wherein m is 14 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the fluoropolymer aqueous dispersion is within the above range, the removal efficiency can be further improved.

The amount of the fluorine-containing compound of the general formula (1A) wherein m is 15 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1A) in the fluoropolymer aqueous dispersion is a certain level or more as described above, the third production method of the present disclosure exhibits higher removal efficiency.

Further, the amount of the fluorine-containing compound of the general formula (1A) wherein m is 15 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the fluoropolymer aqueous dispersion is within the above range, the removal efficiency can be further improved.

The amount of the fluorine-containing compound of the general formula (1A) wherein m is 16 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1A) in the fluoropolymer aqueous dispersion is a certain level or more as described above, the third production method of the present disclosure exhibits higher removal efficiency.

Further, the amount of the fluorine-containing compound of the general formula (1A) wherein m is 16 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the fluoropolymer aqueous dispersion is within the above range, the removal efficiency can be further improved.

The amount of the fluorine-containing compound of the general formula (1A) wherein m is 17 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1A) in the fluoropolymer aqueous dispersion is a certain level or more as described above, the third production method of the present disclosure exhibits higher removal efficiency.

Further, the amount of the fluorine-containing compound of the general formula (1A) wherein m is 17 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the fluoropolymer aqueous dispersion is within the above range, the removal efficiency can be further improved.

The amount of the fluorine-containing compound of the general formula (1A) wherein m is 18 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1A) in the fluoropolymer aqueous dispersion is a certain level or more as described above, the third production method of the present disclosure exhibits higher removal efficiency.

Further, the amount of the fluorine-containing compound of the general formula (1A) wherein m is 18 may be 10,000 ppm or less, 5,000 ppm or less, and 2,000 ppm or less, 1,000 ppm or less, 500 ppm or less, and 200 ppm or less based on the fluoropolymer. When the amount of the fluorine-containing compounds in the fluoropolymer aqueous dispersion is within the above range, the removal efficiency can be further improved.

The amount of the fluorine-containing compound of the general formula (1A) wherein m is 19 may also be 0.01 ppm or more, 0.1 ppm or more, 0.5 ppm or more, 1 ppm or more, 5 ppm or more, or 10 ppm or more based on the fluoropolymer.

When the concentration of the fluorine-containing compound represented by the general formula (1A) in the fluoropolymer aqueous dispersion is a certain level or more as described above, the third production method of the present disclosure exhibits higher removal efficiency.

Further, the amount of the fluorine-containing compound of the general formula (1A) wherein m is 19 may be 10,000 ppm or less, 5,000 ppm or less, and 2,000 ppm or less, 1,000 ppm or less, 500 ppm or less, and 200 ppm or less based on the fluoropolymer. When the amount of the fluoro-containing compounds in the fluoropolymer aqueous dispersion is within the above range, the removal efficiency can be further improved.

It is preferable that the fluoropolymer aqueous dispersion is substantially free from a salt of a fluorine-containing compound represented by general formula (1A) (preferably a fluorine-containing compound represented by the general formula (1), wherein $M^1$ is a metal atom, $NR^5_4$ ($R^5$ may be the same or different and may be H or an organic group having 1 to 10 carbon atoms), imidazolium optionally having a substituent, pyridinium optionally having a substituent, or phosphonium optionally having a substituent. In the aqueous dispersion, the expression "substantially free from a salt of a fluorine-containing compound represented by the general formula (1A)" means that the content of the salt of the fluorine-containing compound represented by the general formula (1A) is 500 ppb or less for all m. For example, the salt of the fluorine-containing compound of the general formula (1A) wherein m is 3 may be 400 ppb and the salt of the fluorine-containing compound wherein m is 9 may be less than 400 ppb, or the total amount of salts of fluorine-containing compounds wherein m is 3 to 19 may be 500 ppb or less.

The salt content of the fluorine-containing compound represented by the general formula (1A) may be 500 ppb or less, 400 ppb or less, 300 ppb or less, 200 ppb or less, 100 ppb or less, 50 ppb or less, or 10 ppb or less for all m.

The fluoropolymer aqueous dispersion contains a fluorine-containing compound represented by the general formula (1A), water, and a fluoropolymer.

All the fluoropolymers described above in the production method of a fluoropolymer powder can be employed as the fluoropolymer.

For example, the fluoropolymer is preferably a fluororesin having a fluorine substitution percentage of 50% or more, and more preferably polytetrafluoroethylene.

The heating treatment is preferably performed when the concentration of the fluorine-containing compound represented by the general formula (1A) in the aqueous dispersion is 1 ppb to 1,000,000 ppm. When the concentration of the fluorine-containing compound is within the range, the fluorine-containing compound represented by the general formula (1A) in the obtained aqueous dispersion can be removed or reduced.

The solid concentration of the fluoropolymer aqueous dispersion is not limited, and may be, for example, 1.0 to 70% by mass. The solid concentration is preferably 8.0% by mass or more, more preferably 10.0% by mass or more, and preferably 60.0% by mass or less, more preferably 50.0% by mass or less. From the viewpoint of reducing the uncoagulated content, the solid concentration is preferably 10 to 25% by mass, preferably 10 to 22% by mass, and more preferably 10 to 20% by mass.

The production method may include a step of diluting the fluoropolymer aqueous dispersion by adding water. For example, by the dilution, the solid concentration can be diluted to 10 to 25% by mass.

Although the embodiments have been described above, it will be understood that various modifications of the embodiments and details are possible without departing from the purpose and scope of the claims.

EXAMPLES

The present disclosure is described with reference to examples, but the present disclosure is not intended to be limited by these examples.

The parameters in the Examples were determined by the following methods.
Content of Specific Fluorine-Containing Compound
The following describes the method of measuring the contents of compounds represented by the following general formulas (1) and (2).

$$(H-(CF_2)_m-COO)_p M_1 \qquad \text{General Formula (1):}$$

wherein m is 3 to 19; $M^1$ is H, a metal atom, $NR^5_4$, imidazolium optionally having a substituent, pyridinium optionally having a substituent, or phosphonium optionally having a substituent; and p is 1 or 2.

$$(H-(CF_2)_n-SO_3)_q M^2 \qquad \text{General Formula (2):}$$

wherein n is 4 to 20; $M^2$ is H, a metal atom, $NR^5_4$, imidazolium optionally having a substituent, pyridinium optionally having a substituent, or phosphonium optionally having a substituent; and q is 1 or 2.

(Method of Measuring Content of Compound Represented by General Formula (1))
Extraction from Aqueous Dispersion The amount of the solid content in the aqueous dispersion was measured, and the aqueous dispersion in an amount equivalent to 0.5 g of the solid PTFE was put into a 100-mL screw tube. Thereafter, water and methanol were added thereto such that the extraction solvent was to be 40 g (43.14 mL) having a water/methanol ratio by vol % of 50/50 including the water originally contained in the aqueous dispersion. Thereafter, the mixture was well shaken until coagulation occurred. The solid was removed and the liquid phase was centrifuged at 4,000 rpm for one hour, and then the supernatant containing the compound represented by the general formula (1) was extracted.

Extraction from Powder

To 10 g (12.6 mL) of methanol, 1 g of powder was added and ultrasonication was performed on the mixture for 60 minutes, and then the supernatant containing the compound represented by the general formula (1) was extracted.

Measurement of Content of Compound Represented by General Formula (1) Contained in Extract The content of the compound represented by the general formula (1) contained in the extract was determined by conversion in terms of perfluorooctanoic acid equivalent.

Calibration Curve of Perfluorooctanoic Acid

Five methanol standard solutions of perfluorooctanoic acid having known concentrations within 1 ng/mL to 100 ng/mL were prepared, and subjected to analysis using a liquid chromatograph-mass spectrometer (Waters, LC-MS ACQUITY UPLC/TQD). Using the first order approximation from the respective sample concentrations and the peak integral values, the values a and b were determined by the relational formula (1):

$$A = a \times X + b \qquad (1)$$

A: peak area of perfluorooctanoic acid
X: concentration (ng/ml) of perfluorooctanoic acid Measurement Equipment Configuration and LC-MS Measurement Conditions

TABLE 1

| LC unit | |
|---|---|
| Apparatus | Acquity ULPC manufactured by Waters |
| Column | Acquity UPLC BEH C18 manufactured by Waters 1.7 mm (2.1 × 50 mm) |
| Mobile phase | A $CH_3CN$ |
| | B 20 mM $CH_3COONH_4/H_2O$ |
| 0 → 1.5 min | A:B = 10:90 |
| 1.5 → 8.3 min | A:B = 10:90 → A:B = 90:10 Linear gradient |
| 8.3 → 10 min | A:B = 90:10 |
| Flow rate | 0.4 mL/min |
| Column temperature | 40° C. |
| Sample injection volume | 5 μL |

| MS unit | |
|---|---|
| Apparatus | TQ Detector |
| Measurement mode | MRM (Multiple Reaction Monitoring) |
| Ionization method | Electrospray ionization |
| | Negative mode |

MRM Measurement Parameters

TABLE 2

| Compound | Precursor | Product |
|---|---|---|
| Perfluorooctanoic acid | 413 | 369 |

Content of Compounds Represented by General Formula (1) Having 4 or More and 20 or Less Carbon Atoms Contained in Extract Using a liquid chromatograph-mass spectrometer, compounds represented by the general formula (1) having 4 or more and 20 or less carbon atoms were subjected to analysis. For the extracted liquid phase, the peak areas of the compounds represented by the general formula (1) having the respective numbers of carbon atoms were determined by MRM.

MRM Measurement Parameters

TABLE 3

| Compound | Number of carbon atoms | Precursor | Product |
|---|---|---|---|
| $(H-(CF_2)_3-COO)M^1$ | 4 | 195 | 131 |
| $(H-(CF_2)_4-COO)M^1$ | 5 | 245 | 181 |
| $(H-(CF_2)_5-COO)M^1$ | 6 | 295 | 231 |
| $(H-(CF_2)_6-COO)M^1$ | 7 | 345 | 281 |
| $(H-(CF_2)_7-COO)M^1$ | 8 | 395 | 331 |
| $(H-(CF_2)_8-COO)M^1$ | 9 | 445 | 381 |
| $(H-(CF_2)_9-COO)M^1$ | 10 | 495 | 431 |
| $(H-(CF_2)_{10}-COO)M^1$ | 11 | 545 | 481 |
| $(H-(CF_2)_{11}-COO)M^1$ | 12 | 595 | 531 |
| $(H-(CF_2)_{12}-COO)M^1$ | 13 | 645 | 581 |
| $(H-(CF_2)_{13}-COO)M^1$ | 14 | 695 | 631 |
| $(H-(CF_2)_{14}-COO)M^1$ | 15 | 745 | 681 |
| $(H-(CF_2)_{15}-COO)M^1$ | 16 | 795 | 731 |
| $(H-(CF_2)_{16}-COO)M^1$ | 17 | 845 | 781 |
| $(H-(CF_2)_{17}-COO)M^1$ | 18 | 895 | 831 |
| $(H-(CF_2)_{18}-COO)M^1$ | 19 | 945 | 881 |
| $(H-(CF_2)_{19}-COO)M^1$ | 20 | 995 | 931 |

The content of the compound represented by the general formula (1) having (m+1) carbon atoms in the extract was calculated by the formula (3). The values a and b in the formula (3) were determined by the formula (1):

$$XCm = ((ACm-b)/a) \times ((50 \times m + 45)/413) \quad (3)$$

XCm: content (ng/ml) of compound represented by general formula (1) having (m+1) carbon atoms in extract solution ACm: peak area of compound represented by general formula (1) having (m+1) carbon atoms in extract solution The quantification limit in this measurement is 1 ng/mL.
Content of Compound Represented by General Formula (1) Having (m+1) Carbon Atoms Contained in Aqueous Dispersion The content of the compound represented by the general formula (1) having (m+1) carbon atoms contained in the aqueous dispersion was determined by the formula (5):

$$ZCm = XCm \times 86.3 \quad (5)$$

ZCm: content (based on fluoropolymer) of compound represented by general formula (1) having (m+1) carbon atoms contained in aqueous dispersion Content of Compound Represented by General Formula (1) Having (m+1) Carbon Atoms Contained in Powder The content of the compound represented by the general formula (1) having (m+1) carbon atoms contained in the powder was determined by the formula (4):

$$YCm = XCm \times 12.6 \quad (4)$$

YCm: content (based on fluoropolymer) of compound represented by general formula (1) having (m+1) carbon atoms contained in powder (Method of Measuring Content of Compound Represented by General Formula (2))

Extraction from Aqueous Dispersion

The amount of the solid content in the aqueous dispersion was determined, and the aqueous dispersion in an amount equivalent to 0.5 g of the solid PTFE was put into a 100-mL screw tube. Thereafter, water and methanol were added thereto such that the extraction solvent was to be 40 g (43.14 mL) having a water/methanol ratio by vol % of 50/50 including the water originally contained in the aqueous dispersion. Thereafter, the mixture was well shaken until coagulation occurred. The solid was removed and the liquid phase was centrifuged at 4,000 rpm for one hour, and then the supernatant containing the compound represented by the general formula (2) was extracted.

Extraction from Powder

To 10 g (12.6 mL) of methanol, 1 g of powder was added and ultrasonication was performed on the mixture for 60 minutes, and then the supernatant containing the compound represented by the general formula (2) was extracted.

Measurement of Content of Compound Represented by General Formula (2) Contained in Extract The content of the compound represented by the general formula (2) contained in the extract was determined by conversion in terms of perfluorooctanesulfonic acid equivalent.

Calibration Curve of Perfluorooctanesulfonic Acid

Five methanol standard solutions of perfluorooctanesulfonic acid having known concentrations within 1 ng/mL to 100 ng/mL were prepared, and subjected to analysis using a liquid chromatograph-mass spectrometer (Waters, LC-MS ACQUITY UPLC/TQD). Using the first order approximation from the respective sample concentrations and the peak integral values, the values a and b were determined by the following relational formula (1):

$$A = a \times X + b \quad (1)$$

A: peak area of perfluorooctanesulfonic acid
X: concentration (ng/ml) of perfluorooctanesulfonic acid Measurement Equipment Configuration and LC-MS Measurement Conditions

TABLE 4

| | LC unit |
|---|---|
| Apparatus | Acquity ULPC manufactured by Waters |
| Column | Acquity UPLC BEH C18 manufactured by Waters 1.7 mm (2.1 × 50 mm) |
| Mobile phase | A CH$_3$CN |
| | B 20 mM CH$_3$COONH$_4$/H$_2$O |
| 0 → 1.5 min | A:B = 10:90 |
| 1.5 → 8.3 min | A:B = 10:90 → A:B = 90:10 Linear gradient |
| 8.3 → 10 min | A:B = 90:10 |
| Flow rate | 0.4 mL/min |
| Column temperature | 40° C. |
| Sample injection volume | 5 µL |
| | MS unit |
| Apparatus | TQ Detector |
| Measurement mode | MRM (Multiple Reaction Monitoring) |
| Ionization method | Electrospray ionization |
| | Negative mode |

MRM Measurement Parameters

TABLE 5

| Compound | Precursor | Product |
|---|---|---|
| Perfluorooctanesulfonic acid | 499 | 99 |

Content of Compounds Represented by General Formula (2) Having 4 or More and 20 or Less Carbon Atoms Contained in Extract Using a liquid chromatograph-mass spectrometer, compounds represented by the general formula (2) having 4 or more and 20 or less carbon atoms were subjected to analysis. For the extracted liquid phase, the peak areas of the compounds represented by the general formula (2) having the respective numbers of carbon atoms were determined by MRM.

MRM Measurement Parameters

TABLE 6

| Compound | Number of carbon atoms | Precursor | Product |
|---|---|---|---|
| (H—(CF$_2$)$_4$—SO$_3$)M$^2$ | 4 | 281 | 99 |
| (H—(CF$_2$)$_5$—SO$_3$)M$^2$ | 5 | 331 | 99 |
| (H—(CF$_2$)$_6$—SO$_3$)M$^2$ | 6 | 381 | 99 |
| (H—(CF$_2$)$_7$—SO$_3$)M$^2$ | 7 | 431 | 99 |
| (H—(CF$_2$)$_8$—SO$_3$)M$^2$ | 8 | 481 | 99 |
| (H—(CF$_2$)$_9$—SO$_3$)M$^2$ | 9 | 531 | 99 |
| (H—(CF$_2$)$_{10}$—SO$_3$)M$^2$ | 10 | 581 | 99 |
| (H—(CF$_2$)$_{11}$—SO$_3$)M$^2$ | 11 | 631 | 99 |
| (H—(CF$_2$)$_{12}$—SO$_3$)M$^2$ | 12 | 681 | 99 |
| (H—(CF$_2$)$_{13}$—SO$_3$)M$^2$ | 13 | 731 | 99 |
| (H—(CF$_2$)$_{14}$—SO$_3$)M$^2$ | 14 | 781 | 99 |
| (H—(CF$_2$)$_{15}$—SO$_3$)M$^2$ | 15 | 831 | 99 |
| (H—(CF$_2$)$_{16}$—SO$_3$)M$^2$ | 16 | 881 | 99 |
| (H—(CF$_2$)$_{17}$—SO$_3$)M$^2$ | 17 | 931 | 99 |
| (H—(CF$_2$)$_{18}$—SO$_3$)M$^2$ | 18 | 981 | 99 |
| (H—(CF$_2$)$_{19}$—SO$_3$)M$^2$ | 19 | 1031 | 99 |
| (H—(CF$_2$)$_{20}$—SO$_3$)M$^2$ | 20 | 1081 | 99 |

The content of the compound represented by the general formula (2) having n carbon atoms in the extract was calculated by the formula (3). The values a and b in the formula (3) were determined by the formula (1):

$$XSn = ((ASn - b)/a) \times ((50 \times n + 81)/499) \quad (3)$$

XSn: content (ng/ml) of compound represented by general formula (2) having n carbon atoms in extract solution
ASn: peak area of compound represented by general formula (2) having n carbon atoms in extract solution The quantification limit in this measurement is 1 ng/mL.

Content of Compound Represented by General Formula (2) Having n Carbon Atoms Contained in Aqueous Dispersion The content of the compound represented by the general formula (2) having n carbon atoms contained in the aqueous dispersion was determined by the formula (5):

$$ZSn = XSn \times 86.3 \quad (5)$$

ZSn: content (based on fluoropolymer) of compound represented by general formula (2) having n carbon atoms contained in aqueous dispersion Content of Compound Represented by General Formula (2) Having n Carbon Atoms Contained in Powder The content of the compound represented by the general formula (2) having n carbon atoms contained in the powder was determined by the formula (4):

$$YSn = XSn \times 12.6 \quad (4)$$

YSn: content (based on fluoropolymer) of compound represented by general formula (2) having n carbon atoms contained in powder $$ZSn = XSn \times 86.3 \qquad (5)$$

ZSn: content (based on fluoropolymer) of compound represented by general formula (2) having n carbon atoms contained in aqueous dispersion Average Primary Particle Size The average particle size was determined by dynamic light scattering. Measurement was performed by preparing a fluoropolymer aqueous dispersion adjusted to a fluoropolymer solid concentration of about 1.0% by mass using ELSZ-1000S (manufactured by Otsuka Electronics Co., Ltd.) at 25° C. with 70 measurement processes. The refractive index of the solvent (water) was 1.3328, and the viscosity of the solvent (water) was 0.8878 mPa·s.

Solid Concentration of PTFE Aqueous Dispersion

In an air dryer, 1 g of PTFE aqueous dispersion was dried at a condition of 150° C. for 60 minutes, and the ratio of the mass of the non-volatile matter to the mass of the aqueous dispersion (1 g) was expressed by percentage and taken as the solid concentration thereof.

Standard Specific Gravity (SSG)

Using a sample molded in conformity with ASTM D4895-89, the SSG was measured by the water replacement method in conformity with ASTM D-792.

Synthesis Example 1

To a reactor with an internal volume of 1 L and equipped with a stirrer, 658.0 g of deionized water and 35.0 g of sodium laurate were added. The reactor was sealed, and the system was purged with nitrogen, so that oxygen was removed. The reactor was heated up to 90° C. and pressurized to 0.4 MPa with nitrogen. Then, 6.90 g of ammonium persulfate (APS) was charged thereinto and stirred for 3 hours. The stirring was stopped, the pressure was released until the reactor was adjusted to the atmospheric pressure, and the reactor was cooled. An aqueous ammonia solution was gradually added to the resulting aqueous surfactant solution with stirring to provide an aqueous surfactant solution A having a pH adjusted to 8.5. The concentration of sodium laurate at this time was 4.75% by mass.

Synthesis Example 2

To an autoclave made of SUS with an internal volume of 3 L, 1,780 g of deionized water, 90 g of paraffin wax, and 0.270 g of sodium laurate were added. The reactor was sealed and the system was purged with nitrogen, so that oxygen was removed. The reactor was heated up to 85° C., 7.0 g of HFP was added thereto, and further pressurized to 2.70 MPaG with TFE. A polymerization initiator aqueous solution prepared by dissolving 0.310 g of ammonium persulfate (APS) in 20 g of pure water was charged into the reactor. TFE was charged so as to keep the reaction pressure constant at 2.70 MPaG. When 45 g of TFE was charged, the stirring was stopped and the pressure was released to the atmospheric pressure. The reactor was immediately filled with TFE and the reaction pressure was set to 2.70 MPaG. The stirring was restarted to continue the reaction. The aqueous surfactant solution A obtained in Synthesis Example 1 was immediately and continuously charged into the reactor. Further, an aqueous disuccinic acid peroxide solution having a concentration of 2.0% by mass was continuously charged into the reactor. When 685 g of TFE was charged, the stirring was stopped and the pressure was released until the reactor was adjusted to the atmospheric pressure. By the end of the reaction, 47.0 g of the aqueous surfactant solution A and 14.5 g of the aqueous disuccinic acid peroxide solution were charged. The aqueous dispersion was collected from the reactor and cooled so that the paraffin wax was separated. The particles contained in the resulting PTFE aqueous dispersion had an average primary particle size of 189 nm. The solid concentration of the resulting PTFE aqueous dispersion was 26.8% by mass. The pH of the resulting PTFE aqueous dispersion was 6.0.

The content of the compounds represented by the general formulas (1) and (2) in the PTFE aqueous dispersion at this time was measured. The results are shown in Table 7.

Example 1

Deionized water was added to the PTFE aqueous dispersion obtained in Synthesis Example 2 to adjust the specific gravity (25° C.) to 1.080. To a coagulation tank having an internal volume of 6 L and equipped with a stirring blade and a baffle plate, 2.5 L of an aqueous dispersion of PTFE having a specific gravity adjusted was added.

Immediately, 16 g of nitric acid (10%) was added to adjust the pH to 1.8, and at the same time, stirring was started at a stirring speed of 500 rpm. After the start of stirring, it was confirmed that the aqueous dispersion was in a slurry state to form a wet PTFE powder, and stirring was further continued for another 1 minute.

Subsequently, the wet PTFE powder was filtered off, the wet PTFE powder and 2.5 L of deionized water were charged into a coagulation tank, the temperature was adjusted to 25° C., and the polymer powder was washed at a stirring speed of 500 rpm 2 times. After washing, the wet PTFE powder was filtered off and allowed to stand in a hot air circulation type dryer at 210° C. for 18 hours to dry to obtain a PTFE powder.

When the salt content of the compound represented by the general formula (1) contained in the obtained wet PTFE powder was measured using an ion chromatograph, it was below the quantification limit (10 ppb).

The resulting PTFE powder had a standard specific gravity of 2.198.

The content of the compounds represented by the general formulas (1) and (2) of the resulting PTFE powder was measured. The results are shown in Table 7.

Synthesis Example 3

To an autoclave made of SUS with an internal volume of 6 L, 3,560 g of deionized degassed water, 180 g of paraffin wax, and 0.54 g of sodium laurate were added. The reactor was sealed and the system was purged with nitrogen, so that oxygen was removed. The reactor was heated up to 70° C. and TFE was filled into the reactor such that the reactor was adjusted to 2.76 MPaG. An aqueous solution prepared by dissolving 0.62 g of ammonium persulfate (APS) in 20 g of water and an aqueous solution prepared by dissolving 1.488 g of disuccinic acid peroxide (DSP) in 20 g of water serving as the polymerization initiator were charged into the reactor. TFE was charged so as to keep the reaction pressure constant at 2.76 MPaG. When 350 g of TFE was charged, the stirring was stopped and the pressure was released until the reactor was adjusted to the atmospheric pressure. The aqueous dispersion was collected from the reactor and cooled so that the paraffin wax was separated. The particles contained in the resulting PTFE aqueous dispersion had an average primary particle size of 157 nm. The solid content in the resulting PTFE aqueous dispersion was 8.9% by mass. The pH of the resulting PTFE aqueous dispersion was 5.3.

Comparative Example 1

PTFE powder was obtained in the same manner as in Example 1, except that the PTFE aqueous dispersion obtained in Synthesis Example 3 was used, the specific gravity of the PTFE aqueous dispersion obtained in Synthesis Example 3 was adjusted to 1.050, coagulation was performed without using nitric acid, and the drying temperature was set to 150° C.

The resulting PTFE had a standard specific gravity of 2.184.

The content of the compounds represented by the general formulas (1) and (2) of the resulting PTFE powder was measured. The results are shown in Table 7.

Comparative Example 2

PTFE powder was obtained in the same manner as in Example 1, except that the PTFE aqueous dispersion obtained in Synthesis Example 3 was used, the specific gravity of the PTFE aqueous dispersion obtained in Synthesis Example 3 was adjusted to 1.050, and coagulation was performed without using nitric acid.

The content of the compounds represented by the general formulas (1) and (2) of the resulting PTFE powder was measured. The results are shown in Table 7.

TABLE 7

| | | | | Synthesis Example 2 Aqueous dispersion | Example 1 Powder | Comparative Example 1 Powder | Comparative Example 2 Powder |
|---|---|---|---|---|---|---|---|
| Content of general formula (1) | m = 3 | ppb/PTFE | | 2.8.E+04 | Quantification limit or lower | Quantification limit or lower | Quantification limit or lower |
| | m = 4 | ppb/PTFE | | Quantification limit or lower | Quantification limit or lower | Quantification limit or lower | Quantification limit or lower |
| | m = 5 | ppb/PTFE | | 7.4.E+03 | Quantification limit or lower | Quantification limit or lower | Quantification limit or lower |
| | m = 6 | ppb/PTFE | | Quantification limit or lower | Quantification limit or lower | Quantification limit or lower | Quantification limit or lower |
| | m = 7 | ppb/PTFE | | 5.8.E+04 | Quantification limit or lower | 3.5.E+01 | Quantification limit or lower |
| | m = 8 | ppb/PTFE | | Quantification limit or lower | Quantification limit or lower | Quantification limit or lower | Quantification limit or lower |
| | m = 9 | ppb/PTFE | | 3.0.E+04 | Quantification limit or lower | Quantification limit or lower | Quantification limit or lower |
| | m = 10 | ppb/PTFE | | Quantification limit or lower | Quantification limit or lower | Quantification limit or lower | Quantification limit or lower |
| | m = 11 | ppb/PTFE | | 3.5.E+04 | Quantification limit or lower | 2.3.E+02 | 6.9.E+01 |
| | m = 12 | ppb/PTFE | | Quantification limit or lower | Quantification limit or lower | Quantification limit or lower | Quantification limit or lower |
| | m = 13 | ppb/PTFE | | 9.1.E+02 | Quantification limit or lower | 3.3.E+02 | 1.3.E+02 |
| | m = 14 | ppb/PTFE | | Quantification limit or lower | Quantification limit or lower | Quantification limit or lower | Quantification limit or lower |
| | m = 15 | ppb/PTFE | | 1.1.E+03 | Quantification limit or lower | 4.5.E+03 | 2.6.E+02 |
| | m = 16 | ppb/PTFE | | Quantification limit or lower | Quantification limit or lower | Quantification limit or lower | Quantification limit or lower |
| | m = 17 | ppb/PTFE | | 3.2.E+02 | Quantification limit or lower | 3.0.E+04 | 8.7.E+03 |
| | m = 18 | ppb/PTFE | | Quantification limit or lower | Quantification limit or lower | Quantification limit or lower | Quantification limit or lower |
| | m = 19 | ppb/PTFE | | 8.1.E+02 | Quantification limit or lower | 4.6.E+04 | 1.1.E+04 |
| | Total | ppb/PTFE | | 1.6E+05 | Quantification limit or lower | 8.1.E+04 | 2.0.E+04 |
| Content of general formula (2) | n = 4 | ppb/PTFE | | Quantification limit or lower | Quantification limit or lower | Quantification limit or lower | Quantification limit or lower |
| | n = 5 | ppb/PTFE | | Quantification limit or lower | Quantification limit or lower | Quantification limit or lower | Quantification limit or lower |
| | n = 6 | ppb/PTFE | | Quantification limit or lower | Quantification limit or lower | Quantification limit or lower | Quantification limit or lower |
| | n = 7 | ppb/PTFE | | Quantification limit or lower | Quantification limit or lower | Quantification limit or lower | Quantification limit or lower |
| | n = 8 | ppb/PTFE | | Quantification limit or lower | Quantification limit or lower | Quantification limit or lower | Quantification limit or lower |
| | n = 9 | ppb/PTFE | | Quantification limit or lower | Quantification limit or lower | Quantification limit or lower | Quantification limit or lower |
| | n = 10 | ppb/PTFE | | Quantification limit or lower | Quantification limit or lower | Quantification limit or lower | Quantification limit or lower |
| | n = 11 | ppb/PTFE | | Quantification limit or lower | Quantification limit or lower | Quantification limit or lower | Quantification limit or lower |
| | n = 12 | ppb/PTFE | | Quantification limit or lower | Quantification limit or lower | Quantification limit or lower | Quantification limit or lower |

TABLE 7-continued

|  |  | Synthesis Example 2 Aqueous dispersion | Example 1 Powder | Comparative Example 1 Powder | Comparative Example 2 Powder |
|---|---|---|---|---|---|
| n = 13 | ppb/PTFE | Quantification limit or lower | Quantification limit or lower | Quantification limit or lower | Quantification limit or lower |
| n = 14 | ppb/PTFE | Quantification limit or lower | Quantification limit or lower | Quantification limit or lower | Quantification limit or lower |
| n = 15 | ppb/PTFE | Quantification limit or lower | Quantification limit or lower | Quantification limit or lower | Quantification limit or lower |
| n = 16 | ppb/PTFE | Quantification limit or lower | Quantification limit or lower | Quantification limit or lower | Quantification limit or lower |
| n = 17 | ppb/PTFE | Quantification limit or lower | Quantification limit or lower | Quantification limit or lower | Quantification limit or lower |
| n = 18 | ppb/PTFE | Quantification limit or lower | Quantification limit or lower | Quantification limit or lower | Quantification limit or lower |
| n = 19 | ppb/PTFE | Quantification limit or lower | Quantification limit or lower | Quantification limit or lower | Quantification limit or lower |
| n = 20 | ppb/PTFE | Quantification limit or lower | Quantification limit or lower | Quantification limit or lower | Quantification limit or lower |
| Total | ppb/PTFE | Quantification limit or lower | Quantification limit or lower | Quantification limit or lower | Quantification limit or lower |

The quantification limit of the aqueous dispersion was 86 ppb/PTFE, and the quantification limit of the powder was 13 ppb/PTFE.

The invention claimed is:

1. A method for producing a fluoropolymer powder, comprising:
   (A1) adjusting a pH of a fluoropolymer aqueous dispersion, obtained by polymerization using a carboxylic acid hydrocarbon surfactant, to 4.0 or less by adding an acid and to cause coagulation to thereby obtain a wet fluoropolymer powder containing a fluorine-containing compound represented by the following formula (1A);

H—(CF$_2$)$_m$—COOH,   Formula (1A):

wherein m is 3 to 19; and
   (B1) heat-treating the wet fluoropolymer powder at a temperature higher than 150° C. and lower than 240° C. in hot air circulation, thereby reducing an amount of the fluorine-containing compound in the fluoropolymer powder.

2. The method according to claim 1, wherein the wet fluoropolymer powder contains two or more fluorine-containing compounds represented by the general formula (1A).

3. The method according to claim 1, wherein the wet fluoropolymer powder is substantially free from a salt of a fluorine-containing compound represented by the general formula (1A).

4. The method according to claim 1, wherein the fluoropolymer is a polytetrafluoroethylene.

5. A method for producing a fluoropolymer powder, comprising:
   (A2) adjusting a pH of a fluoropolymer aqueous dispersion, obtained by polymerization using an aliphatic carboxylic acid hydrocarbon surfactant, to 4.0 or less by adding an acid and to cause coagulation to thereby obtain a wet fluoropolymer powder containing a fluorine-containing compound represented by the following formula (1A):

H—(CF$_2$)$_m$—COOH   Formula (1A):

wherein m is 3 to 19; and
   (B2) heat-treating the wet fluoropolymer powder at a temperature higher than 100° C. in hot air circulation, thereby reducing an amount of the fluorine-containing compound in the fluoropolymer powder.

6. The method according to claim 5, wherein the temperature of the heat treatment is higher than 150° C. and lower than 240° C.

7. The method according to claim 5, wherein the wet fluoropolymer powder contains two or more fluorine-containing compounds represented by the general formula (1A).

8. The method according to claim 5, wherein the wet fluoropolymer powder is substantially free from a salt of a fluorine-containing compound represented by the general formula (1A).

9. The method according to claim 5, wherein the fluoropolymer is a polytetrafluoroethylene.

* * * * *